(12) United States Patent
Park et al.

(10) Patent No.: US 10,708,564 B2
(45) Date of Patent: Jul. 7, 2020

(54) IMAGE PROCESSING APPARATUS AND IMAGE PROCESSING METHOD BASED ON METADATA

(71) Applicant: SAMSUNG ELECTRONICS CO., LTD., Suwon-si (KR)

(72) Inventors: Seung-ho Park, Seoul (KR);
Seung-hoon Han, Seoul (KR);
Gui-won Seo, Yongin-si (KR);
Ho-cheon Wey, Seongnam-si (KR);
Byung-seok Min, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/573,333

(22) PCT Filed: May 10, 2016

(86) PCT No.: PCT/KR2016/004862
§ 371 (c)(1),
(2) Date: Nov. 14, 2017

(87) PCT Pub. No.: WO2016/182307
PCT Pub. Date: Nov. 17, 2016

(65) Prior Publication Data
US 2018/0139429 A1 May 17, 2018

Related U.S. Application Data

(60) Provisional application No. 62/186,786, filed on Jun. 30, 2015, provisional application No. 62/181,870,
(Continued)

(51) Int. Cl.
*H04N 9/77* (2006.01)
*H04N 19/17* (2014.01)
(Continued)

(52) U.S. Cl.
CPC ............... *H04N 9/77* (2013.01); *G06T 5/008* (2013.01); *G09G 5/005* (2013.01); *G09G 5/10* (2013.01);
(Continued)

(58) Field of Classification Search
CPC ........ H04N 9/77; H04N 19/17; H04N 19/186; H04N 9/69; H04N 19/46; H04N 9/67;
(Continued)

(56) References Cited

U.S. PATENT DOCUMENTS 9,111,330 B2    8/2015    Messmer et al.
9,635,377 B2    4/2017    Kim et al.
(Continued)

FOREIGN PATENT DOCUMENTS

JP    2005-70080 A    3/2005
KR    10-2013-0020724 A    2/2013
(Continued)

OTHER PUBLICATIONS

Communication dated Aug. 17, 2018, issued by the Korean Intellectual Property Office in counterpart Korean Patent Application No. 10-2017-7032855.
(Continued)

*Primary Examiner* — Jefferey F Harold
*Assistant Examiner* — Humam M Satti
(74) *Attorney, Agent, or Firm* — Sughrue Mion, PLLC

(57) ABSTRACT

Provided are an image processing apparatus and method, which use a maximum display luminance value of a mastering display and a maximum display luminance value of a target display according to luminance characteristics of a current scene of an encoded image.

19 Claims, 30 Drawing Sheets

Related U.S. Application Data filed on Jun. 19, 2015, provisional application No. 62/164,813, filed on May 21, 2015, provisional application No. 62/159,529, filed on May 11, 2015.

(51) Int. Cl.
| | |
|---|---|
| *H04N 19/186* | (2014.01) |
| *G09G 5/10* | (2006.01) |
| *G09G 5/00* | (2006.01) |
| *H04N 9/69* | (2006.01) |
| *H04N 19/46* | (2014.01) |
| *H04N 9/67* | (2006.01) |
| *G06T 5/00* | (2006.01) |
| *H04N 11/20* | (2006.01) |
| *H04N 5/57* | (2006.01) |
| *H04N 19/146* | (2014.01) |

(52) U.S. Cl.
CPC .............. *H04N 9/67* (2013.01); *H04N 9/69* (2013.01); *H04N 11/20* (2013.01); *H04N 19/17* (2014.11); *H04N 19/186* (2014.11); *H04N 19/46* (2014.11); *G06T 2207/20208* (2013.01); *G09G 2320/0646* (2013.01); *G09G 2320/0686* (2013.01); *G09G 2320/08* (2013.01); *G09G 2340/06* (2013.01); *G09G 2360/145* (2013.01); *G09G 2370/04* (2013.01); *H04N 5/57* (2013.01); *H04N 19/146* (2014.11)

(58) Field of Classification Search
CPC ........ H04N 11/20; H04N 5/57; H04N 19/146; H04N 5/44; H04N 9/7973; H04N 21/2353; G09G 2320/0646; G09G 5/10; G09G 5/005; G09G 2360/145; G09G 2370/04; G09G 2340/06; G09G 2320/08; G09G 2320/0686; G06T 5/008; G06T 2207/20208

See application file for complete search history.

(56) References Cited

U.S. PATENT DOCUMENTS

| | | | | |
|---|---|---|---|---|
| 2009/0295705 | A1* | 12/2009 | Chen | ................... G09G 3/3406 345/102 |
| 2010/0156956 | A1 | 6/2010 | Madden et al. | |
| 2013/0121572 | A1 | 5/2013 | Paris et al. | |
| 2014/0078165 | A1* | 3/2014 | Messmer | ............... H04N 1/603 345/589 |
| 2014/0225941 | A1 | 8/2014 | Van der Vleuten et al. | |
| 2014/0247979 | A1* | 9/2014 | Roffet | .................... H04N 5/235 382/163 |
| 2015/0030254 | A1* | 1/2015 | Yaguchi | ............ G06K 9/00765 382/209 |
| 2015/0221280 | A1* | 8/2015 | Van Der Vleuten | .... G06T 5/002 382/167 |
| 2015/0248747 | A1* | 9/2015 | Atkins | ...................... G06T 5/10 345/589 |
| 2015/0254822 | A1* | 9/2015 | Levy | ...................... G06T 5/009 382/264 |
| 2016/0005153 | A1* | 1/2016 | Atkins | .................... G06T 5/007 345/591 |
| 2016/0248939 | A1* | 8/2016 | Thurston, III | ......... H04N 1/603 |
| 2016/0254028 | A1* | 9/2016 | Atkins | ................. H04N 9/8205 386/241 |
| 2017/0078724 | A1 | 3/2017 | Wilson et al. | |
| 2017/0125063 | A1* | 5/2017 | Atkins | ................... H04N 5/268 |
| 2017/0201794 | A1* | 7/2017 | Ahmed | ......... H04N 21/234318 |
| 2017/0223330 | A1* | 8/2017 | Oh | ....................... H04N 9/8722 |
| 2018/0013927 | A1* | 1/2018 | Atkins | ................. H04N 1/6058 |

FOREIGN PATENT DOCUMENTS

| | | |
|---|---|---|
| KR | 10-2014-0110071 A | 9/2014 |
| KR | 10-2015-0002440 A | 1/2015 |

OTHER PUBLICATIONS

International Search Report and Written Opinion (PCT/ISA/210 & PCT/ISA/237) dated Aug. 8, 2016, issued by the International Searching Authority in counterpart International Application No. PCT/KR2016/004862.

Series H: Audiovisual and Multimedia Systems Infrastructure of audiovisual services, International Telecommunication Union, "Coding of moving video", Rec. ITU-T H.265 v2 (Oct. 2014), (540 Pages Total).

"Mastering Display Color Volume Metadata Supporting High Luminance and Wide Color Gamut Images", SMPTE ST 2086:2014, (6 pages total).

* cited by examiner $$f_c = (w_1 f_s + w_2 f_t)/(w_1 + w_2)$$

FIG. 28
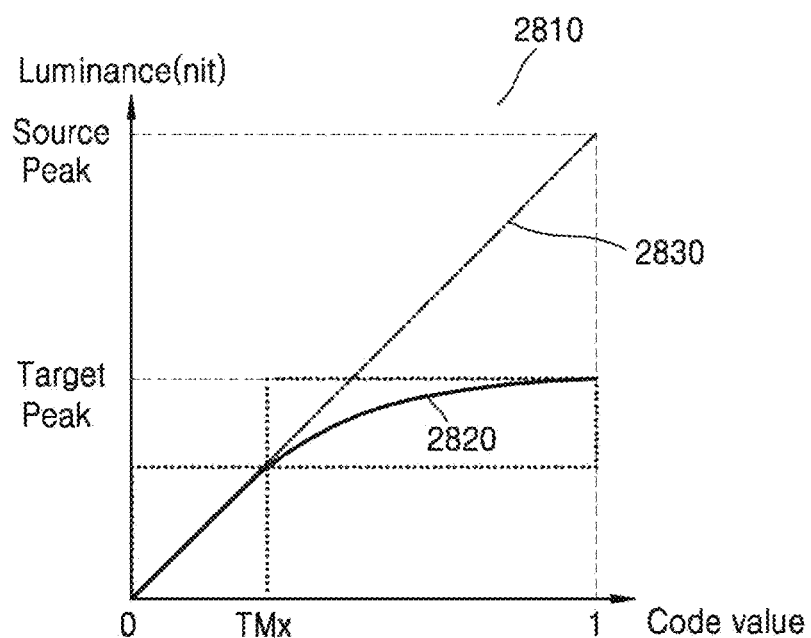
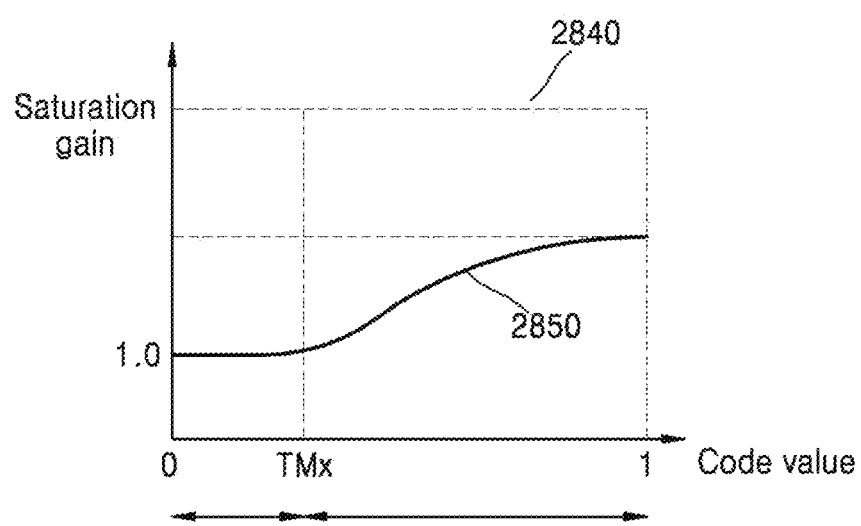

FIG. 32
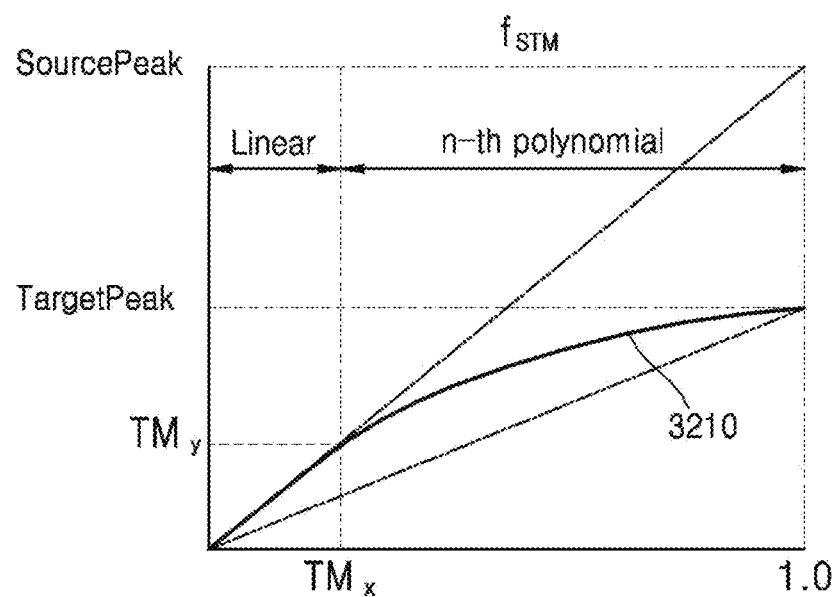
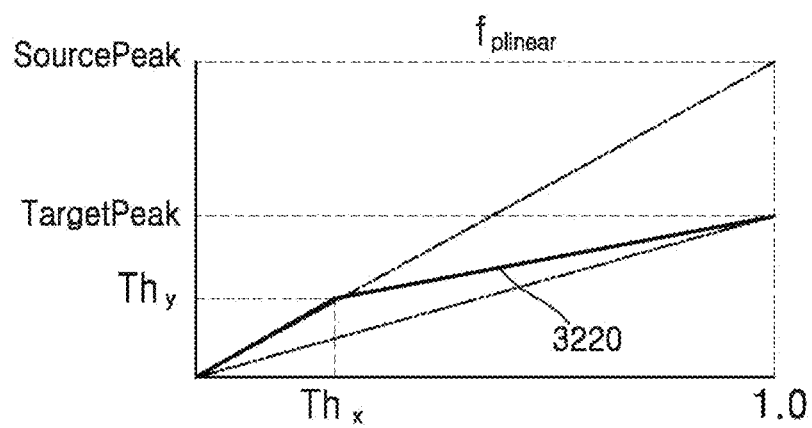

IMAGE PROCESSING APPARATUS AND IMAGE PROCESSING METHOD BASED ON METADATA

TECHNICAL FIELD

Provided are a method and apparatus for correcting a dynamic range of an image based on metadata. Also provided are a method and apparatus for generating metadata for correcting a dynamic range of an image.

BACKGROUND ART

Color gamuts that are a range of colors that can be represented, i.e., reproduced, by display devices may vary according to the performance of the display devices.

Accordingly, when a color gamut of an input image is different from a color gamut of a display device for displaying the input image, color reproduction of the display device for displaying the input image may be improved by appropriately correcting the color gamut of the input image to match the color gamut of the display device.

For example, when the color gamut of the input image is narrower than the color gamut of the display device, the color gamut of the input image needs to be increased in order to improve color reproduction of an image displayed on the display device.

DETAILED DESCRIPTION OF THE INVENTION

Technical Solution

Provided is an image processing apparatus including: a receiver configured to receive at least one from among first metadata indicating a maximum display luminance value of a mastering display according to luminance characteristics of an image and second metadata indicating a maximum display luminance value of a target display according to the luminance characteristics of the image; and a controller configured to divide an encoded image into one or more scenes, obtain luminance characteristics of a current scene comprising an average luminance value of the current scene, and when the first metadata is obtained, obtain the maximum display luminance value of the mastering display according to the luminance characteristics of the current scene based on the first metadata, and when the second metadata is obtained, obtain the maximum display luminance value of the target display according to the luminance characteristics of the current scene based on the second metadata.

Advantageous Effects of the Invention

When tone mapping is performed by considering luminance characteristics of an image, a tone mapped image may more effectively maintain the intention of an original image than when tone mapping is performed without considering the luminance characteristics of the image.

DESCRIPTION OF THE DRAWINGS

FIG. 28 illustrates an operation of correcting a saturation value of an image based on a tone mapped luminance value.

FIG. 32 illustrates a tone mapping function.

BEST MODE

Figure 1:
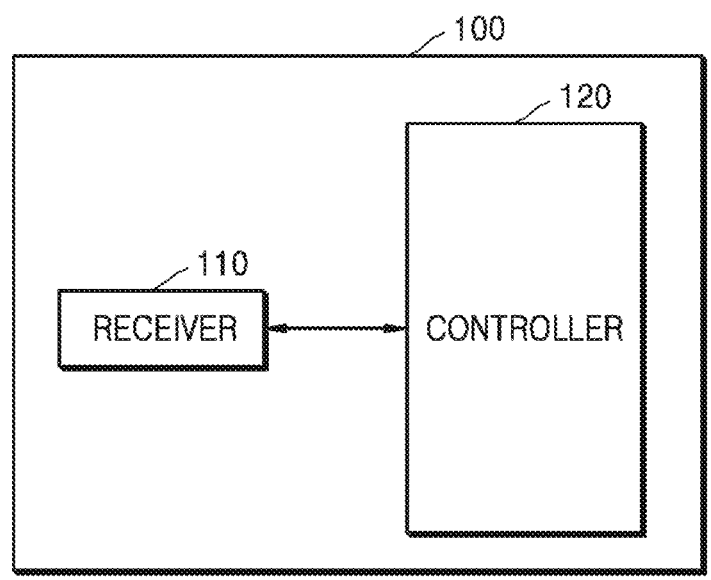
FIG. 1 is a block diagram of an image processing apparatus.

Provided is an image processing apparatus including: a receiver configured to receive at least one from among first metadata indicating a maximum display luminance value of a mastering display according to luminance characteristics of an image and second metadata indicating a maximum display luminance value of a target display according to the luminance characteristics of the image; and a controller configured to divide an encoded image into one or more scenes, obtain luminance characteristics of a current scene including an average luminance value of the current scene, and when the first metadata is obtained, obtain the maximum display luminance value of the mastering display according to the luminance characteristics of the current scene based on the first metadata, and when the second metadata is obtained, obtain the maximum display luminance value of the target display according to the luminance characteristics of the current scene based on the second metadata.

Provided is an image processing apparatus including: a receiver configured to receive metadata indicating a maximum display luminance value of a mastering display according to luminance characteristics of an image; and a controller configured to divide an encoded image into one or more scenes, obtain luminance characteristics of a current scene including an average luminance value of the current scene, and when the metadata is obtained, obtain the maximum display luminance value of the mastering display according to the luminance characteristics of the current scene based on the metadata.

The average luminance value of the current scene may be obtained by using a maximum value from among RGB component values of a pixel included in the current scene.

The maximum display luminance value of the mastering display according to the luminance characteristics of the current scene and the maximum display luminance value of the target display according to the luminance characteristics of the current scene may be different from each other.

The controller may be further configured to determine a central pixel from among pixels of the current scene, maximizing a sum of luminance values of pixels included in a region having a preset size, and to obtain a number of first pixels that are located within a threshold distance from the central pixel and have a luminance value within a threshold range from a luminance value of the central pixel, from among pixels of a frame including the central pixel, wherein the luminance characteristics of the current scene further comprise the obtained number of the first pixels.

The receiver may be further configured to receive a flag indicating whether the luminance characteristics of the current scene are to be obtained, and the controller may be further configured to, when the obtained flag indicates that the luminance characteristics of the current scene are to be obtained, obtain the luminance characteristics of the current scene.

The image processing apparatus may further include a display, wherein the controller is further configured to obtain a tone mapped luminance value of a pixel included in a frame of the current scene by performing tone mapping on an original luminance value of the pixel, based on at least one from among the obtained maximum display luminance value of the mastering display according to the luminance characteristics of the current scene and the obtained maximum display luminance value of the target display according to the luminance characteristics of the current scene, and the display is configured to display the current scene by using the tone mapped luminance value.

When the original luminance value is less than a threshold value, the tone mapped luminance value may be obtained by performing tone mapping according to a first method on the original luminance value, and when the original luminance value is greater than the threshold value, the tone mapped luminance value may be obtained by performing tone mapping according to a second method on the original luminance value.

The tone mapping according to the first method may correspond to a linear function between the original luminance value and the tone mapped luminance value, and the tone mapping according to the second method corresponds to a non-linear function between the original luminance value and the tone mapped luminance value.

When the threshold value is less than a luminance preserving value, the tone mapping according to the first method may bypass the original luminance value.

The controller may be further configured to correct a saturation value of the pixel based on the original luminance value of the pixel and the tone mapped luminance value of the pixel, and the display may be further configured to display the current scene by using the tone mapped luminance value and the corrected saturation value.

The corrected saturation value may be determined based on a ratio between a log scale of the original luminance value and a log scale of the tone mapped luminance value.

When the original luminance value of the pixel is bypassed, the controller may be further configured to bypass a saturation value of the pixel.

Provided is an image processing method including: receiving at least one from among first metadata indicating a maximum display luminance value of a mastering display according to luminance characteristics of an image and second metadata indicating a maximum display luminance value of a target display according to the luminance characteristics of the image; dividing an encoded image into one or more scenes; obtaining luminance characteristics of a current scene including an average luminance value of the current scene; when the first metadata is obtained, obtaining the maximum display luminance value of the mastering display according to the luminance characteristics of the current scene based on the first metadata; and when the second metadata is obtained, obtaining the maximum display luminance value of the target display according to the luminance characteristics of the current scene based on the second metadata.

Provided is an apparatus for generating metadata, the apparatus including: a display configured to display an image including a region with a maximum grayscale value; a sensor configured to, when the display displays the image, measure a luminance value of the region displayed on the display; and a controller configured to generate metadata indicating the measured luminance value according to a pixel area of the region and an average luminance value of the image.

Provided is a method of generating metadata, the method including: displaying an image including a region with a maximum grayscale value; when a display displays the image, measuring a luminance value of the region displayed on the display; and generating metadata indicating the measured luminance value according to a pixel area of the region and an average luminance value of the image.

Provided is a computer-readable recording medium having embodied thereon a program for executing any of the methods.

Mode of the Invention

Embodiments of the present disclosure will now be described more fully with reference to the accompanying drawings for one of ordinary skill in the art to be able to perform the present disclosure without any difficulty. The present disclosure may, however, be embodied in many different forms and should not be construed as being limited to the embodiments set forth herein. Also, parts in the drawings unrelated to the detailed description are omitted to ensure clarity of the present disclosure, and like reference numerals in the specification denote like elements.

The terms used in the present disclosure are those general terms currently widely used in the art in consideration of functions in the present disclosure, but the terms may vary according to the intention of one of ordinary skill in the art, precedents, or new technology in the art. Accordingly, the specific terms used herein should be understood based on the unique meanings thereof and the whole context of the present disclosure.

Also, it will be understood that although the terms "first", "second", etc. may be used herein to describe various elements, these elements should not be limited by these terms. These elements are only used to distinguish one element from another.

Also, the terminology used herein is for the purpose of describing specific embodiments only and is not intended to be limiting of the present disclosure. As used herein, the singular forms "a", "an", and "the" are intended to include the plural forms as well, unless the context clearly indicates otherwise. Also, throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

The use of the terms "a" and "an", and "the" and similar referents in the context of describing the invention (especially in the context of the following claims) are to be construed to cover both the singular and the plural. Also, the steps of all methods described herein can be performed in any suitable order unless otherwise indicated herein or otherwise clearly contradicted by context. The present disclosure is not limited to the described order of the steps.

The expression "in some embodiments" or "in an embodiment" stated throughout the specification does not necessarily refer to the same embodiment.

Some elements of the present disclosure may be described in terms of functional block components and various processing steps. Some or the whole of such functional blocks may be realized by any number of hardware and/or software components configured to perform specified functions. For example, the functional blocks of the present disclosure may be realized by one or more microprocessor or circuit components for performing predetermined functions. Also, for example, the functional blocks of the present disclosure may be implemented with various programming or scripting languages. The functional blocks may be implemented in algorithms executed on one or more processors. Furthermore, the present disclosure could employ any number of conventional techniques for electronics configuration, signal processing, and/or data processing. The words "mechanism", "element", "means", and "configuration" are used broadly and are not limited to mechanical or physical embodiments.

Furthermore, connecting lines, or connectors between elements shown in the various figures presented are intended to represent exemplary functional relationships and/or physical or logical couplings between the elements. It should be noted that many alternative or additional functional relationships, physical connections or logical connections may be present in a practical device.

The present disclosure will now be explained in detail with reference to the attached drawings.

Hereinafter, the term 'image' used herein may refer to a still image of a video or a moving image, that is, a video itself.

In general, the term "dynamic range" may refer to a ratio between a maximum value and a minimum value of a physical measurement. For example, a dynamic range of an image may refer to a brightness ratio between a brightest portion and a darkest portion in the image. Alternatively, a dynamic range of a display device may refer to a ratio between a minimum brightness and a dynamic brightness of light that may be emitted from a screen. In the real world, there is a wide dynamic range from a very low brightness (almost perfect darkness) close to 0 nit to a very high brightness close to sunlight.

As a ratio of a maximum brightness to a minimum brightness in an image increases, the image may be classified into a low dynamic range image, a standard-dynamic range image, and a high dynamic range image. For example, an image with a bit depth of 16 bits or less for RGB components of one pixel may be represented as a low dynamic range image. Also, an image with a bit depth of 32 bits or more for RGB components of one pixel may be represented as not only a low dynamic range image but also a high dynamic range image.

When a display device with a low dynamic range displays a high dynamic range image without correction, the high dynamic range image may be displayed while distorting the original intention of the high dynamic range image.

Tone mapping may refer to a process of changing a dynamic range of an image. In detail, tone mapping may refer to a process of reducing a dynamic range of an image. For example, tone mapping may refer to a process of converting a high dynamic range image into a low dynamic range image. Also, tone mapping may refer to a process of increasing a dynamic range of an image. For example, tone mapping may refer to a process of converting a low dynamic range image into a high dynamic range image.

When a dynamic range of an image is not included in a dynamic range of a display device on which the image is displayed, the display device may maintain the intention of an original image by using a tone mapped image.

General tone mapping is performed by using a maximum luminance value that is displayable by a display device under a desired condition. For example, when a maximum luminance value of a display device is 1000 nits, general tone mapping is performed based on 1000 nits without considering image conditions such as a luminance component, a saturation component, or a run time.

However, when a display device displays an image, a maximum luminance value that is actually displayable by the display device may vary according to luminance characteristics of the image. In detail, a luminance value of a display device may be limited by power consumption of the display device. Accordingly, when power consumption of the display device is not sufficient to display the image according to luminance characteristics of an image, a maximum luminance value that is actually displayable by the display device may be less than a nominal maximum luminance value of the display device.

For example, even assuming that a maximum luminance value of a display device is 1000 nits, when the display device displays an image having predetermined luminance characteristics, an actual maximum luminance that is measurable on the display device may be 800 nits.

Accordingly, when tone mapping is performed by considering luminance characteristics of an image, a tone mapped image may more effectively maintain the intention of an original image than when tone mapping is performed without considering the luminance characteristics of the image.

Hereinafter, for convenience of explanation, a maximum luminance value that is displayable by a display device under a desired condition, irrespective of luminance characteristics of an input image, is referred to as a "desired maximum display luminance value". When the luminance characteristics of the input image satisfy the desired condition, the desired maximum display luminance value of the display device may be measured. A display desired condition may vary according to characteristics of a display device.

For example, a desired condition of a first display device may correspond to a case where the first display device displays an image including one pixel with a maximum brightness and other pixels with a minimum brightness. Also, a desired maximum display luminance value of the first display device may refer to a luminance value of the display device measured in one pixel with the maximum brightness. As the number of pixels with the maximum brightness decreases and the number of pixels with the minimum brightness increases in the image, a maximum display luminance value that is displayable by the first display device may increase.

As another example, a desired condition of a second display device may correspond to a case where the second display device displays an image including pixels all of which have a maximum brightness. As the number of pixels with the maximum brightness in the image increases, a maximum display luminance value that is displayable by the second display device may increase.

When a display device displays an input image, a maximum luminance value that is actually displayable by the display device according to luminance characteristics of the input image is referred to as an "actual maximum display luminance value". The actual maximum display luminance value of the display device may refer to a maximum luminance value that is measurable on the display device, when the display device displays the input image. An actual maximum luminance value of the display device may vary according to the luminance characteristics of the input image.

In the above examples, a desired maximum luminance value of a display device may be 1000 nits, and an actual maximum luminance value of the display device may be 800 nits.

A display device and method using an actual maximum display luminance value according to characteristics of an image will now be explained in detail with reference to the attached drawings.

FIG. 1 is a block diagram of an image processing apparatus 100.

Figure 8:
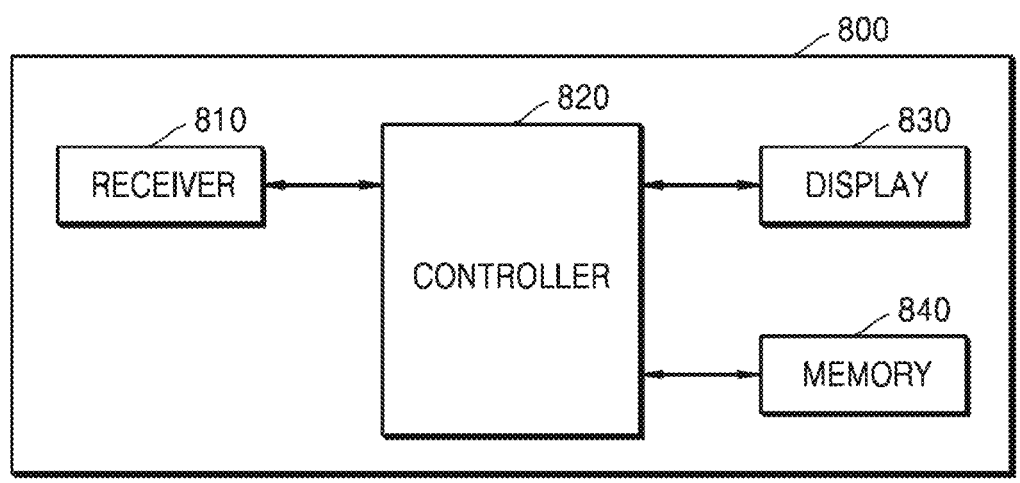
FIG. 8 is a block diagram of another image processing apparatus.

The image processing apparatus 100 may include a receiver 110 and a controller 120. All elements of the image processing apparatus 100 illustrated in FIG. 1 are not essential elements. More elements or fewer elements than those illustrated in FIG. 1 may be included in the image processing apparatus 100. For example, the image processing apparatus 100 may further include a display 830 and a memory 840, as shown in FIG. 8.

The receiver 110 may receive at least one from among first metadata indicating a maximum display luminance value of a mastering display according to luminance characteristics of an image and second metadata indicating maximum display luminance value of a target display according to the luminance characteristics of the image.

The luminance characteristics of the image may refer to a numerical value or an index indicating a temporal/spatial distribution of luminance values of pixels in the image. For example, the luminance characteristics of the image may include a maximum value and a minimum value from among the luminance values of pixels in the image, an average value of the luminance values of the pixels in the image, and a dynamic range. Alternatively, the luminance characteristics of the image may include the amount of change in the luminance values of the pixels in the image.

The first metadata may indicate an actual maximum display luminance value of the mastering display according to the luminance characteristics of the image under various conditions. The first metadata may have a lookup table format. The first metadata may be generated in the mastering display, and the image processing apparatus 100 may receive the first metadata from the mastering display.

The mastering display may refer to a display device used to generate and edit an original image. An image producer may produce and edit the original image based on a dynamic range of the mastering display.

The second metadata may indicate an actual maximum display luminance value of the target display according to the luminance characteristics of the image under various conditions. The second metadata may have a lookup table format. The second metadata may be generated in the target display, and the image processing apparatus 100 may receive the second metadata from the mastering display or the target display.

The target display may refer to a display device that is included in a target system 290 and on which a tone mapped image is displayed. The image producer or the colorist may determine a dynamic range of the target display. The dynamic range of the target display may be included in a dynamic range of a display device that is actually used by a consumer, or may include the dynamic range of the display device that is actually used by the consumer.

The maximum display luminance value of the mastering display according to luminance characteristics of a current scene and the maximum display luminance value of the target display according to the luminance characteristics of the current scene may be different from each other.

Specific examples of the first metadata and the second metadata will be explained below with reference to FIGS. 3 through 7. Also, an apparatus and method of generating the first metadata and the second metadata will be explained below with reference to FIGS. 34 and 35.

The controller 120 may obtain luminance characteristics of an image input to the image processing apparatus 100. For example, the controller 120 may obtain an average luminance value of the input image.

When the receiver 110 obtains the first metadata, the controller 120 may obtain the actual maximum display luminance value of the mastering display according to the luminance characteristics of the input image, based on the first metadata. When the receiver 110 obtains the second metadata, the controller may obtain the actual maximum display luminance value of the target display according to the luminance characteristics of the input image, based on the second metadata.

The controller 120 may change a dynamic range of the input image, based on at least one from among the actual maximum display luminance value of the mastering display according to the luminance characteristics of the input image and the actual maximum display luminance value of the target display according to the luminance characteristics of the input image. For example, the controller 120 may perform tone mapping by converting a high dynamic range of the input image into a low dynamic range. In contrast, the controller 120 may perform tone mapping by converting a low dynamic range of the input image into a high dynamic range.

The controller 120 may include at least one processor, and may control an overall operation of the image processing apparatus 100. The controller 120 will now be explained in detail with reference to FIG. 2.

Figure 2:
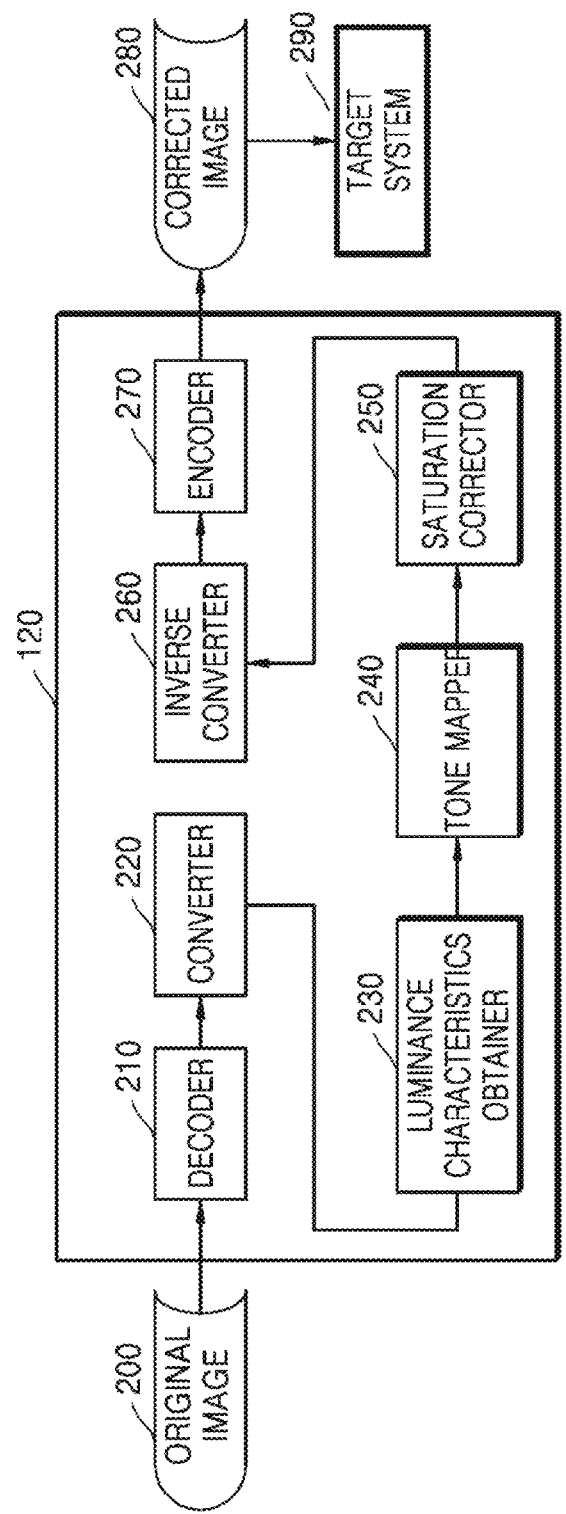
FIG. 2 is a block diagram of a controller included in the image processing apparatus.

FIG. 2 is a block diagram of the controller 120 included in the image processing apparatus 100.

The controller 120 may include a decoder 210, a converter 220, a luminance characteristics obtainer 230, a tone mapper 240, a saturation corrector 250, an inverse converter 260, and an encoder 270. All elements of the controller 120 illustrated in FIG. 2 are not essential elements. More elements or fewer elements than those illustrated in FIG. 2 may be included in the controller 120.

When an original image 200 input to the image processing apparatus 100 is an encoded image, the decoder 210 may decode the original image 200 and may obtain a decoded original image 200. Also, when the decoded original image 200 has a YCbCr format, the decoder 210 may convert the YCbCr format of the decoded original image 200 into an RGB format.

In order to perform tone mapping on the original image 200, the converter 220 may convert an original color space of the original image 200 into a working color space in which tone mapping is performed. For example, the converter 220 may convert x and y color coordinates of a white point and x and y color coordinates of a primary color corresponding to the original color space into x and y color coordinates of a white point and x and y color coordinates of a primary color corresponding to the working color space. If the original color space of the original image 200 is the same as the working color space, the converter 220 of the controller 120 may be omitted.

The luminance characteristics obtainer 230 may obtain luminance characteristics of the original image 200. The luminance characteristics obtainer 230 may divide the original image 200 into predetermined units and may obtain luminance characteristics of each of the predetermined units.

For example, the original image 200 that is called a title or a cut may be divided into one or more scenes, and each of the scenes may be divided into one or more frames. The luminance characteristics obtainer 230 may obtain luminance characteristics each of the scenes of the original image 200. Alternatively, the luminance characteristics obtainer 230 may obtain luminance characteristics for every n frames of the original image 200. In detail, the luminance characteristics obtainer 230 may obtain an average luminance value of the scene. Also, the luminance characteristics obtainer 230 may obtain an average luminance value of n frames.

When the receiver 110 receives first metadata, the luminance characteristics obtainer 230 may obtain an actual maximum display luminance value of a mastering display according to the luminance characteristics of the original image 200, based on the first metadata. For example, the first metadata may indicate the actual maximum display luminance value of the mastering display according to an average luminance value of an image.

When the receiver 110 obtains second metadata, the luminance characteristics obtainer 230 may obtain an actual maximum display luminance value of a target display according to the luminance characteristics of the original image 200. For example, the second metadata may indicate the actual maximum display luminance value of the target display according to the average luminance value of the image.

Operations performed by the luminance characteristics obtainer 230 to obtain the luminance characteristics of the original image 200, to obtain the actual maximum display luminance value of the mastering display, and to obtain the actual maximum display luminance value of the target display will be explained below in detail with reference to FIGS. 10 through 18.

The tone mapper 240 performs tone mapping on the original image 200, based on at least one from among the actual maximum display luminance value of the mastering display according to the luminance characteristics of the original image 200 and the actual maximum display luminance value of the target display according to the luminance characteristics of the original image 200.

When a dynamic range of the mastering display includes a dynamic range of the target display, the tone mapper 240 may reduce a dynamic range of the original image 200. When the dynamic range of the mastering display is included in the dynamic range of the target display, the tone mapper 240 may increase the dynamic range of the original image 200.

The tone mapper 240 may compare the actual maximum display luminance value of the mastering display according to the luminance characteristics of the original image 200 with the actual maximum display luminance value of the target display according to the luminance characteristics of the original image 200, and may determine whether the dynamic range of the mastering display includes the dynamic range of the target display or may be included in the dynamic range of the target display.

An operation performed by the tone mapper 240 to perform tone mapping on the original image 200 will be explained below in detail with reference to FIGS. 19 through 26.

The saturation corrector 250 may correct a saturation value of a tone mapped image. Even when the tone mapper 240 performs tone mapping on the original image 200, the perception of a user on the original image 200 displayed on the mastering display may be different from the perception of the user one the tone mapped image displayed on the target display. The saturation corrector 250 may correct the saturation value of the tone mapped image, in order to form a corrected image 280 closer to the original image 200.

An operation performed by the saturation corrector 250 to perform saturation correction on the tone mapped image will be explained below in detail with reference to FIGS. 27 and 28.

The inverse converter 260 may convert a color space of the corrected image 280 into an original color space of the original image 200. The corrected image 280 output from the saturation corrector 250 may have a working color space in which tone mapping is performed. The inverse converter 260 may convert the color space of the corrected image 280 from the working color space into the original color space of the original image 200. For example, the inverse converter 260 may convert x and y color coordinates of a white point and x and y color coordinates of a primary color corresponding to the working color space into x and y color coordinates of a white point and x and y color coordinates of a primary color corresponding to the original color space.

The encoder 270 may encode the corrected image 280, in order to input the corrected image 280 to the target system 290. The encoded corrected image 280 obtained by the encoder 270 may be input to the target system 290.

The target system 290 may display the corrected image 280. Even when a dynamic range of the corrected image 280 is different from the dynamic range of the original image 200, the corrected image 280 obtained by the controller 120 may effectively maintain the intention of an image producer reflected on the original image 200.

Specific examples of first metadata and second metadata will now be explained with reference to FIGS. 3 through 7.

Figure 3:
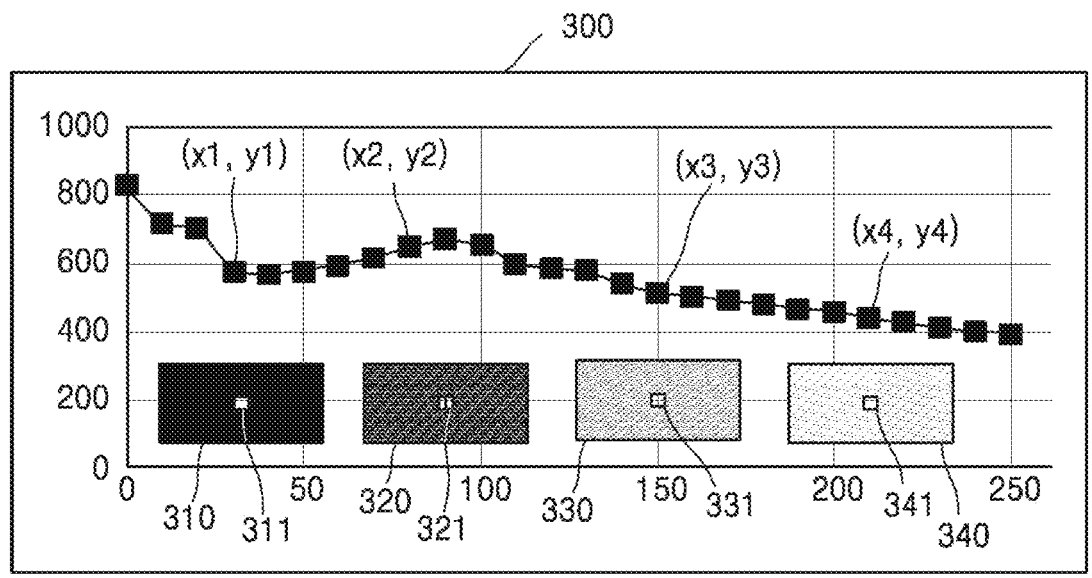
FIGS. 3 through 5 each illustrate a maximum display luminance value of a liquid crystal display (LCD) device according to luminance characteristics of an image.
Figure 4:
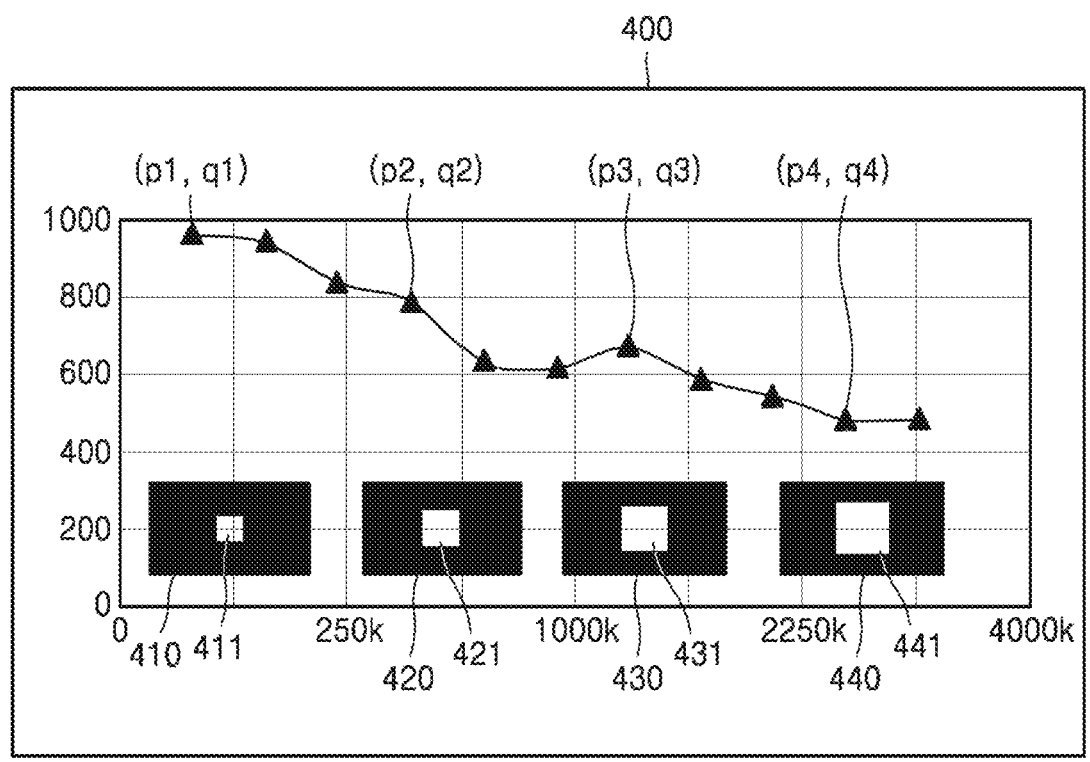
Figure 5:
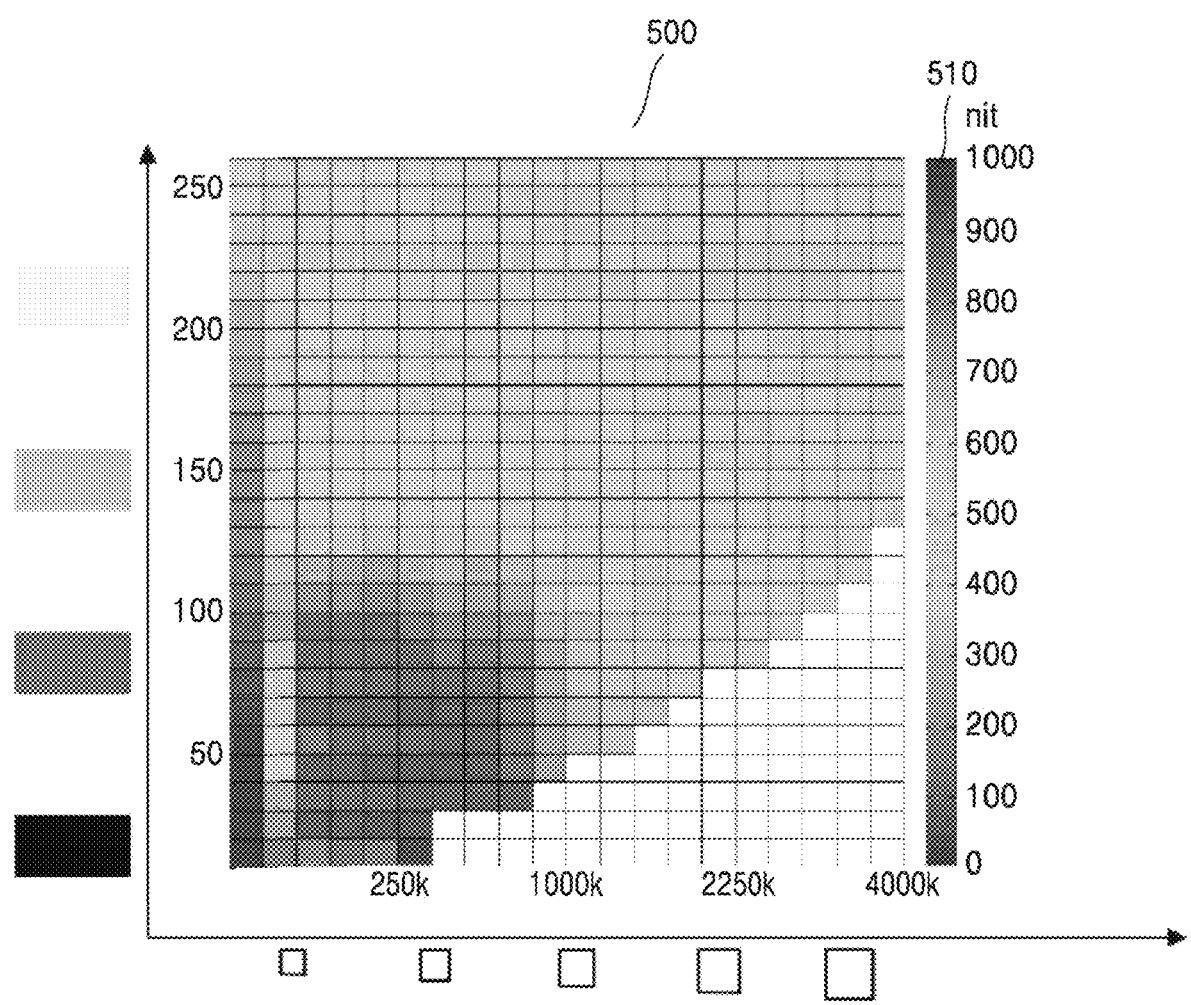

FIGS. 3 through 5 each illustrate a maximum display luminance value of a liquid crystal display (LCD) device according to luminance characteristics of an image.

FIG. 3 illustrates an actual maximum display luminance value of an LCD device according to an average luminance value of an image with a depth of 8 bits. The x-axis of a graph 300 may correspond to the average luminance value or an average grayscale value of the image with a depth of 8 bits. Accordingly, a minimum value of the x-axis of the graph 300 may be 0 and a maximum value of the x-axis of the graph 300 may be 255. The y-axis of the graph 300 may correspond to the actual maximum display luminance value of the LCD device according to the average luminance value of the image. Also, the unit of the y-axis of the graph 300 may be nit.

When the LCD device of FIG. 3 is used as a mastering display, first metadata may include an actual maximum display luminance value of the mastering display according to the average luminance value of the image as in the graph 300. When the LCD device of FIG. 3 is used as a target display, second metadata may include an actual maximum display luminance value of the target display according to the average luminance value of the image as in the graph 300.

When the LCD device displays an image with an average luminance value or a grayscale value corresponding to a point of the x-axis, a maximum luminance value that is displayable by the LCD device may be a value (nit) of the y-axis corresponding to the point of the x-axis in the graph 300.

Referring to the graph 300, when the average luminance value of the image is close to 0, the LCD device may display a desired maximum display luminance value. That is, when the average luminance value of the image is close to 0, the y-axis representing the actual maximum display luminance value of the LCD device may have a maximum value. Also, when the average luminance value of the image is close to 255, the y-axis representing the actual maximum display luminance value of the LCD device may have a minimum value. Also, when the average luminance value of the image is equal to or less than 40, the actual maximum display luminance value of the LCD device may decrease as the average luminance value of the image increases. Also, when the average luminance value of the image is greater than 40 and equal to or less than 90, the actual maximum display luminance value of the LCD device may increase as the average luminance value of the image increases. Also, when the average luminance value of the image is equal to or greater than 90, the actual display luminance value of the LCD device may decrease again as the average luminance value of the image increases. For example, when the average luminance value of the image is 60, the actual maximum display luminance value of the LCD device may be 600 nits. Also, when the average luminance value of the image is 90, the actual maximum display luminance value of the LCD device may be 650 nits.

Images 310, 320, 330, and 340 illustrated in the graph 300 are grayscale images. The images 310, 320, 330, and 340 may respectively include regions 311, 321, 331, and 341 each including at least one pixel with a maximum grayscale value (e.g., 255). The image 310 may include a second pixel located outside the region 311 and having a background grayscale value corresponding to a point x1 of the graph 300. When the LCD device displays the image 310, the actual maximum display luminance value of the LCD device measured in the region 311 may be y1 (nit) corresponding to the grayscale value of the point x1 of the graph 300. The image 320 may include a second pixel located outside the region 321 and having a background grayscale value corresponding to a point x2 of the graph 300. When the LCD device displays the image 320, the actual maximum display luminance value of the LCD device measured in the region 321 may be y2 (nit) corresponding to the grayscale value of the point x2 of the graph 300. The image 330 may include a second pixel located outside the region 331 and having a background grayscale value corresponding to a point x3 of the graph 300. When the LCD device displays the image 330, the actual maximum display luminance value of the LCD device measured in the region 331 may be y3 (nit) corresponding to the grayscale value of the point x3 of the graph 300. The image 340 may include a second pixel located outside the graph 300 and having a background grayscale value corresponding to a point x4 of the graph 300. When the LCD device displays the image 340, the actual maximum display luminance value of the LCD device measured in the region 341 may be y4 (nit) corresponding to the grayscale value of the point x4 of the graph 300. For example, (x1, y1)=(30, 590 nits), (x2, y2)=(80, 630 nits), (x3, y3)=(150, 520 nits), and (x4, y4)=(210, 450 nits).

As described above, when a display device displays an image, a maximum luminance value that is actually displayable by the display device may vary according to luminance characteristics of the image. When power consumption of the display device is not sufficient to display the image according to an average luminance value of the image, an actual maximum display luminance value of the display device may be less than a desired maximum display luminance value of the display device.

A general LCD device or a general organic light-emitting diode (OLED) display device has a limitation in power consumption whereas an advertising display or an advertising electric board may have no limitation in power consumption. Accordingly, a change in an actual maximum display luminance value according to an average luminance value of an image of an advertising display may be less than a change in an actual maximum display luminance value of an average luminance value of an image of a general display device.

FIG. 4 illustrates an actual maximum display luminance value of an LCD device according to an area of a white patch in an image. The x-axis of a graph 400 may correspond to the area of the white patch. The y-axis of the graph 400 may correspond to the actual maximum display luminance value of the LCD device according to the area of the white patch. Also, the unit of the y-axis of the graph 400 may be nit.

When the LCD device of FIG. 4 is used as a mastering display, first metadata may include an actual maximum display luminance value of the mastering display according to the area of the white patch in the image as in the graph 400. When the LCD device of FIG. 4 is used as a target display, second metadata may include an actual maximum display luminance value of the target display according to the area of the white patch in the image as in the graph 400.

When the LCD device displays an image including a white patch with an area corresponding to a point of the x-axis, a maximum luminance value that is displayable by the LCD device may be a value (nit) of the y-axis corresponding to the point of the x-axis in the graph 400.

The white patch may refer to a region including pixels with a maximum luminance value or a maximum grayscale value. For example, a white patch in an image with a depth of 8 bits may include pixels with a grayscale value of 255.

The area of the white patch corresponding to the x-axis of the graph 400 may be the number of pixels included in the white patch. For example, when the white patch has a quadrangular shape, the area of the white patch may be a value obtained by multiplying a horizontal pixel length of the white patch by a vertical pixel length of the white patch. Accordingly, a minimum value of the x-axis of the graph 400 may be 0 and a maximum value of the x-axis of the graph 400 may be the number of pixels included in one frame in the image. For example, a point 250 k of the x-axis of the graph 400 may indicate that 250×1000 pixels are included in the white patch. Alternatively, a point 1000 k of the x-axis of the graph 400 may indicate that 1000×1000 pixels are included in the white patch.

Referring to the graph 400, as the area of the white patch decreases, the LCD device may display a desired maximum display luminance value. That is, as the area of the white patch decreases, the y-axis representing the actual maximum display luminance value of the LCD device may have a maximum value. Also, as the area of the white patch increases, the y-axis representing the actual maximum display luminance value of the LCD device may have a minimum value. Also, assuming that the area of the white patch is equal to or less than about 1000 k, the actual maximum display luminance value of the LCD device may decrease as the area of the white patch increases. Also, assuming that the area of the white patch is equal to or greater than 1000 k and equal to or less than 1260 k, the actual maximum display luminance value of the LCD device may decrease as the area of the white patch increases. Also, assuming that the area of the white patch is equal to or greater than 1260 k, the actual maximum display luminance value of the LCD device may slightly decrease as the area of the white patch increases. For example, when the area of the white patch in the image is 250 k, the actual maximum display luminance value of the LCD device may be 820 nits.

Also, when the area of the white patch in the image is 1000 k, the actual maximum display luminance value of the LCD device may be 620 nits.

Images 410, 420, 430, and 440 of the graph 400 are grayscale images. The images 410, 420, 430, and 440 may respectively include white patches 411, 421, 431, and 441. The image 410 may include the white patch 411 with an area corresponding to a point p1 of the graph 400. When the LCD device displays the image 410, the actual maximum display luminance value of the LCD device measured in the white patch 411 may be q1 (nit) corresponding to the area of the point p1 of the graph 400. When the LCD device displays the image 420, the actual maximum display luminance value of the LCD device measured in the white patch 421 may be q2 (nit) corresponding to the area of a point p2 of the graph 400. When the LCD device displays the image 430, the actual maximum display luminance value of the LCD device measured in the white patch 431 may be q3 (nit) corresponding to the area of a point p3 of the graph 400. When the LCD device displays the image 440, the actual maximum display luminance value of the LCD device measured in the white patch 441 may be q4 (nit) corresponding to the area of a point p4 of the graph 400. For example, (p1, q1)=(40 k, 980 nits), (p2, q2)=(390 k, 800 nits), (p3, q3)=(1260 k, 650 nits), and (p4, q4)=(2560 k, 450 nits).

In general, a backlight unit (BLU) of the LCD device may control a plurality of pixels. The number of pixels controlled by one BLU may increase in an order of a direct-type BLU, a bar-type BLU, and an edge-type BLU. When an LCD device displays an image including a white patch, it may become more difficult to represent the white patch as the number of pixels controlled by one BLU increases. Such characteristics of the BLU may waste power of the LCD device. Accordingly, when power consumption of an LCD device is not sufficient to display an image including a white patch, an actual maximum display luminance value of the LCD device may be less than a desired maximum display luminance value.

In an OLED display device, a BLU may not be used and a light-emitting element and a pixel may be in one-to-one correspondence. Accordingly, a change in an actual maximum display luminance value according to an area of a white patch in an image of an OLED display device may be less than a change in an actual maximum display luminance value according to an area of a white patch in an image of an LCD device.

FIG. 5 illustrates an actual maximum display luminance value of an LCD device according to an area of a white patch in an image with a depth of 8 bits and an average luminance value of the image. The x-axis of a two-dimensional (2D) color map 500 may correspond to the area of the white patch in the image. The y-axis of the 2D color map 500 may correspond to the average luminance value of the image. Also, a color of the 2D color map 500 may correspond to a maximum display luminance value of the LCD device. In detail, the color of the 2D color map 500 may refer to a corresponding luminance value (nit) of a color bar 510.

When the LCD device of FIG. 5 is used as a mastering display, first metadata may include an actual maximum display luminance value of the mastering display according to the area of the white patch in the image and the average luminance value of the image as in the 2D color map 500. When the LCD device of FIG. 5 is used as a target display, second metadata may include an actual maximum display luminance value of the target display according to the area of the white patch in the image and the average luminance value of the image as in the 2D color map 500.

Referring to the 2D color map 500, in general, as the area of the white patch in the image decreases and the average luminance value of the image decreases, the LCD device may display a desired maximum display luminance value. That is, the actual maximum display luminance value of the LCD device in the lower left corner of the 2D color map 500 may have a maximum value. Also, as the area of the white patch in the image increases and the average luminance value of the image increases, the actual maximum display luminance value of the LCD device may have a minimum value. That is, the actual maximum display luminance value of the LCD device in the upper right corner of the 2D color map 500 may have a minimum value.

For example, when the LCD device includes a white patch with an area of 1000 k and displays an image with an average luminance value of 150, an actual maximum display luminance value of the LCD device may be about 600 nits.

Figure 6:
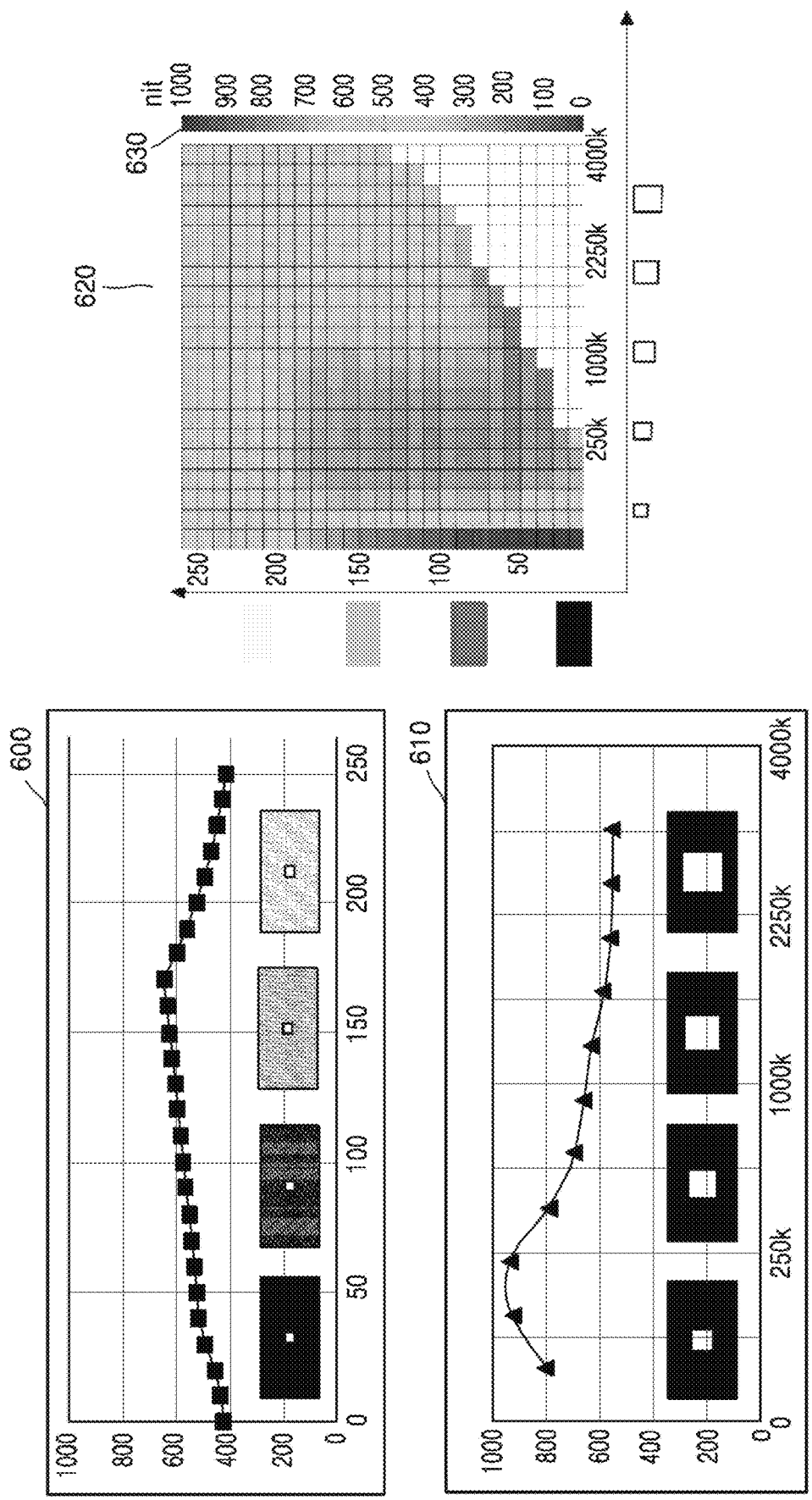
FIG. 6 illustrates maximum display luminance values of another LCD device according to luminance characteristics of an image.

FIG. 6 illustrates maximum display luminance values of another LCD device according to luminance characteristics of an image. In detail, FIG. 6 illustrates a first graph 600 showing a maximum display luminance value of the LCD device according to an average luminance value of an image, a second graph 610 showing a maximum display luminance value of the LCD device according to an area of a white patch in the image, and a 2D color map 620 showing a maximum display luminance value of the LCD device according to the area of the white patch in the image and the average luminance value of the image.

When the LCD device of FIG. 6 is used as a mastering display device, first metadata may include at least one from among an actual maximum display luminance value according to the average luminance value of the image as in the first graph 600, an actual maximum display luminance value according to the area of the white patch in the image as in the second graph 610, and an actual maximum display luminance value according to the average luminance value of the image and the area of the white patch in the image as in the 2D color map 620. When the LCD device of FIG. 6 is used as a target display device, second metadata may include at least one from among an actual maximum display luminance value according to the average luminance value of the image as in the first graph 600, an actual maximum display luminance value according to the area of the white patch in the image as in the second graph 610, and an actual maximum display luminance value according to the average luminance value of the image and the area of the white patch in the image as in the 2D color map 620.

The x-axis of the first graph 600 may correspond to an average luminance value or an average grayscale value of an image with a depth of 8 bits. Accordingly, a minimum value of the x-axis of the first graph 600 may be 0 and a maximum value of the x-axis of the first graph 600 may be 255. The y-axis of the first graph 600 may correspond to an actual maximum display luminance value of the LCD device according to the average luminance value of the image. Also, the unit of the y-axis of the first graph 600 may be nit.

Referring to the first graph 600, assuming that the average luminance value of the image is equal to or less than 170, the actual maximum display luminance value of the LCD device may increase as the average luminance value of the image increases. Assuming that the average luminance value of the image exceeds 170, the actual maximum display luminance value of the LCD device may decrease as the average luminance value of the image increases.

The x-axis of the second graph 610 may correspond to an area of a white patch in an image. Accordingly, a minimum value of the x-axis of the second graph 610 may be 0 and a maximum value of the x-axis of the second graph 610 may be the number of pixels included in one frame in the image. The y-axis of the second graph 610 may correspond to an actual maximum display luminance value of the LCD device according to the area of the white patch in the image. Also, the unit of the y-axis of the second graph 610 may be nit.

Referring to the second graph 610, assuming that the area of the white patch is equal to or less than about 250 k, the actual maximum display luminance value of the LCD device may increase as the area of the white patch increases. Also, assuming that the area of the white patch exceeds about 250 k, the actual maximum display luminance value of the LCD device may decrease as the area of the white patch increases.

The x-axis of the 2D color map 620 may correspond to an area of a white patch in an image. The y-axis of the 2D color map 620 may correspond to an average luminance value of the image. Also, a color of the 2D color map 620 may correspond to a maximum display luminance value of the LCD device. In detail, the color of the 2D color map 620 may refer to a corresponding luminance value (nit) of a color bar 630.

Referring to the 2D color map 620, in general, as an area of a white patch in an image decreases and an average luminance value of the image decreases, an actual maximum display luminance value of the LCD device may have a maximum value. Also, as the area of the white patch in the image increases and the average luminance value of the image increases, the actual maximum display luminance value of the LCD device may have a minimum value.

When the 2D color map 500 of the LCD device of FIG. 5 and the 2D color map 620 of the LCD device of FIG. 6 are compared when each other, the amount of change in an actual maximum display luminance value according to an average luminance value of an image in the LCD device of FIG. 6 may be less than that in the LCD device of FIG. 5.

Figure 7:
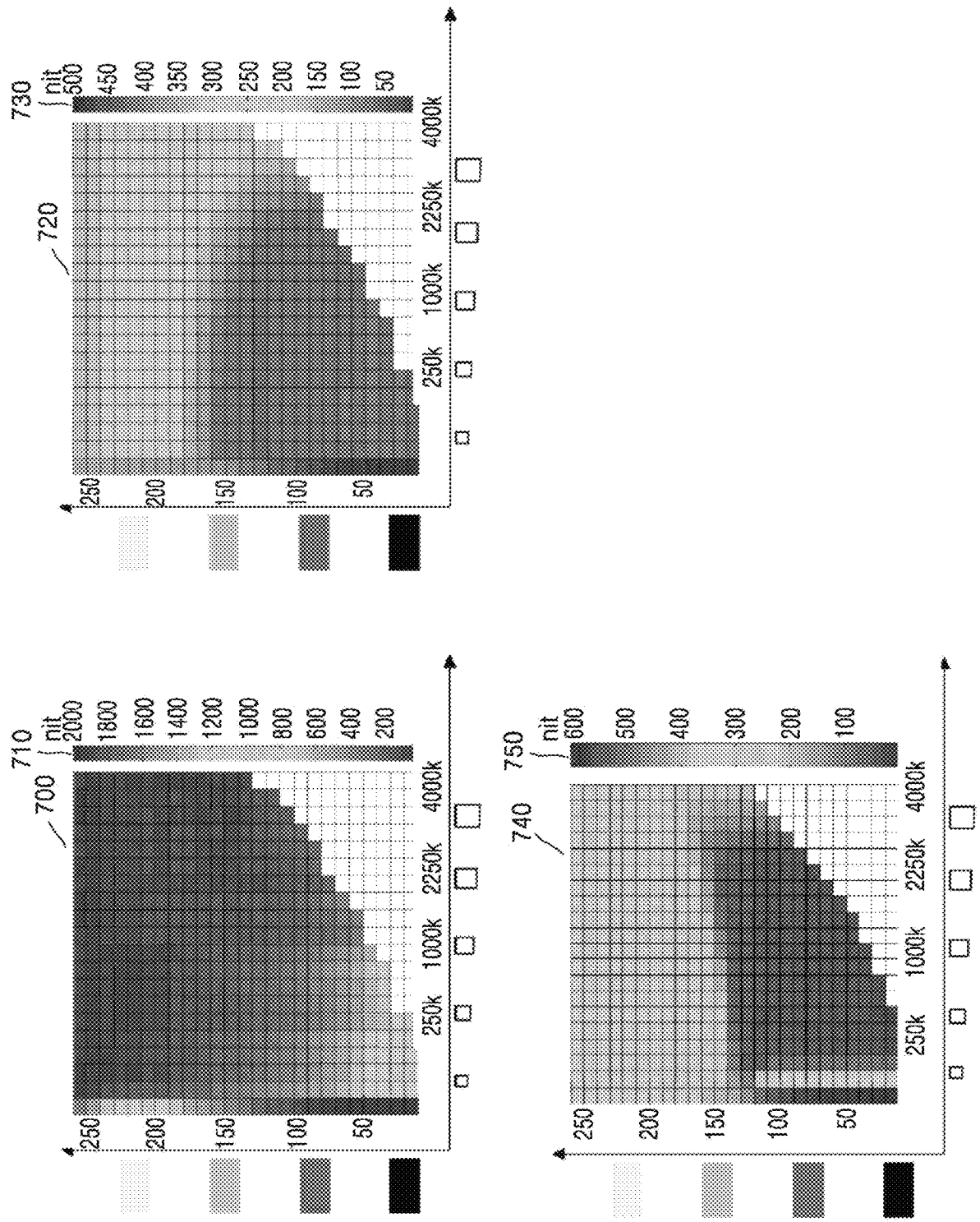
FIG. 7 illustrates maximum display luminance values of various display devices according to luminance characteristics of an image.

FIG. 7 illustrates maximum display luminance values of various display devices according to luminance characteristics of an image.

The x-axis of each of first through third 2D color maps 700, 720, and 740 may correspond to an area of a white patch in an image. The y-axis of each of the first through third 2D color maps 700, 720, and 740 may correspond to an average luminance value of the image. Also, a color of each of the first through third 2D color maps 700, 720, and 740 may correspond to a maximum display luminance value. In detail, the color of each of the first through third 2D color maps 700, 720, and 740 may refer to a corresponding luminance value (nit) of each of color bars 710, 730, and 750.

The first 2D color map 700 illustrates a maximum display luminance value of an advertising display according to luminance characteristics of an image. When the advertising display is used as a mastering display, first metadata may include an actual maximum display luminance value of the mastering display according to the area of the white patch in the image and the average luminance value of the image as in the first 2D color map 700.

Referring to the first 2D color map 700, when the advertising display displays a bright image, an actual maximum display luminance value of the advertising display may be constant even when the luminance characteristics of the image are changed. For example, when the average luminance value of the image is equal to or greater than 150 and the area of the white patch in the image is equal to or greater than 1000 k, the actual maximum display luminance value of the advertising display may be independent from the luminance characteristics of the image. There may be no limitation in power consumption of the advertising display. Accordingly, the actual maximum display luminance value of the advertising display may be less affected by the luminance characteristics of the image than an actual maximum display luminance value of another type of display device. Also, referring to the first 2D color map 700, when the advertising display displays a dark image, the actual maximum display luminance value of the advertising display may vary according to the luminance characteristics of the image.

The second 2D color map 720 illustrates a maximum display luminance value of an OLED display according to luminance characteristics of an image. When the OLED display is used as a mastering display, first metadata may include an actual maximum display luminance value of the mastering display according to the area of the white patch in the image and the average luminance value of the image as in the second 2D color map 720.

Referring to the second 2D color map 720, an actual maximum display luminance value of the OLED display may be constant even when the area of the white patch in the image is changed. For example, when the average luminance value of the image is 200, the actual maximum display luminance value of the OLED display may be independent from the area of the white patch in the image. In the OLED display, a BLU may not be used and a light-emitting element and a pixel may be in one-to-one correspondence. Accordingly, the actual maximum display luminance value of the OLED display may be less affected by the area of the white patch in the image than an actual maximum display luminance value of another type of display device. Also, the actual maximum display luminance value of the OLED display may vary according to the average luminance value of the image.

The third 3D color map 740 illustrates a maximum display luminance value of a conventional reference monitor according to luminance characteristics of an image. The conventional reference monitor may be generally used as a mastering display. When the conventional reference monitor is used as the mastering display, first metadata may include an actual maximum display luminance value of the mastering display according to the area of the white patch in the image and the average luminance value of the image as in the third 3D color map 740.

Referring to the third 2D color map 740, an actual maximum display luminance value of the conventional reference monitor may be less affected by the luminance characteristics of the image than an actual maximum display luminance value of the LCD device of FIG. 5 and the LCD device of FIG. 6. For example, when the average luminance value of the image is less than a predetermined threshold value and the area of the white patch in the image is included in a predetermined range, the actual maximum display luminance value of the conventional reference monitor may be constant.

FIG. 8 is a block diagram of another image processing apparatus 800.

The image processing apparatus 800 of FIG. 8 may further include at least one of the display 830 and the memory 840, when compared to the image processing apparatus 100 of FIG. 1. A receiver 810 and a controller 820 of the image processing apparatus 800 of FIG. 8 may respectively correspond to the receiver 110 and the controller 120 of the image processing apparatus 100 of FIG. 1. Accordingly, the same description as that made with reference to FIG. 1 will not be given.

The display 830 may display an image under the control of the controller 820. For example, the display 830 may display an original image input to the image processing apparatus 800. Also, the display 830 may display a corrected image on which tone mapping and saturation correction have been performed under the control of the controller 820.

A dynamic range of the display 830 may include a dynamic range of a target display of second metadata received by the receiver 810. Alternatively, the dynamic range of the display 830 may be included in the dynamic range of the target display of the second metadata received by the receiver 810.

The display 830 may include at least one from among an LCD, a thin film transistor-liquid crystal display, an OLED display, a flexible display, a three-dimensional (3D) display, and an electrophoretic display.

The memory 840 may store a program for processing and controlling of the controller 820, and may store data input to the image processing apparatus 800 or output from the image processing apparatus 800.

The memory 840 may include at least one type of storage medium from among a flash memory type, a hard disk type, a multimedia card micro type, a card type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Figure 9:
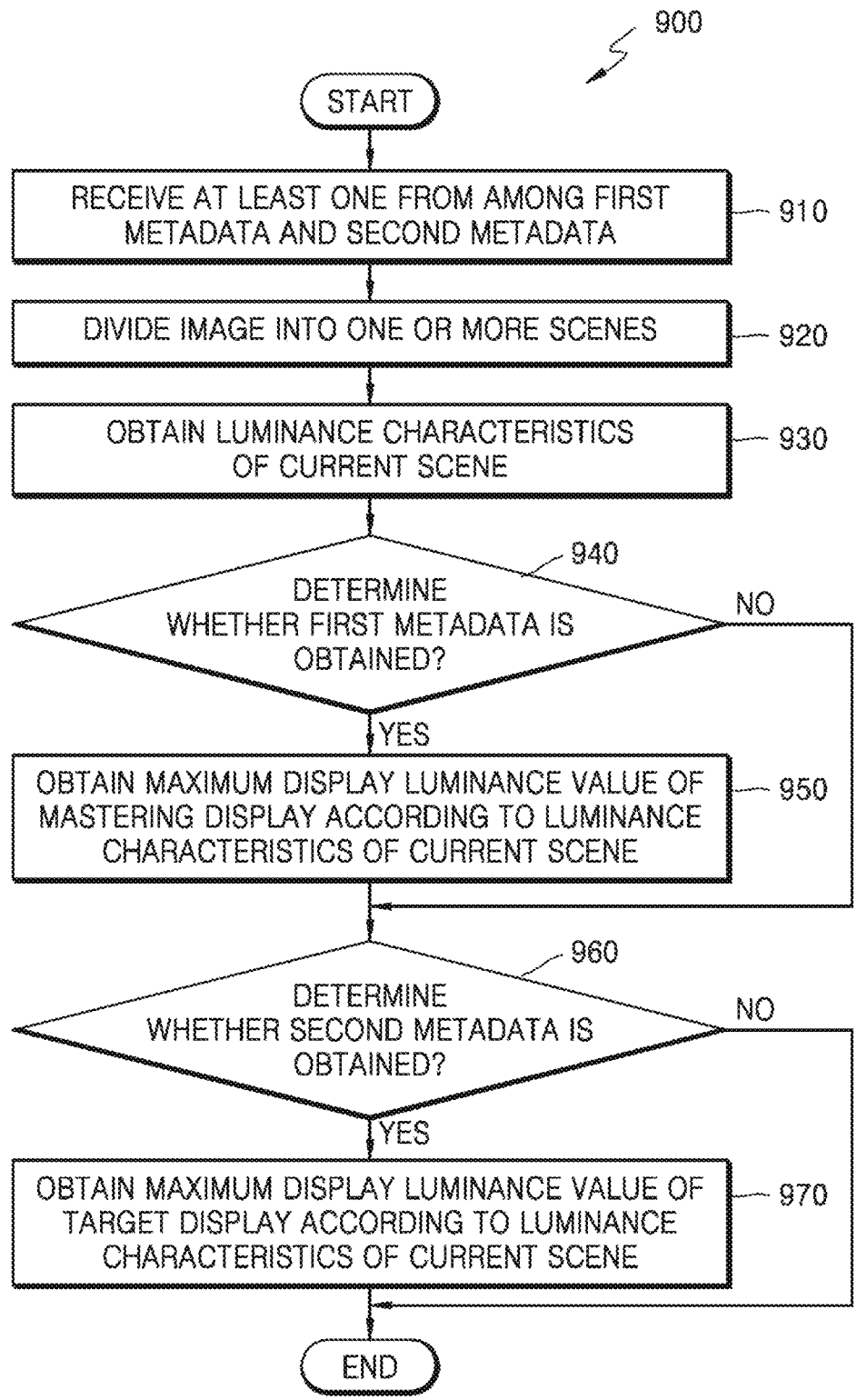
FIG. 9 is a flowchart of an image processing method.

FIG. 9 is a flowchart of an image processing method 900.

In operation 910, the image processing apparatus 100 or 800 receives at least one from among first metadata indicating a maximum display luminance value of a mastering display according to luminance characteristics of an image and second metadata indicating a maximum display luminance value of a target display according to the luminance characteristics of the image. Operation 910 may be performed by the receiver 110 or 810 included in the image processing apparatus 100 or 800.

In operation 920, the image processing apparatus 100 or 800 divides an encoded image into one or more scenes.

In operation 930, the image processing apparatus 100 or 800 obtains luminance characteristics of a current scene including an average luminance value of the current scene.

In operation 940, it is determined whether the image processing apparatus 100 or 800 obtains the first metadata. When it is determined in operation 940 that the image processing apparatus 100 or 800 obtains the first metadata, the image processing method proceeds to operation 950. In operation 950, the image processing apparatus 100 or 800 obtains the maximum display luminance value of the mastering display according to the luminance characteristics of the current scene based on the first metadata.

In operation 960, it is determined whether the image processing apparatus 100 or 800 obtains the second metadata. When it is determined in operation 960 that the image processing apparatus 100 or 800 obtains the second metadata, the image processing method proceeds to operation 970. In operation 970, the image processing apparatus 100 or 800 obtains the maximum display luminance value of the target display according to the luminance characteristics of the current scene based on the second metadata.

Operations 920 through 970 may be performed by the controller 120 or 820 included in the image processing apparatus 100 or 800. In detail, operations 920 through 970 may be performed by the luminance characteristics obtainer 230.

An operation of the luminance characteristics 230 will now be explained in detail with reference to FIGS. 10 through 15.

Figure 10:
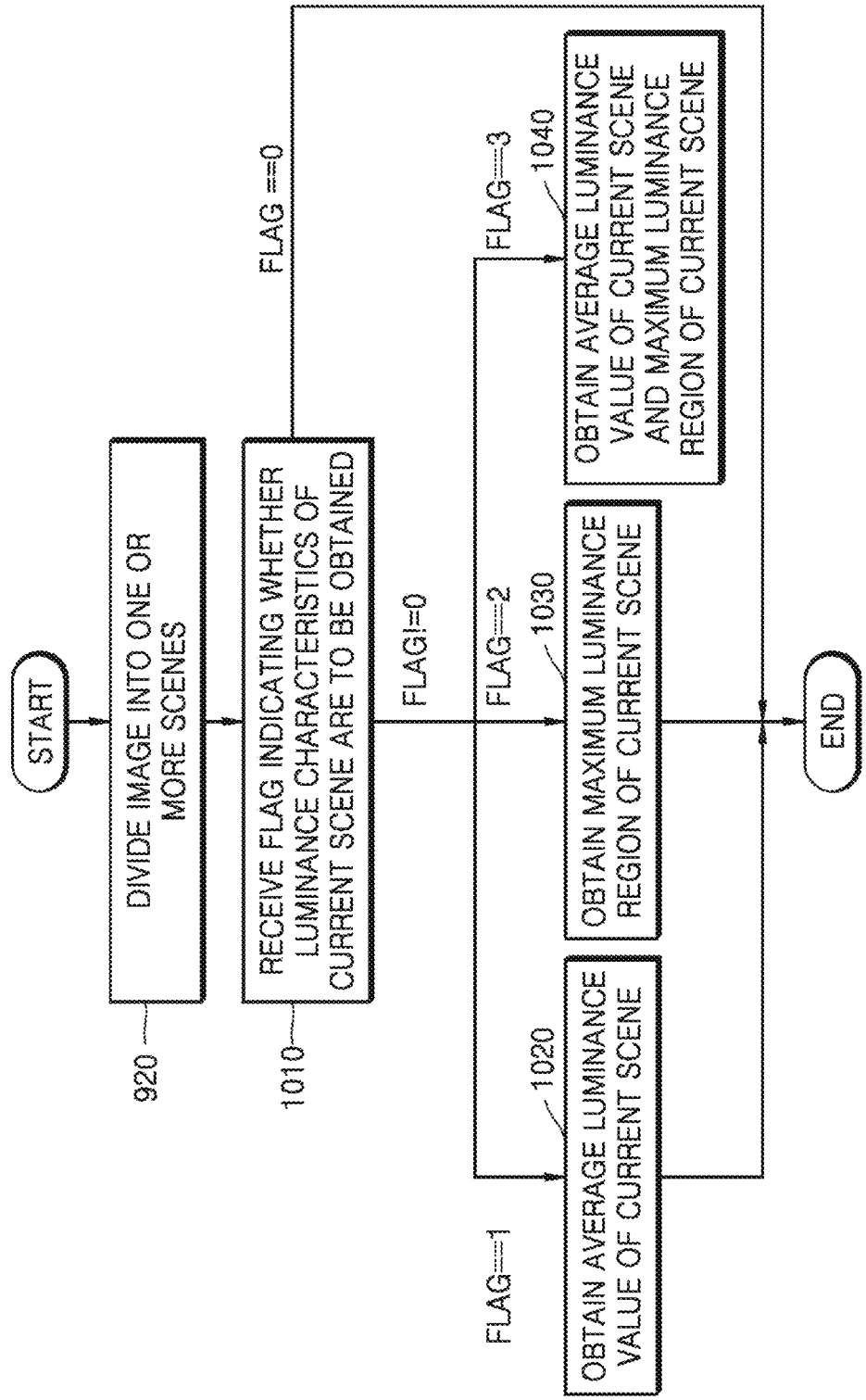
FIG. 10 is a flowchart of a method of obtaining luminance characteristics of an image.

FIG. 10 is a flowchart of a method of obtaining luminance characteristics of an image.

The luminance characteristics obtainer 230 may divide an image input to the image processing apparatus 100 into predetermined units, and may obtain luminance characteristics of each of the predetermined units.

For example, in operation 920, the luminance characteristics obtainer 230 may divide an image into one or more scenes. The luminance characteristics obtainer 230 may obtain luminance characteristics of a current scene from the divided image.

In operation 1010, the receiver 110 may receive a flag indicating whether to obtain the luminance characteristics of the current scene. The receiver 110 may receive the flag from a mastering display. Also, the luminance characteristics obtainer 230 may determine luminance characteristics to be obtained from the current scene, based on the flag.

For example, when a value of the flag is 0, the flag may indicate that the luminance characteristics of the current scene divided from the image are not to be obtained. When the flag indicates that the luminance characteristics of the current scene are not to be obtained, the luminance characteristics obtainer 230 does not obtain the luminance characteristics of the current scene. Also, the image processing apparatus 100 may perform tone mapping on the current scene whose luminance characteristics are not obtained, based on at least one from among a desired maximum display luminance value of the mastering display and a desired maximum display luminance value of a target display.

When a value of the flag is 1, the flag may indicate that an average luminance value of the current scene is to be obtained. When the flag indicates that the average luminance value of the current scene is to be obtained, the method proceeds to operation 1020. In operation 1020, the luminance characteristics obtainer 230 may obtain the average luminance value of the current scene. Also, the image processing apparatus 100 may perform tone mapping on the current scene based on at least one from among an actual maximum display luminance value of the mastering display according to the average luminance value of the current scene and an actual maximum display luminance value of the target display according to the average luminance value of the current scene. An operation performed by the luminance characteristics obtainer 230 to obtain the average luminance value of the current scene will be explained below in detail with reference to FIGS. 11 and 12.

When a value of the flag is 2, the flag may indicate that a maximum luminance region of the current scene is to be obtained. When the flag indicates that the maximum luminance region of the current scene is to be obtained, the method proceeds to operation 1030. In operation 1030, the luminance characteristics obtainer 230 may obtain the maximum luminance region of the current scene. Also, the image processing apparatus 100 may perform tone mapping on the current scene based on at least one from among the actual maximum display luminance value of the mastering display according to an area of the maximum luminance region of the current scene and the actual maximum display luminance value of the target display according to the area of the maximum luminance region of the current scene. The maximum luminance region of the current scene may correspond to a white patch as described above. The maximum luminance region of the current scene and an operation performed by the luminance characteristics obtainer 230 to obtain the maximum luminance region of the current scene will be explained below in detail with reference to FIGS. 13 through 18.

When a value of the flag is 3, the flag may indicate that the average luminance value of the current scene and the maximum luminance region of the current scene are to be obtained. When the flag indicates that the average luminance value of the current scene and the maximum luminance region of the current scene are to be obtained, the method proceeds to operation 1040. In operation 1040, the luminance characteristics obtainer 230 may obtain the average luminance value of the current scene and the maximum luminance region of the current scene. Also, the image processing apparatus 100 may perform tone mapping on the current scene based on at least one from among the actual maximum display luminance value of the mastering display and the actual maximum display luminance value of the target display, according to the average luminance value of the current scene and the area of the maximum luminance region of the current scene.

Figure 11:
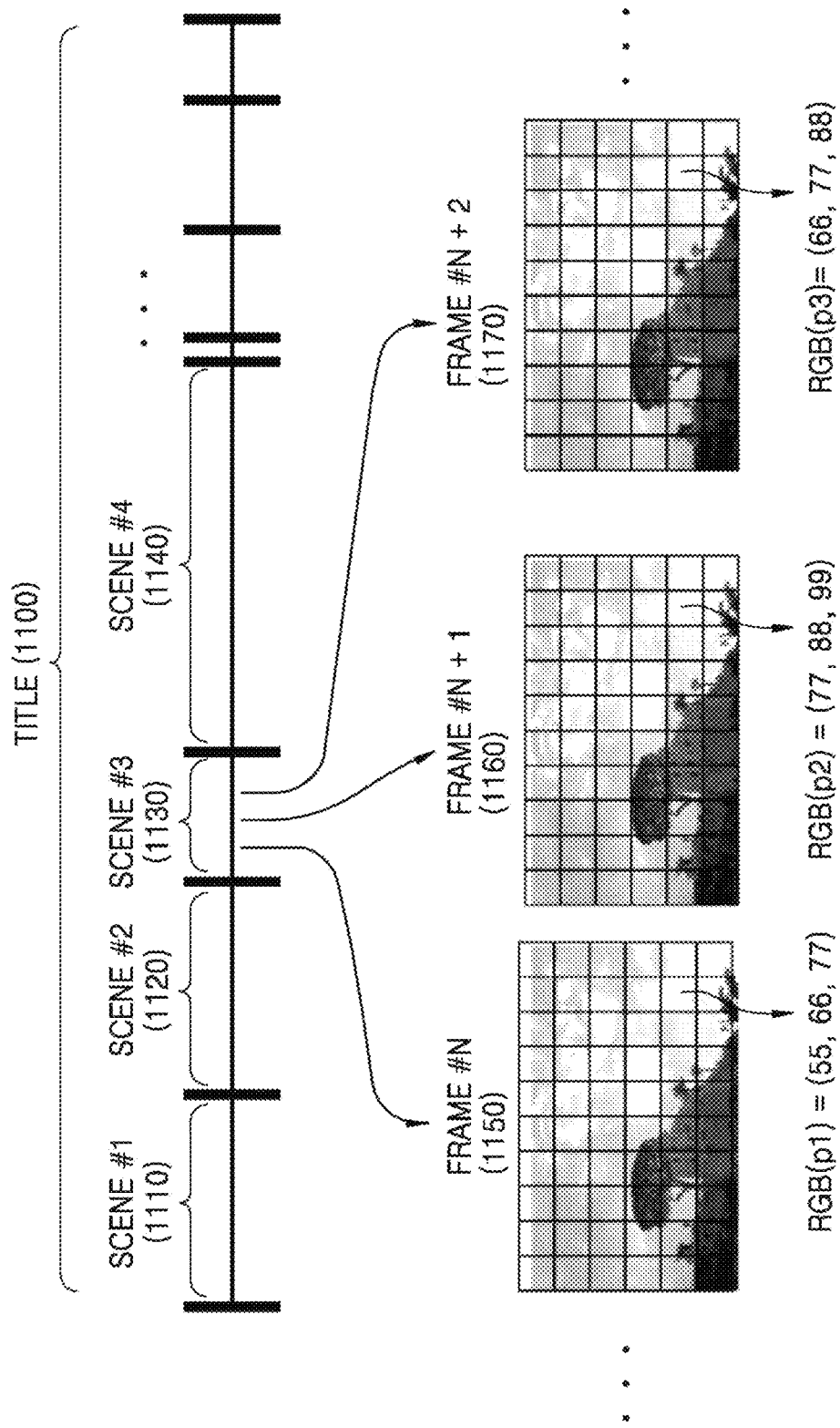
FIG. 11 illustrates an operation of obtaining an average luminance value of an image.

FIG. 11 illustrates an operation of obtaining an average luminance value of an image.

The luminance characteristics obtainer 230 may obtain an average luminance value of a pixel included in a current scene. The average luminance value of the pixel may be obtained by using an average value of RGB component values of the pixel. Alternatively, the average luminance value of the pixel may be obtained by using a Y value from among YCbCr component values of the pixel. The luminance characteristics obtainer 230 may obtain an average luminance value of the current scene by using the average luminance value of the pixel.

For example, a title or an image 1110 with a depth of 8 bits may be divided into a plurality of scenes including a first scene 1110, a second scene 1120, a third scene 1130, and a fourth scene 1140. The third scene 1130 may be divided into a plurality of frames including an $N^{th}$ frame 1150, an $(N+1)^{th}$ frame 1160, and an $(N+2)^{th}$ frame 1170. RGB component values of a pixel p1 included in the $N^{th}$ frame 1150 of the third scene 1130 may be (55, 66, 77). A red component value of the pixel p1 may be 55, a green component value of the pixel p1 may be 66, and a blue component value of the pixel p1 may be 77. Also, an average luminance value of the pixel p1 may be (55+66+77)/3=66. RGB component values of a pixel p2 included in the $(N+1)^{th}$ frame 1160 of the third scene 1130 may be (77, 88, 99). A red component value of the pixel p2 may be 77, a green component value of the pixel p2 may be 88, and a blue component value of the pixel p2 may be 99. Also, an average luminance value of the pixel p2 may be (77+88+99)/3=88. RGB component values of a pixel p3 included in the $(N+2)^{th}$ frame 1170 of the third scene 1130 may be (66, 77, 88). A red component value of the pixel p3 may be 66, a green component value of the pixel p3 may be 77, and a blue component value of the pixel p3 may be 88. Also, an average luminance value of the pixel p3 may be (77+88+99)/3=88. The luminance characteristics obtainer 230 may obtain the average luminance value of the current scene by obtaining average luminance values of all pixels included in the current scene, in addition to the average luminance value of the pixel p1, the average luminance value of the pixel 2, and the average luminance value of the pixel p3, and dividing a sum of the obtained average luminance values by a total number of pixels of the current scene.

The luminance characteristics obtainer 230 may obtain a maximum luminance value of the pixel included in the current scene. The maximum luminance value of the pixel may refer to a maximum value from among RGB component values of the pixel. The luminance characteristics obtainer 230 may obtain the average luminance value of the current scene by using the maximum luminance value of the pixel.

For example, a maximum luminance value of the pixel p1 included in the $N^{th}$ frame 1150 of the third scene 1130 may be 77. A maximum luminance value of the pixel p2 included in the $(N+1)^{th}$ frame 1160 of the third scene 1130 may be 99. A maximum luminance value of the pixel p3 included in the $(N+2)^{th}$ frame 1170 of the third scene 1130 may be 88. The luminance characteristics obtainer 230 may obtain the average luminance value of the current scene by obtaining maximum luminance values of all pixels included in the current scene, in addition to the maximum luminance value of the pixel p1, the maximum luminance value of the pixel p2, and the maximum luminance value of the pixel 3, and dividing a sum of the obtained maximum luminance values by a total number of pixels of the current scene.

The luminance characteristics obtainer 230 may obtain the average luminance value of the current scene by using an intermediate luminance value of the pixel or a minimum luminance value of the pixel, instead of the maximum luminance value of the pixel or the average luminance value of the pixel included in the current scene.

Figure 12:
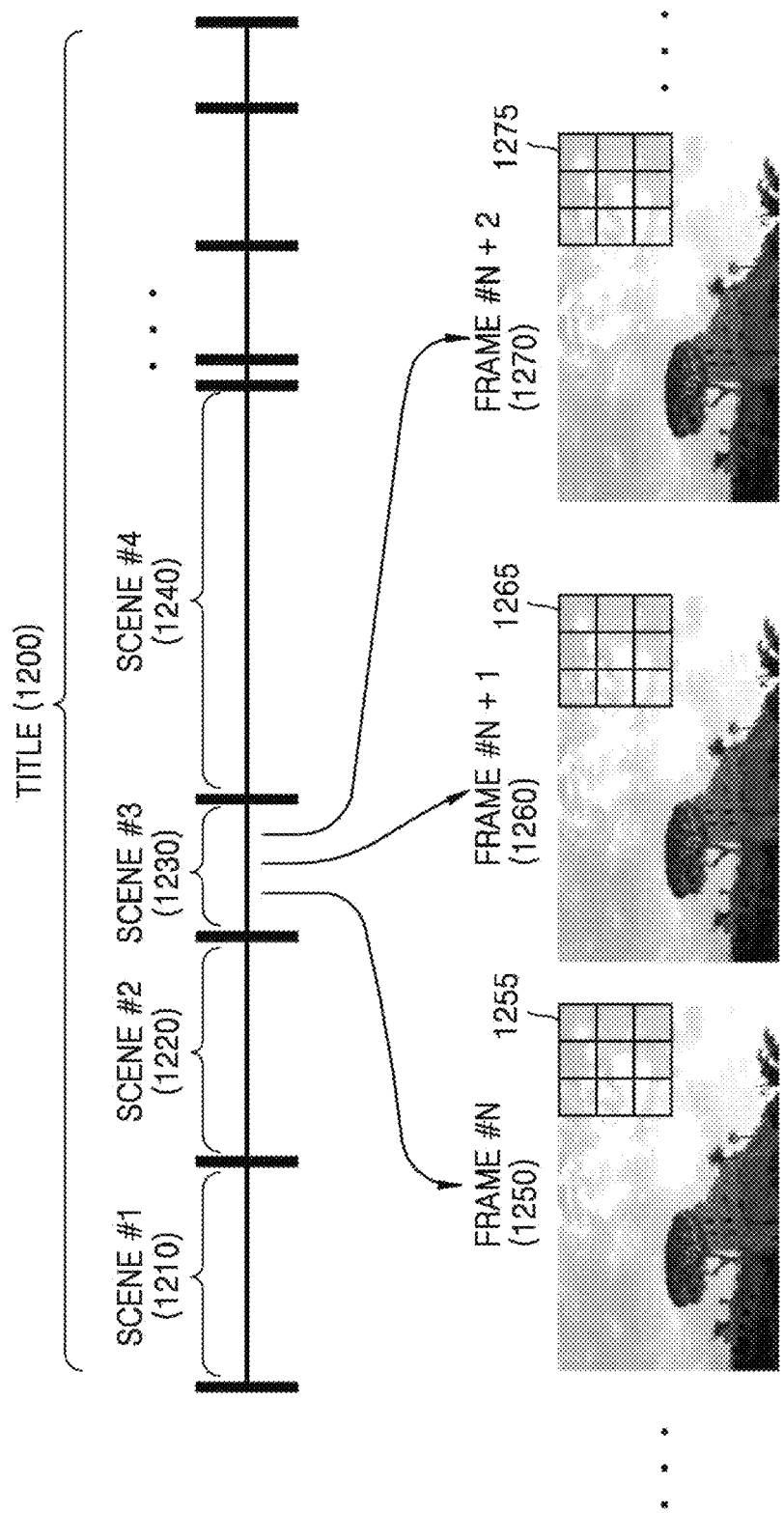
FIG. 12 illustrates another operation of obtaining an average luminance value of an image.

FIG. 12 illustrates another operation of obtaining an average luminance value of an image.

The luminance characteristics obtainer 230 may select some of pixels included in a current scene, and may obtain an average luminance value of the current scene by using average luminance values of the selected pixels. The luminance characteristics obtainer 230 may select pixels located at preset coordinates from among pixels included in the current scene. Also, the luminance characteristics obtainer 230 may select some pixels from among the pixels included in the current scene, based on a size of a frame, positions of a foreground and a background, etc.

As shown in FIG. 12, for example, a title or an image 1200 with a depth of 8 bits may be divided into a plurality of scenes including a first scene 1210, a second scene 1220, a third scene 1230, and a fourth scene 1240. The third scene 1230 may be divided into a plurality of frames including an $N^{th}$ frame 1250, an $(N+1)^{th}$ frame 1260, and an $(N+2)^{th}$ frame 1270. The luminance characteristics obtainer 230 may select pixels located in the upper right corner of a frame, from among pixels of the third scene, in order to obtain an average luminance value of the third scene 1230. The luminance characteristics obtainer 230 may select pixels 1255 located in the upper right corner of the $N^{th}$ frame 1250, pixels 1265 located in the upper right corner of the $(N+1)^{th}$ frame 1260, and pixels 1275 located in the upper right corner of the $(N+2)^{th}$ frame 1260.

The luminance characteristics obtainer 230 may obtain the average luminance value of the current scene by using average luminance values, maximum luminance values, minimum luminance values, or intermediate luminance values of the selected pixels, from among the pixels of the current scene.

Figure 13:
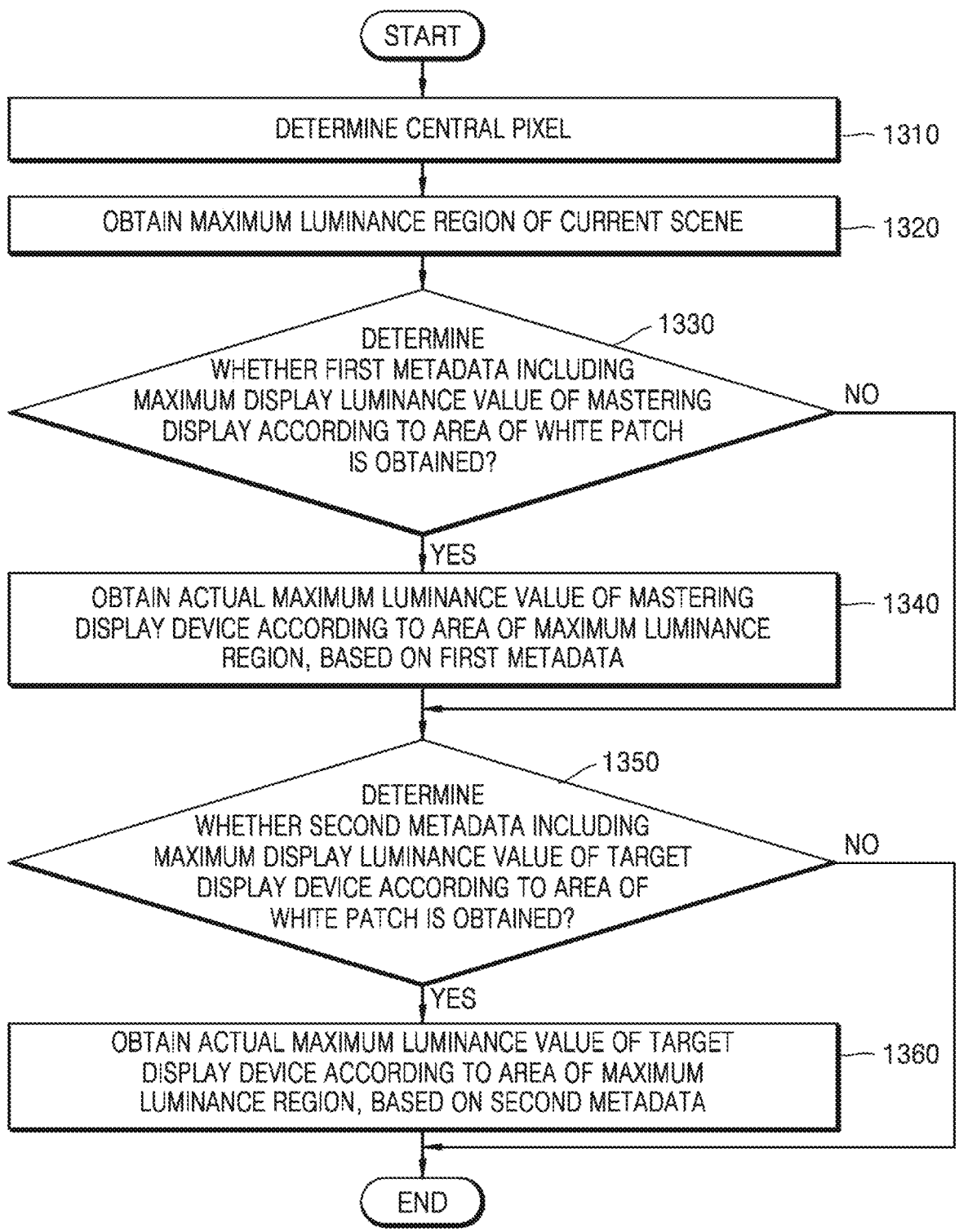
FIG. 13 illustrates an operation of determining a maximum luminance region of an image.

FIG. 13 illustrates an operation of determining a maximum luminance region of an image.

In operation 1310, the luminance characteristics obtainer 230 may determine a central pixel of a maximum luminance region of a current scene. The maximum luminance region of the current scene may refer to a brightest region or a brightest subject in the current scene. For example, the maximum luminance region may include pixels with a maximum luminance value or a maximum grayscale value, like a white patch. Alternatively, the maximum luminance region may include pixels representing a very bright subject such as the sun existing in an image. The luminance characteristics obtainer 230 may first determine the central pixel of the maximum luminance region from among pixels included in the current scene, in order to obtain the maximum luminance region of the current scene. An operation of determining the central pixel of the maximum luminance region will be explained below in detail with reference to FIGS. 14 through 16.

In operation 1320, the luminance characteristics obtainer 230 may obtain the maximum luminance region of the current scene, based on the central pixel determined in operation 1310. Also, the luminance characteristics determiner 230 may obtain an area of the maximum luminance region of the current scene.

A sufficiently bright region in the image input to the image processing apparatus 100 may affect power consumption of a display device. Accordingly, an area of a region with a high luminance value or an area of a subject with a high luminance value in the image may change an actual maximum display luminance value of the display device, like an area of the white patch.

The luminance characteristics obtainer 230 may obtain the actual maximum display luminance value of the display device according to the area of the maximum luminance region of the current scene, by using the actual maximum display luminance value of the display device according to the area of the white patch. For example, the luminance characteristics obtainer 230 may replace the actual maximum display luminance value of the display device according to the area of the maximum luminance region of the current scene with the actual maximum display luminance value of the display device according to the area of the white patch. Alternatively, the luminance characteristics obtainer 230 may obtain the actual maximum display luminance value of the display device according to the area of the maximum luminance region of the current scene, by using a ratio between an average luminance value of the maximum luminance region and a maximum luminance value (e.g., 255 for an image with a depth of 8 bits) of the image.

$$\begin{aligned}&\text{(actual maximum display luminance} \\ &\quad\text{value according to area }(w)\text{ of maximum} \\ &\quad\text{luminance region of current scene} = \\ &\quad\frac{\text{(average luminance value}}{\text{(maximum luminance region)}} \times \\ &\quad\text{(actual maximum display luminance value} \\ &\quad\text{according to area }(w)\text{ of white patch)}\end{aligned}$$

Equation 1

The image input to the image processing apparatus 100 may include or may not include the white patch. Accordingly, even when metadata includes the actual maximum display luminance value of the display device according to the area of the white patch, it may be more reasonable to find the maximum luminance region in the image than to find the white patch in the image. A specific operation performed by the luminance characteristics obtainer 230 to obtain the maximum luminance region will be explained below in detail with reference to FIGS. 17 and 18.

In operation 1330, it is determined whether the receiver 110 obtains first metadata including a maximum display luminance value of a mastering display device according to the area of the white patch. When it is determined in operation 1330 that the receiver obtains the first metadata, the operation of FIG. 13 proceeds to operation 1340. In operation 1340, the luminance characteristics obtainer 230 may obtain an actual maximum luminance value of the mastering display device according to the area of the maximum luminance region, based on the first metadata.

As described above, the luminance characteristics obtainer 230 may estimate the actual maximum luminance value of the mastering display device according to the area of the maximum luminance region based on the first metadata.

For example, the luminance characteristics obtainer 230 may replace the actual maximum display luminance value of the mastering display device according to the area of the maximum luminance region of the current scene with the actual maximum display luminance value of the mastering display device according to the area of the white patch. In detail, the luminance characteristics obtainer 230 may obtain the actual maximum display luminance value of the mastering display device for the maximum luminance region of the current scene with an area of 40 k as 980 nits that is the actual maximum display luminance value of the mastering display device corresponding to the white patch with an area of 40 k in the first metadata.

Alternatively, the luminance characteristics obtainer 230 may obtain the actual maximum display luminance value of the mastering display device according to the area of the maximum luminance region of the current scene by multiplying a ratio between the average luminance value of the maximum luminance region and the maximum luminance value (e.g., 255 for an image with a depth of 8 bits) of the image by the actual maximum display luminance value of the mastering display device according to the area of the white patch.

In operation 1350, it is determined whether the receiver 110 receives second metadata including a maximum display luminance value of a target display device according to the area of the white patch. When it is determined in operation 1350 that the receiver 110 receives the second metadata, the operation of FIG. 13 proceeds to operation 1360. In operation 1360, the luminance characteristics obtainer 230 may obtain an actual maximum luminance value of the target display device according to the area of the maximum luminance region, based on the second metadata.

As described above, the luminance characteristics obtainer 230 may estimate or approximate the actual maximum luminance value of the target display device according to the area of the maximum luminance region based on the second metadata.

For example, the luminance characteristics obtainer 230 may replace the actual maximum display luminance value of the target display device according to the area of the maximum luminance region of the current scene with the actual maximum display luminance value of the target display device according to the area of the white patch. In detail, the luminance characteristics obtainer 230 may obtain the actual maximum display luminance value of the target display device for the maximum luminance region of the current scene with an area of 40 k as 450 nits that is the actual maximum display luminance value of the target display device corresponding to the white patch with an area of 40 k in the second metadata.

Alternatively, the luminance characteristics obtainer 230 may obtain the actual maximum display luminance value of the target display device according to the area of the maximum luminance region of the current scene, by multiplying a ratio between the average luminance value of the maximum luminance region and the maximum luminance value (e.g., 255 for an image with a depth of 8 bits) of the image by the actual maximum display luminance value of the target display device according to the area of the white patch.

Figure 14:
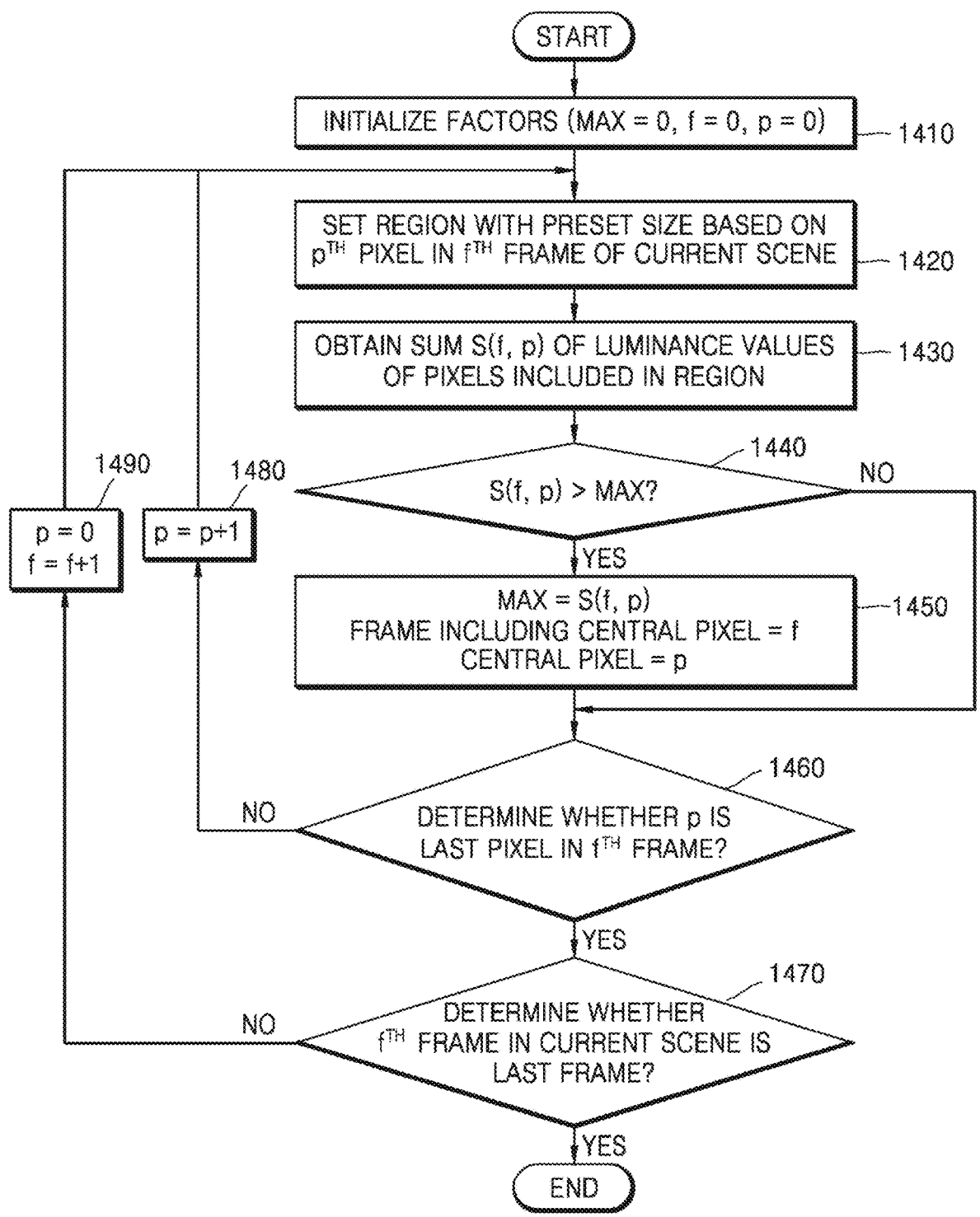
FIG. 14 is a flowchart of a method of obtaining and determining a central pixel of a maximum luminance region of a current scene.

FIG. 14 is a flowchart of a method of obtaining and determining a central pixel of a maximum luminance region of a current scene.

The luminance characteristics obtainer 230 may determine a central pixel p of a region with a preset size that maximizes a sum of luminance values of pixels included in the region from among pixels of a current scene.

For example, the luminance characteristics obtainer 230 may set a first region with a preset size and centered at a first pixel in the current scene, and may obtain a sum of luminance values of pixels in the first region. Also, the luminance characteristics obtainer 230 may set a second region with the same area as that of the first region and centered at a second pixel in the current scene, and may obtain a sum of luminance values of pixels included in the second region. The luminance characteristics obtainer 230 may compare a sum of the luminance values of the first region with a sum of the luminance values of the second region, and may determine the first pixel or the second pixel as a central pixel of the maximum luminance region. When the sum of the luminance values of the first region is greater than the sum of the luminance values of the second region, the central pixel of the maximum luminance region may become the first pixel.

In detail, in operation 1410, the luminance characteristics obtainer 230 may initialize factors for obtaining a central pixel. For example, the luminance characteristics obtainer 230 may initialize f that is a number of a current frame in a current scene to 0, and may initialize p that is a number of a current pixel in the current frame to 0. Also, the luminance characteristics obtainer 230 may initialize a maximum value MAX to 0.

In operation 1420, the luminance characteristics obtainer 230 may set a region with a preset size and a preset shape based on a $p^{th}$ pixel in an $f^{th}$ frame. The size and the shape of the region may be determined based on a size of a frame and positions of a foreground and a background. For example, the luminance characteristics obtainer 230 may change the size and the shape of the region to a square shape, a rectangular shape, or a circular shape. A central pixel of a maximum luminance region may vary according to the size and the shape of the region.

In operation 1430, the luminance characteristics obtainer 230 may obtain S(f, p) of the region set in operation 1420. S(f, p) may refer to a sum of luminance values of pixels included in the region.

In operation 1440, the luminance characteristics obtainer 230 may compare the sum S(f, p) with the maximum value MAX. When it is determined in operation 1440 that the sum S(f, p) is greater than the maximum value MAX, the method proceeds to operation 1450. In operation 1450, the central pixel may be set to p, and a frame including the central pixel may be set to f. Also, the maximum value MAX may be set to the sum S(f, p), In contrast, when it is determined in operation 1440 that the sum S(f, p) is not greater than the maximum value MAX, the central pixel, the frame including the central pixel, and the maximum value MAX may be maintained. The maximum value MAX may refer to a maximum value from among values of the sum S(f, p) obtained so far.

In operation 1460, the luminance characteristics obtainer 230 may determine whether the current pixel p is a last pixel in the $f^{th}$ frame. When it is determined in operation 1460 that the current pixel p is not a last pixel in the $f^{th}$ frame, the luminance characteristics obtainer 230 may repeatedly perform operations 1420 through 1450 based on a next pixel. For example, in operation 1480, the luminance characteristics obtainer 230 may increase p by 1.

In operation 1470, the luminance characteristics obtainer 230 may determine whether the current frame f is a last frame in the current scene. When it is determined in operation 1470 that the current frame f is not a last frame in the current scene, the luminance characteristics obtainer 230 may repeatedly perform operations 1420 through 1450 based on a next frame. For example, in operation 1490, the luminance characteristics obtainer 230 may increase f by 1.

Through operations 1410 through 1490, the luminance characteristics obtainer 230 may determine the central pixel of the maximum luminance region.

Figure 15:
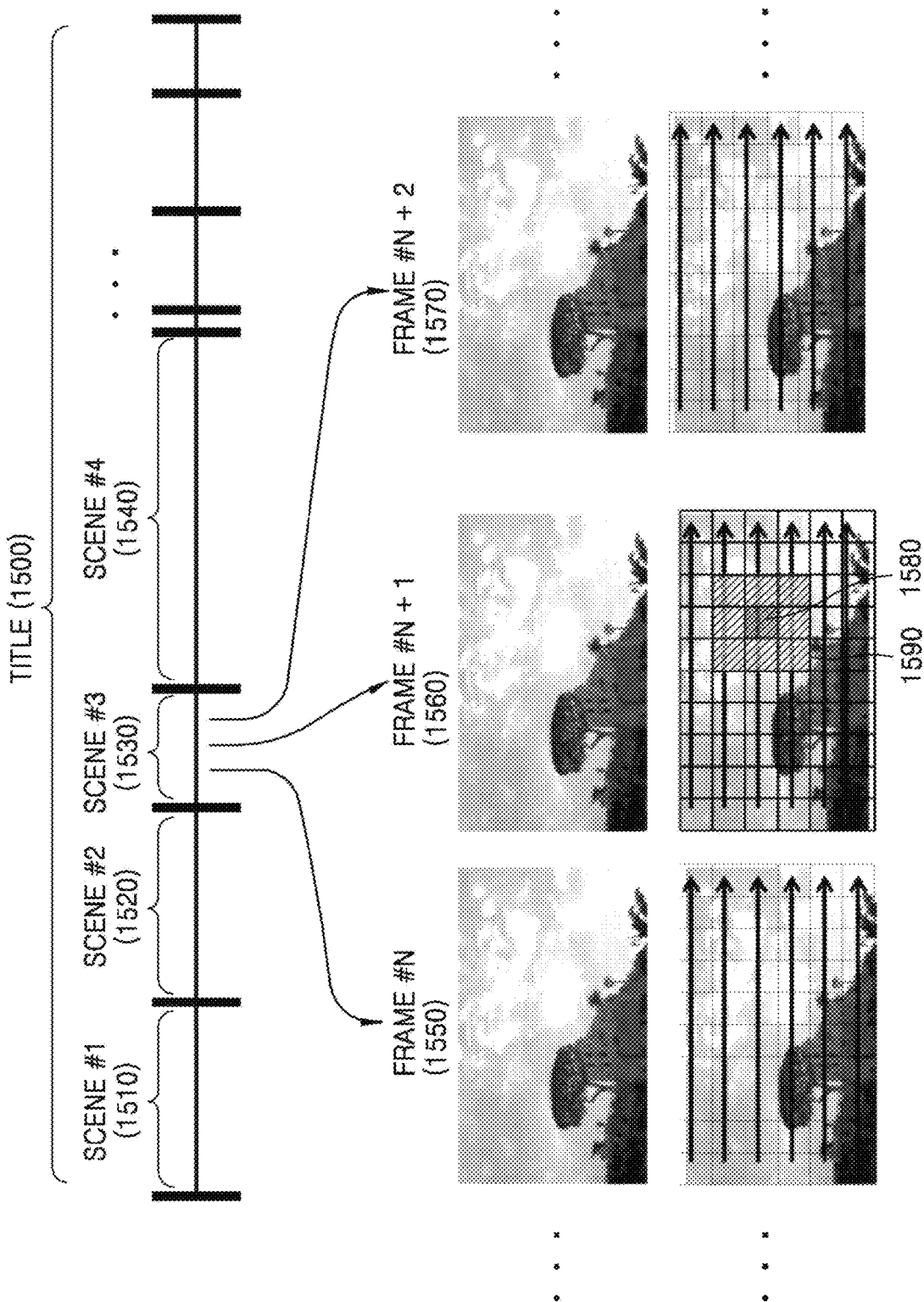
FIG. 15 illustrates an operation of determining a central pixel of a maximum luminance region of a current scene.

FIG. 15 illustrates an operation of determining a central pixel of a maximum luminance region of a current scene.

For example, a title or an image 1500 with a depth of 8 bits may be divided into a plurality of scenes including a first scene 1510, a second scene 1520, a third scene 1530, and a fourth scene 1540. The third scene 1530 may be divided into a plurality of frames including an $N^{th}$ frame 1550, an $(N+1)^{th}$ frame 1560, and an $(N+2)^{th}$ frame 1570.

For example, a central pixel of a maximum luminance region of the third scene 1530 may be a pixel 1580 corresponding to the center of the sun existing in the $(N+1)^{th}$ frame. The luminance characteristics obtainer 230 may set a region 1590 with horizontal and vertical lengths of n pixels, and may determine a position that maximizes a sum of luminance values of pixels included in the region 1590 by moving the region 1590 in a current scene. As shown in FIG. 15, the luminance characteristics obtainer 230 may horizontally move the region 1590.

In order to determine the central pixel, the luminance characteristics obtainer 230 may move the region 1590 in any of various directions such as a horizontal direction, a vertical direction, or a diagonal direction in the third scene. A movement direction of the region 1590 may be determined based on a size of a frame. For example, when a horizontal length of the frame is greater than a vertical length, the movement direction of the region 1592 may be the horizontal direction. Alternatively, when the vertical length of the frame is greater than the horizontal direction, the movement direction of the region 1590 may be the vertical direction. Alternatively, the luminance characteristics obtainer 230 may determine the movement direction of the region 1590 based on positions of a foreground and a background in the frame.

Figure 16:
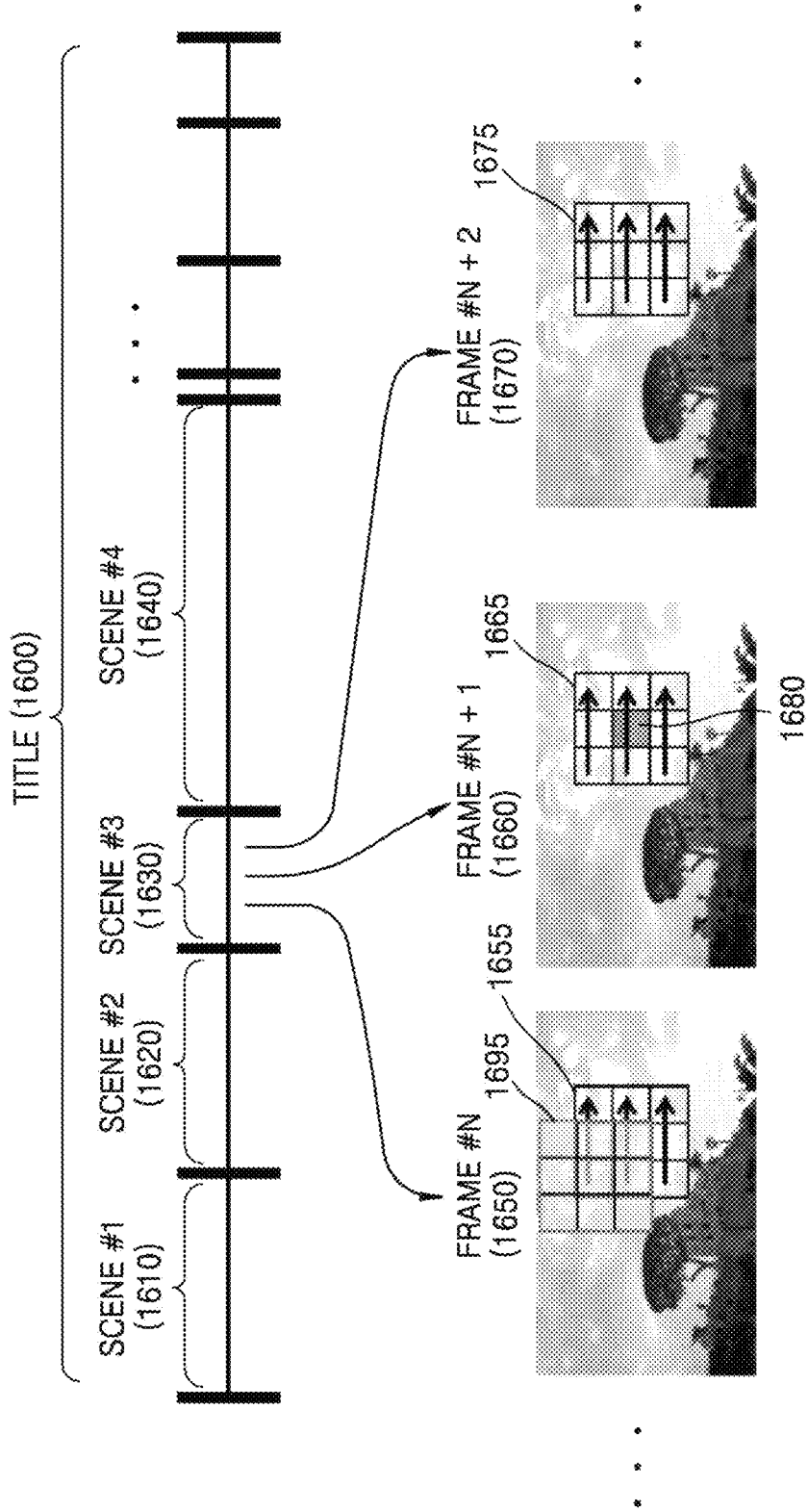
FIG. 16 illustrates another operation of determining a central pixel of a maximum luminance region of a current scene.

FIG. 16 illustrates another operation of determining a central pixel of a maximum luminance region of a current scene.

The luminance characteristics obtainer 230 may select some from among pixels included in a current scene, and may determine a central pixel of a maximum luminance region from among the selected pixels. The luminance characteristics obtainer 230 may select pixels located at preset coordinates from among the pixels included in the current scene. Also, the luminance characteristics obtainer 230 may select some pixels from among the pixels included in the current scene, based on a size of a frame, positions of a foreground and a background, etc.

As shown in FIG. 16, for example, a title or an image 1600 may be divided into a plurality of scenes including a first scene 1610, a second scene 1620, a third scene 1630, and a fourth scene 1640. The third scene 1630 may be divided into a plurality of frames including an $N^{th}$ frame 1650, an $(N+1)^{th}$ frame 1660, and an $(N+2)^{th}$ frame 1670. In order to obtain an average luminance value of the third scene 1630, the luminance characteristics obtainer 230 may select pixels located in the upper right corner in a frame, from among pixels of the third scene 1630. The luminance characteristics obtainer 230 may select pixels 1655 located in the upper right corner of the $N^{th}$ frame 1650, pixels 1665 located in the upper right corner of the $(N+1)^{th}$ frame 1660, and pixels 1675 located in the upper right corner of the $(N+2)^{th}$ frame 1670.

For example, a central pixel of a maximum luminance region of the third scene 1630 may be a pixel 1680 corresponding to the center of the sun existing in the $(N+1)^{th}$ frame. The luminance characteristics obtainer 230 may set a region 1695 corresponding to horizontal and vertical lengths of n pixels, and may determine a position that maximizes a sum of luminance values of pixels included in the region 1695 by moving a central point of the region in the selected pixels.

Figure 17:
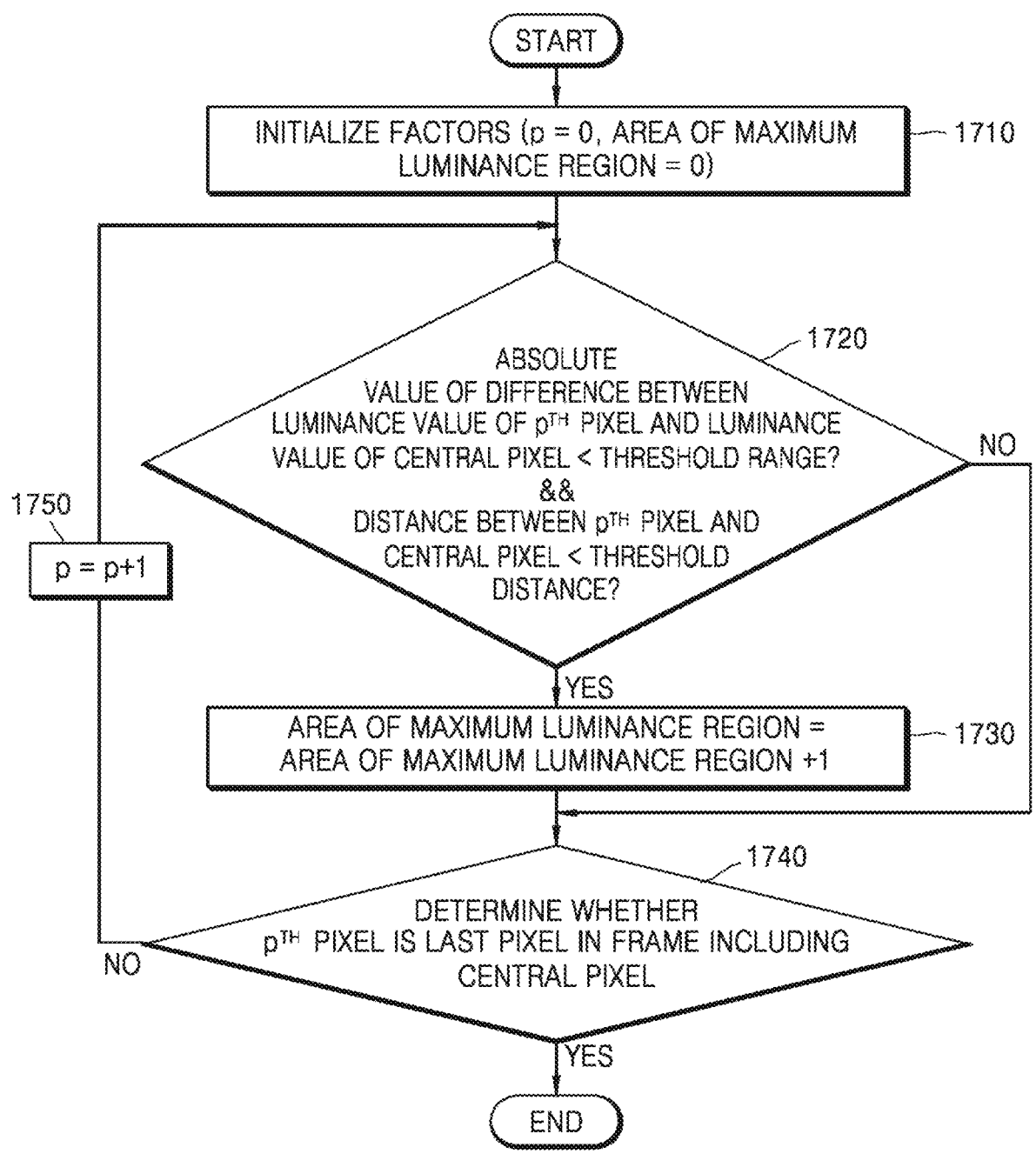
FIG. 17 is a flowchart of a method of obtaining a maximum luminance region of a current scene.

FIG. 17 is a flowchart of a method of obtaining a maximum luminance region of a current scene.

The luminance characteristics obtainer 230 may obtain an area of a maximum luminance region based on a position of a central pixel and a luminance value of the central pixel. For example, the luminance characteristics obtainer 230 may obtain the number of first pixels that are located within a threshold distance from the central pixel and have a luminance value within a threshold range from the luminance value of the central pixel, from among pixels of a frame including the central pixel. The number of the first pixels may become an area of the maximum luminance region.

In detail, in operation 1710, the luminance characteristics obtainer 230 may initialize factors for obtaining a maximum luminance region. For example, the luminance characteristics obtainer 230 may initialize p that is a number of a current pixel in a frame including a central pixel to 0 and may initialize an area of the maximum luminance region to 0.

In operation 1720, the luminance characteristics obtainer 230 may determine whether an absolute value of a difference between a luminance value of a $p^{th}$ pixel and a luminance value of the central pixel is within a threshold range. Also, the luminance characteristics obtainer 230 may determine whether a distance between the $p^{th}$ pixel and the central pixel is within a threshold distance.

When it is determined in operation 1710 that the absolute value is within the threshold range and the distance is within the threshold distance, the luminance characteristics obtainer 230 may include the $p^{th}$ pixel in the maximum luminance region. Accordingly, the luminance characteristics obtainer 230 may increase the area of the maximum luminance region by 1 in operation 1730.

In contrast, when the absolute value exceeds the threshold range or the distance is greater than the threshold distance, the $p^{th}$ pixel may be excluded from the maximum luminance region. Accordingly, the luminance characteristics obtainer 230 may maintain the area of the maximum luminance region.

In operation 1740, the luminance characteristics obtainer 230 may determine whether the $p^{th}$ pixel that is a current pixel is a last pixel in the frame including the central pixel. When it is determined in operation 1740 that the $p^{th}$ pixel that is the current pixel is not a last pixel, the luminance characteristics obtainer 230 may repeatedly perform operations 1720 and 1730 based on a next pixel. For example, in operation 1750, the luminance characteristics obtainer 230 may increase p by 1.

Through operations 1710 through 1740, the luminance characteristics obtainer 230 may select first pixels included in the maximum luminance region, from among pixels in the frame including the central pixel. Also, the number of the selected first pixels may become the area of the maximum luminance region.

Figure 18:
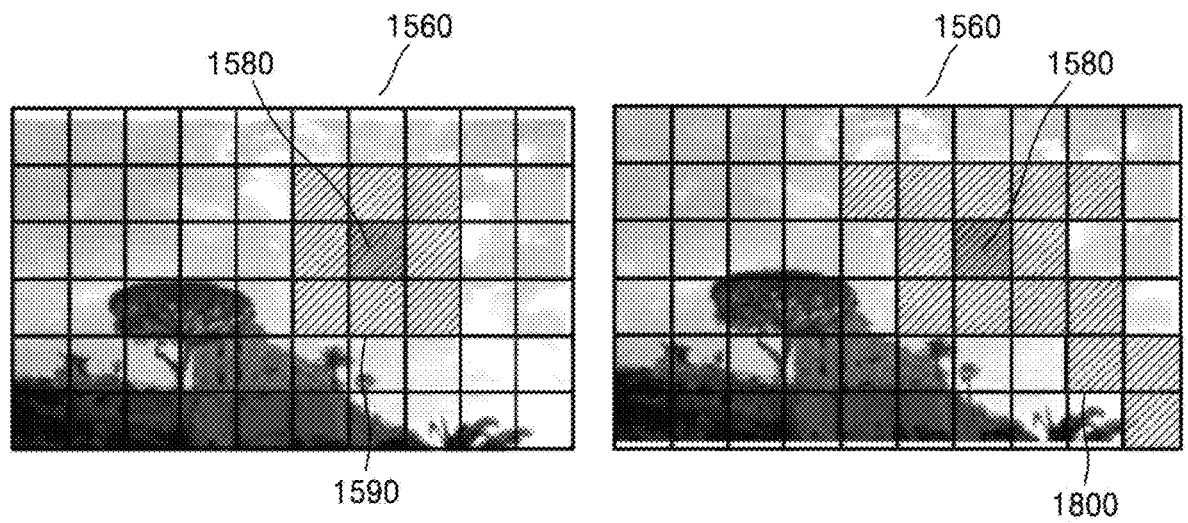
FIG. 18 illustrates an operation of obtaining a maximum luminance region of a current scene.

FIG. 18 illustrates an operation of obtaining a maximum luminance region of a current scene.

FIG. 18 illustrates the region 1590 with a preset size and a preset shape for selecting a central pixel of FIG. 15 and a maximum luminance region 1800.

By using the method described with reference to FIGS. 14 through 16, the luminance characteristics obtainer 230 may determine the central pixel 1580 of a maximum luminance region from among pixels of a current scene. For example, the luminance characteristics obtainer 230 may determine first pixels that have a luminance value whose difference from a luminance value of the central pixel is equal to or less than a threshold range and that are located within a threshold distance from the central pixel, from among pixels in the $(N+1)^{th}$ frame 1560 including the central pixel of FIG. 15. Also, the number of the first pixels may become an area of the maximum luminance region 1800.

The maximum luminance region 1800 and the region 1590 for selecting the central pixel may be independent from each other. The maximum luminance region 1800 may include or may not include the region 1590 for selecting the central pixel. As described above, a size and a shape of the region 1590 for selecting the central pixel may be set based on a size of a frame, positions of a foreground and a background, etc. Also, a shape and an area of the maximum luminance region 1800 may be set based on a pixel value of the central pixel and a position of the central pixel.

Figure 19:
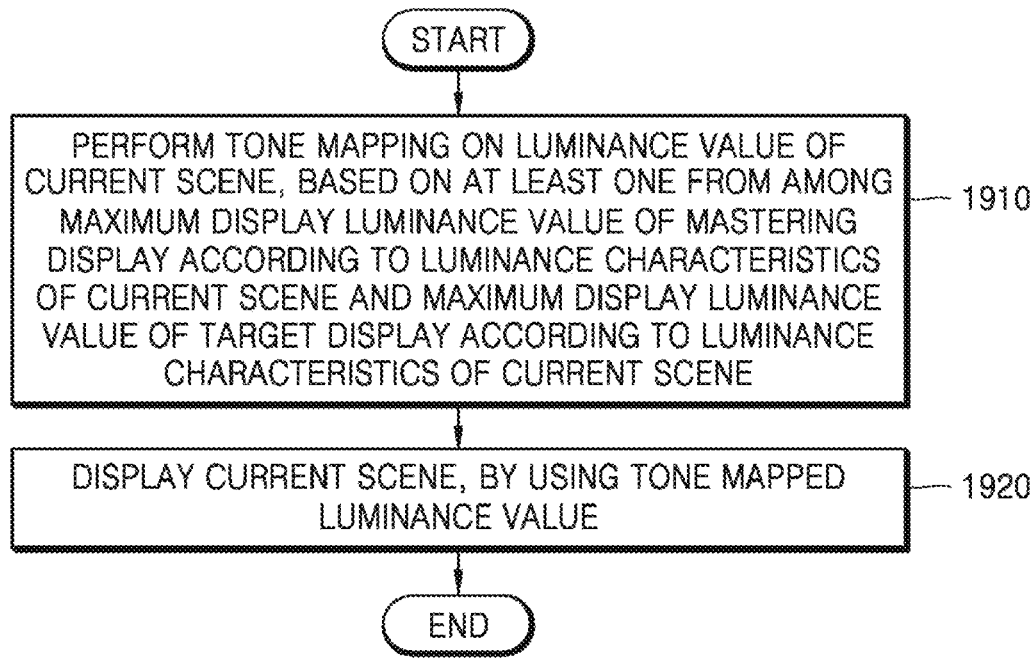
FIG. 19 is a flowchart of a method of performing tone mapping based on luminance characteristics of an image.

FIG. 19 is a flowchart of a method of performing tone mapping based on luminance characteristics of an image.

In operation 1910, the tone mapper 240 may perform tone mapping on a luminance value of a current scene, based on at least one from among a maximum display luminance value of a mastering display according to luminance characteristics of the current scene and a maximum display luminance value of a target display according to the luminance characteristics of the current scene.

In detail, the tone mapper 240 may obtain a tone mapped pixel value of a pixel included in a frame of the current scene by performing tone mapping on an original luminance value of the pixel.

In operation 1920, the tone mapper 240 may display the current scene by using the tone mapped luminance value. When the image processing apparatus 100 transmits a corrected image to the target system 290, the image processing apparatus 100 may not include the display 830 and the image processing method 900 may not include operation 1910.

Figure 20:
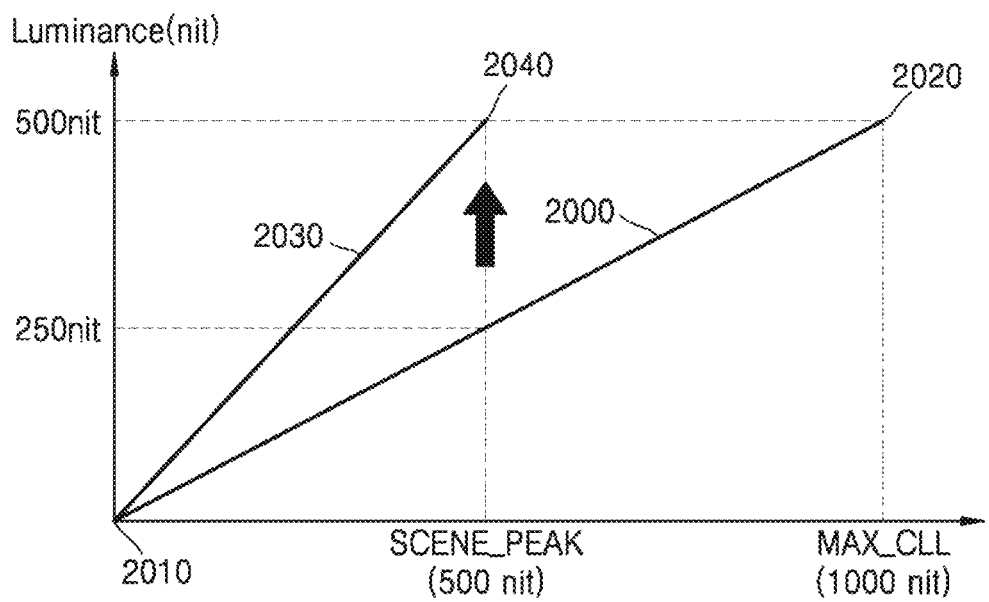
FIG. 20 illustrates an operation of performing tone mapping based on luminance characteristics of an image.

FIG. 20 illustrates an operation of performing tone mapping based on luminance characteristics of an image. In detail, FIG. 20 illustrates an operation performed by the tone mapper 240 to perform tone mapping based on first metadata.

For example, as shown in FIG. 20, both a desired maximum display luminance value Target Display Peak of a target display and an actual maximum display luminance value SCENE_PEAK of a mastering display according to luminance characteristics of an image may be 500 nits. Also, a desired maximum display luminance value MAX_CLL of the mastering display may be 1000 nits.

A graph of FIG. 20 includes a linear tone mapping function 2000 that connects the origin 2010 and a point 2020 including the desired maximum display luminance value MAX_CLL (1000 nits) of the mastering display and the desired maximum display luminance value Target Display Peak (500 nits) of the target display.

Also, the graph of FIG. 20 includes a linear tone mapping function 2030 that connects the origin 2010 and a point 2040 including an actual maximum display luminance value (500 nits) of the mastering display according to the luminance characteristics of the current scene of the image and the desired maximum display luminance value (500 nits) of the target display.

The x-axis of the graph of FIG. 20 may correspond to a luminance value of an original image input to the image processing apparatus 100, and the y-axis of the graph may correspond to a luminance value of a tone mapped image output from the image processing apparatus 100.

For example, when a luminance value of an input image is 500 nits, a tone mapped luminance value of 250 nits may be obtained by the linear tone mapping function 2000, and a bypassed luminance value of 500 nits may be obtained by the linear tone mapping function 2030.

The linear tone mapping function 2000 considering the luminance characteristics of the image may more effectively preserve the intention of an image producer reflected on the original image than the linear tone mapping function 2030 not considering the luminance characteristics of the image.

For example, in FIG. 20, since the actual maximum display luminance value SCENE_PEAK of the mastering display according to the luminance characteristics of the image is the same as the desired maximum display luminance value Target Display Peak of the target display, the luminance value of the original image may be bypassed by the linear tone mapping function 2030. Accordingly, when the tone mapper 240 performs tone mapping on the input image by using the linear tone mapping function 2030, an image displayed on the target display of a target system may be the same as the original image.

In contrast, since the desired maximum display luminance value MAX_CLL of the mastering display is twice greater than the desired maximum display luminance value Target Display Peak of the target display, the luminance value of the original image may be reduced to half by the linear tone mapping function 2000. Accordingly, when the tone mapper 240 performs tone mapping on the input image by using the linear tone mapping function 2000, an image displayed on the target display of the target system may be darker due to unnecessary tone mapping.

Figure 21:
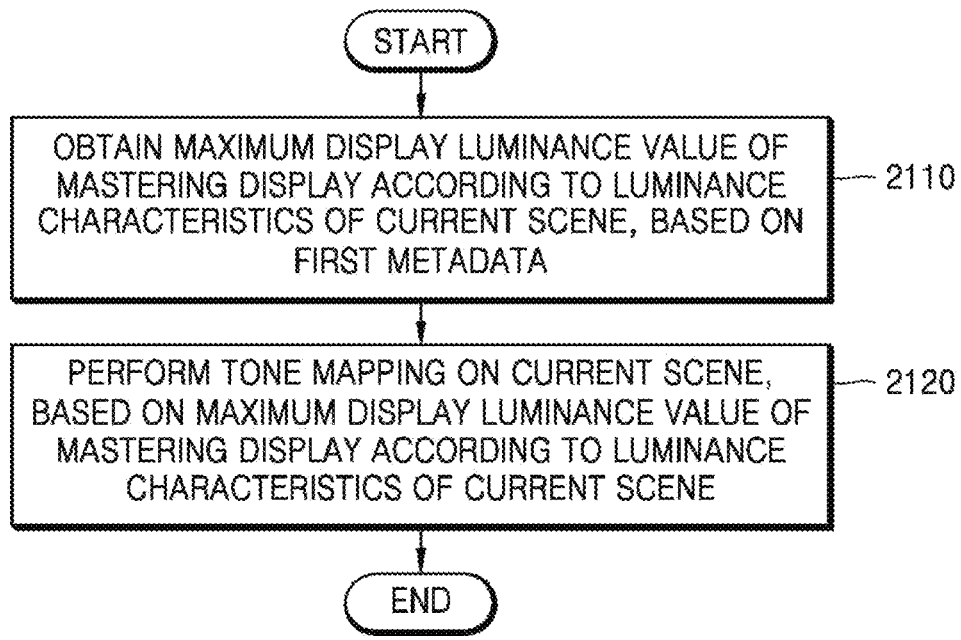
FIG. 21 is a flowchart of another method of performing tone mapping based on luminance characteristics of an image.

FIG. 21 is a flowchart of another method of performing tone mapping based on luminance characteristics of an image. In detail, FIG. 21 is a flowchart of a method by which the image processing apparatus 100 performs tone mapping on a luminance value of a current scene of an image based on first metadata.

In operation 2110, the luminance characteristics obtainer 230 may obtain a maximum display luminance value of a mastering display according to luminance characteristics of a current scene, based on first metadata. In detail, the first metadata received by the receiver 110 may include an actual maximum display luminance value of the mastering display according to luminance characteristics of an image. The luminance characteristics obtainer 230 may obtain the luminance characteristics of the current scene of an input image, and may obtain the actual maximum display luminance value of the mastering display according to the luminance characteristics of the current scene, based on the first metadata.

In operation 2120, the tone mapper 240 may perform tone mapping on the current scene, based on the actual maximum display luminance value of the mastering display according to the luminance characteristics of the current scene. In detail, the tone mapper 240 may obtain a tone mapped luminance value of a pixel included in a frame of the current scene by performing tone mapping on an original luminance value of the pixel. Tone mapping based on the actual maximum display luminance value of the mastering display will be explained below in detail with reference to FIGS. 21 through 24.

Figure 22:
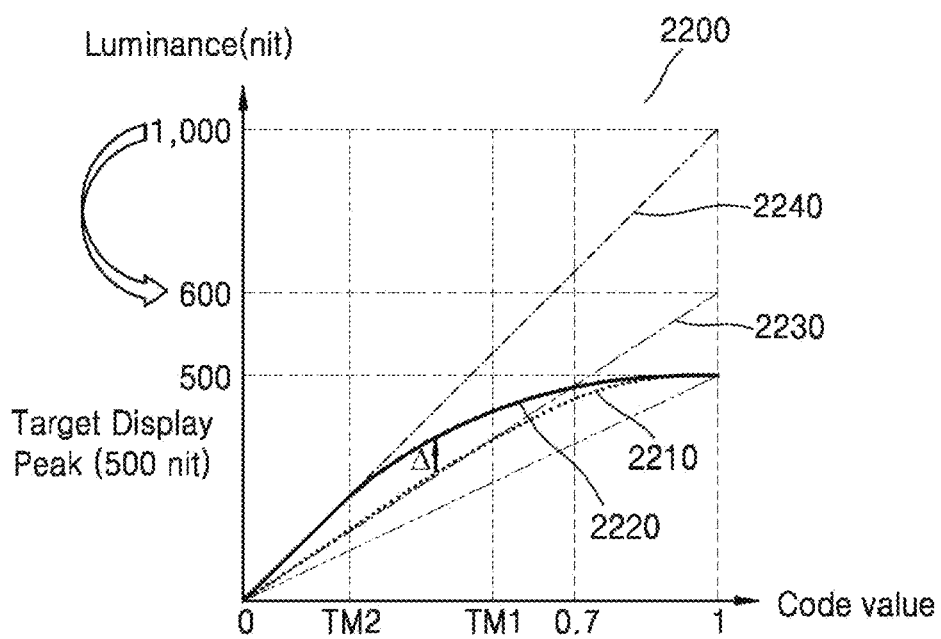
FIG. 22 illustrates another operation of performing tone mapping based on luminance characteristics of an image.

FIG. 22 illustrates another operation of performing tone mapping based on luminance characteristics of an image. In detail, FIG. 22 illustrates an operation of reducing a dynamic range of an image.

A graph 2200 of FIG. 22 illustrates a tone mapped luminance value according to a code value of an original luminance value. In detail, the x-axis of the graph 2200 may correspond to a value obtained by normalizing a luminance value of an original image to a code value between 0 and 1. For example, a desired maximum luminance value of a mastering display device or an actual maximum luminance value according to luminance characteristics of an image may be 1, and a minimum luminance value of the mastering display device may be 0. The y-axis of the graph 2200 may correspond to a tone mapped luminance value of a corrected image.

For example, as shown in FIG. 22, a desired maximum display luminance value Target Display Peak of a target display may be 500 nits. Also, an actual maximum display luminance value of the mastering display according to luminance characteristics of a current scene of the image may be 600 nits, and the desired maximum display luminance value of the mastering display may be 1000 nits. Since a maximum display luminance value of the mastering display is greater than a maximum display luminance value of the target display, tone mapping of FIG. 22 may reduce a dynamic range of the image.

The graph 2200 of FIG. 22 includes a tone mapping function 2220 based on the desired maximum display luminance value (1000 nits) of the mastering display and the desired maximum display luminance value (500 nits) of the target display. In detail, the tone mapping function 2220 may pass through a point (code value of 1, the desired maximum display luminance value (500 nits) of the target display). Also, the tone mapping function 2220 may include a straight line 2240 that connects the origin and a point (code value of 1, the desired maximum display luminance value (1000 nits) of the mastering display). When the code value is equal to or less than a threshold value TM2, the tone mapping function 2220 may correspond to the straight line 2240. The threshold value will be explained below in detail with reference to FIGS. 31 through 33, Also, the graph 2200 of FIG. 22 includes a tone mapping function 2210 based on the desired maximum display luminance value (500 nits) of the target display and the actual maximum display luminance value (600 nits) of the mastering display according to the luminance characteristics of the current scene of the image. In detail, the tone mapping function 2210 may pass through the point (code value of 1, the desired maximum display luminance value (500 nits) of the target display). Also, the tone mapping function 2210 may include a straight line 2230 that connects the origin and a point (code value of 1, the actual maximum display luminance value (600 nits) of the mastering display according to the luminance characteristics of the current scene). When the code value is equal to or less than a threshold value TM1, the tone mapping function 2210 may correspond to the straight line 2230, and the original luminance value may be bypassed. Also, when the code value is equal to or greater than the threshold value TM1, the original luminance value may be tone mapped. The threshold value will be explained below in detail with reference to FIGS. 31 through 33.

The straight line 2230 that connects the origin and the point (code value of 1, and the actual display luminance value (600 nits) of the mastering display according to the luminance characteristics of the current scene) of the graph 2200 may correspond to original luminance characteristics of the image formed by an image producer and a colorist.

The tone mapping function 2210 considering the luminance characteristics of the image may more effectively preserve the intention of the image producer reflected on the original image than the tone mapping function 2220 not considering the luminance characteristics of the image.

For example, since the tone mapping function 2220 not considering the luminance characteristics of the image is based on the straight line 2240, a tone mapped luminance value obtained by the tone mapping function 2220 may exceed the original luminance value. Accordingly, when the tone mapping function 2220 is used, a luminance value of a part of the original image may be increased and a luminance value of another part of the original image may be reduced. For example, when the code value is 0.7 at which the tone mapping function 2220 and the straight line 2230 meet each other, a result of the tone mapping function 2220 may be changed. The tone mapping function 2220 may obtain a tone mapped luminance value that is greater than a luminance value of the original image when the code value ranges from 0 to 0.7. Although tone mapping for reducing a dynamic range of the image has to be performed, a part of the image may be brighter due to the tone mapping function 2220. The graph 2200 includes a tone mapped luminance value that is unnecessarily greater by delta Δ than the original luminance value due to the tone mapping function 2220. Also, the tone mapping function 2220 may obtain a tone mapped luminance value that is less than a luminance value of the original image when the code value ranges from 0.7 to 1. Accordingly, when the tone mapping function 2220 not considering the luminance characteristics of the image is used, a part of the image may be brighter than the original image and another part of the image may be darker than the original image, thereby distorting the intention of the original image.

In contrast, since the tone mapping function 2210 considering the luminance characteristics of the image is based on the straight line 2230 corresponding to the original image, a tone mapped luminance value obtained by the tone mapping function 2210 may be constantly less than the original luminance value. In tone mapping for reducing a dynamic range of the original image, a luminance value of the original image may be prevented from being unnecessarily increased by considering the luminance characteristics of the image. Accordingly, when the tone mapping function 2210 considering the luminance characteristics of the image is used, the intention of the original image may be efficiently preserved.

Figure 23:
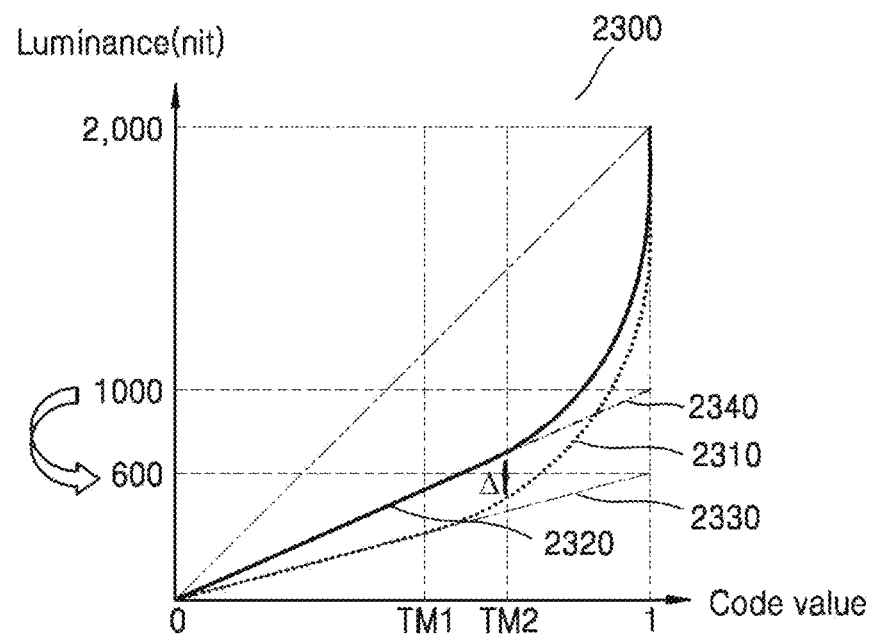
FIG. 23 illustrates another operation of performing tone mapping based on luminance characteristics of an image.

FIG. 23 illustrates another operation of performing tone mapping based on luminance characteristics of an image. In detail, FIG. 23 illustrates an operation of increasing a dynamic range of an image.

For example, as shown in FIG. 23, a desired maximum display luminance value Target Display Peak of a target display may be 2000 nits. Also, an actual maximum display luminance value of a mastering display according to luminance characteristics of a current scene of an image may be 600 nits, and a desired maximum display luminance value of the mastering display may be 1000 nits. Since a maximum display luminance value of the mastering display is less than a maximum display luminance value of the target display, tone mapping of FIG. 23 may increase a dynamic range of the image. Tone mapping for increasing a dynamic range of an image is referred to as inverse tone mapping.

A graph 2300 of FIG. 23 includes a tone mapping function 2320 based on the desired maximum display luminance value (1000 nits) of the mastering display and the desired maximum display luminance value (2000 nits) of the target display. In detail, the tone mapping function 2320 may pass through a point (code value of 1, the desired maximum display luminance value (2000 nits) of the target display). Also, the tone mapping function 2320 may include a straight line 2340 that connects the origin and a point (code value of 1, and the desired maximum display luminance value (1000 nits) of the mastering display). When a code value is equal to or less than a threshold value TM1, the tone mapping function 2320 may correspond to the straight line 2340. The threshold value will be explained below in detail with reference to FIGS. 31 through 33.

Also, the graph 2300 of FIG. 23 includes a tone mapping function 2310 based on the actual maximum display luminance value (600 nits) of the mastering display and the desired maximum display luminance value (2000 nits) of the target display according to the luminance characteristics of the current scene of the image. In detail, the tone mapping function 2310 may pass through the point (code value of 1, the desired maximum display luminance value (2000 nits) of the target display). Also, the tone mapping function 2310 may include a straight line 2330 that connects the origin and a point (code value of 1, and the actual maximum display luminance value (600 nits) of the mastering display according to the luminance characteristics of the current scene). When the code value is equal to or less than a threshold value TM2, the tone mapping function 2310 may correspond to the straight line 2330, and an original luminance value may be bypassed. Also, when the code value is equal to or greater than the threshold value TM1, the original luminance value may be tone mapped. The threshold value will be explained below in detail with reference to FIGS. 31 through 33.

The straight line 2330 that connects the origin and the point (code value of 1, and the actual display luminance value (600 nits) of the mastering display according to the luminance characteristics of the current scene) of the graph 2300 may correspond to original luminance characteristics of the image formed by an image producer and a colorist.

The tone mapping function 2310 considering the luminance characteristics of the image may more effectively preserve the intention of the image producer reflected on an original image than the tone mapping function 2320 not considering the luminance characteristics of the image.

For example, since the tone mapping function 2320 not considering the luminance characteristics of the image is based on the straight line 2340, a tone mapped luminance value obtained by the tone mapping function 2320 may be excessively tone mapped when compared to the original luminance value. For example, the graph 2300 includes a tone mapped luminance value that is excessively greater by delta ($\Delta$) than the original luminance value due to the tone mapping function 2320. Accordingly, when the tone mapping function 2320 not considering the luminance characteristics of the image is used, the image may be excessively bright, thereby distorting the intention of the original image.

In contrast, since the tone mapping function 2310 considering the luminance characteristics of the image is based on the straight line 2330 corresponding to the original image, a tone mapped luminance value obtained by the tone mapped function 2310 may maintain the original luminance value as much as possible. In tone mapping for increasing a dynamic range of the original image, a luminance value of the original image may be prevented from being excessively increased by considering the luminance characteristics of the image. Accordingly, when the tone mapping function 2310 considering the luminance characteristics of the image is used, the intention of the original image may be efficiently preserved.

Figure 24:
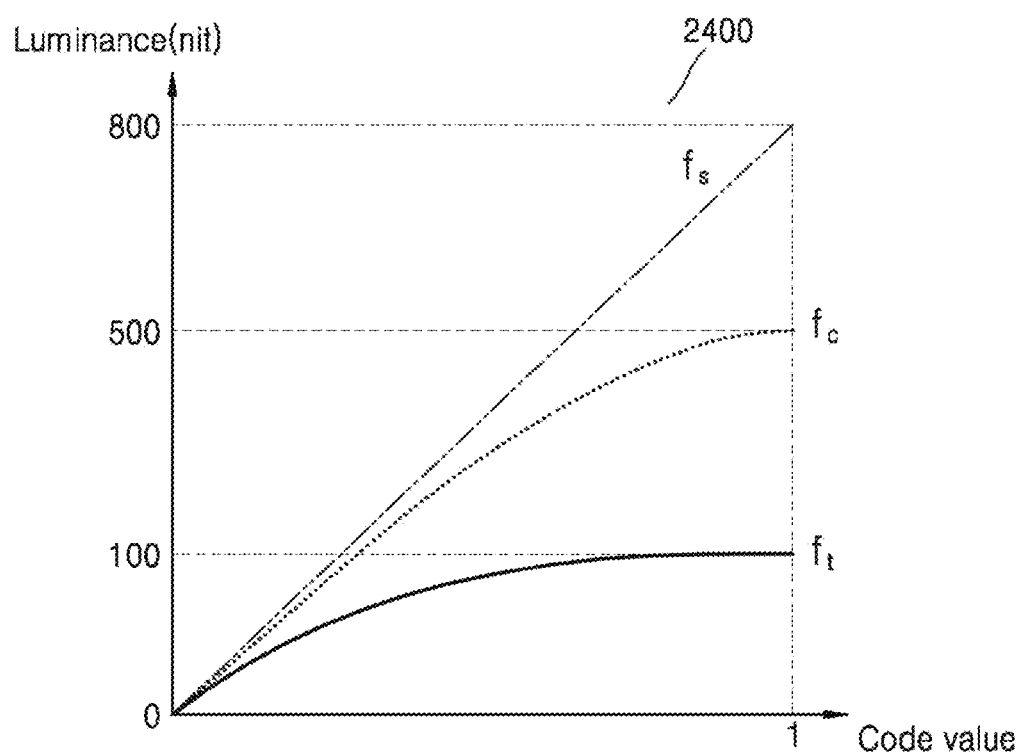
FIG. 24 illustrates an operation of correcting a tone mapping function.

FIG. 24 illustrates an operation of correcting a tone mapping function. The image processing apparatus 100 may correct a tone mapping function ft generated based on characteristics of a target display and a mastering display. For example, when a dynamic range of a display device used by a consumer (hereinafter, referred to as a 'consumer display') is different from a dynamic range of the target display, the image processing apparatus 100 may generate a new tone mapping function fc that may be applied to the consumer display, by using the tone mapping function ft used by the tone mapper 240 and a function fs corresponding to an original image.

When the dynamic range of the consumer display is included in a dynamic range of the mastering display and the dynamic range of the target display is included in the dynamic range of the consumer display, the consumer display may display a tone mapped image by using the tone mapping function ft. Alternatively, in order to display an image closer to the original image, the consumer display may generate the new tone mapping function fc based on the function fs and the tone mapping function ft. For example, the consumer display may generate the new tone mapping function fc by applying a first weight to the function fs corresponding to the original image and a second weight to the tone mapping function ft used by the image processing apparatus 100 as shown in Equation 2.

$$f_c=(w_1 f_s + w_2 f_t)/(w_1+w_2) \qquad \text{Equation 2}$$

Figure 25:
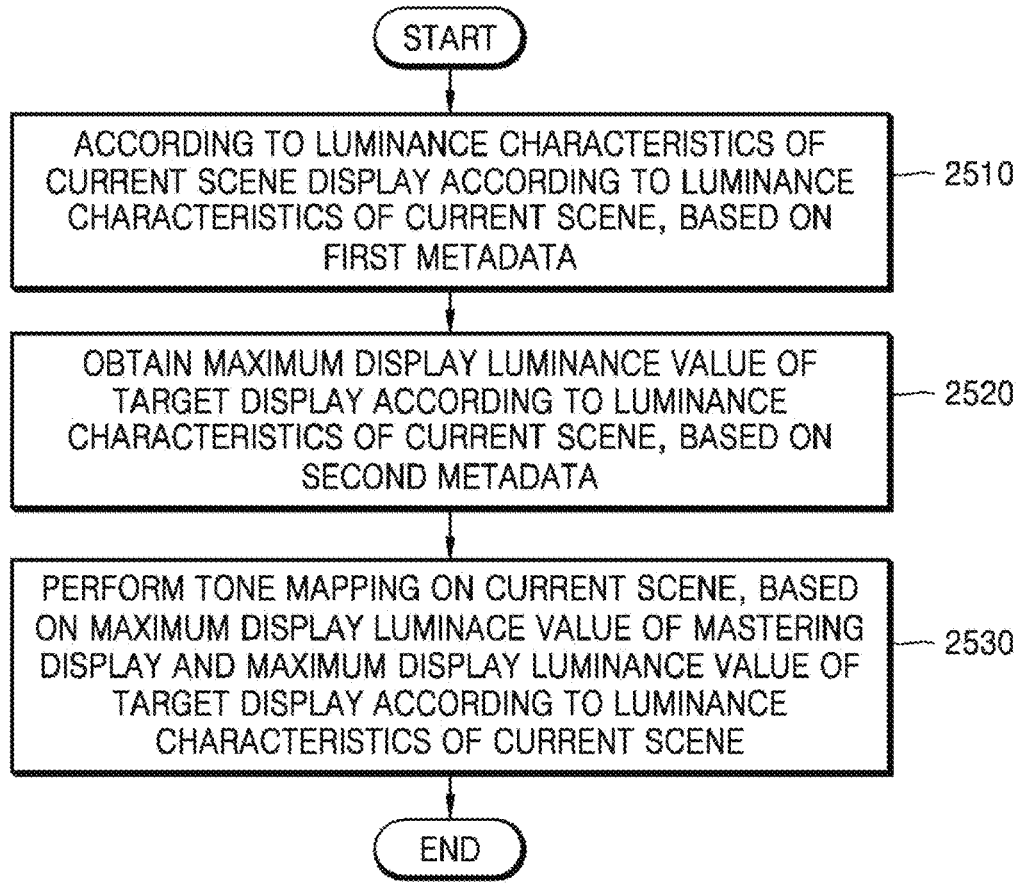
FIG. 25 is a flowchart of another method of performing tone mapping based on luminance characteristics of an image.

FIG. 25 is a flowchart of another method of performing tone mapping based on luminance characteristics of an image. In detail, FIG. 25 is a flowchart of a method by which the image processing apparatus 100 performs tone mapping on a luminance value of a current scene of an image based on first metadata and second metadata.

In operation 2510, the luminance characteristics obtainer 230 may obtain a maximum display luminance value of a mastering display according to luminance characteristics of a current scene based on first metadata. In detail, the first metadata received by the receiver 110 may include an actual maximum display luminance value of the mastering display according to luminance characteristics of the image. The luminance characteristics obtainer 230 may obtain the luminance characteristics of the current scene of the input image, and may obtain the actual maximum display luminance value of the mastering display according to the luminance characteristics of the current scene, based on the first metadata.

In operation 2520, the luminance characteristics obtainer 230 may obtain a maximum display luminance value of a target display according to the luminance characteristics of the current scene, based on second metadata. In detail, the second metadata received by the receiver 110 may include an actual maximum display luminance value of the target display according to the luminance characteristics of the image. The luminance characteristics obtainer 230 may obtain the luminance characteristics of the current scene of the input image, and may obtain the actual maximum display luminance value of the target display according to the luminance characteristics of the current scene, based on the second metadata.

In operation 2530, the tone mapper 240 may perform tone mapping on the current scene, based on the actual maximum display luminance value of the mastering display and the actual maximum display luminance value of the target display according to the luminance characteristics of the current scene. In detail, the tone mapper 240 may obtain a tone mapped luminance value of a pixel included in a frame of the current scene by performing tone mapping on an original luminance value of the pixel. Tone mapping based on the actual maximum display luminance value of the mastering display and the actual maximum display luminance value of the target display will now be explained in detail with reference to FIG. 26.

Figure 26:
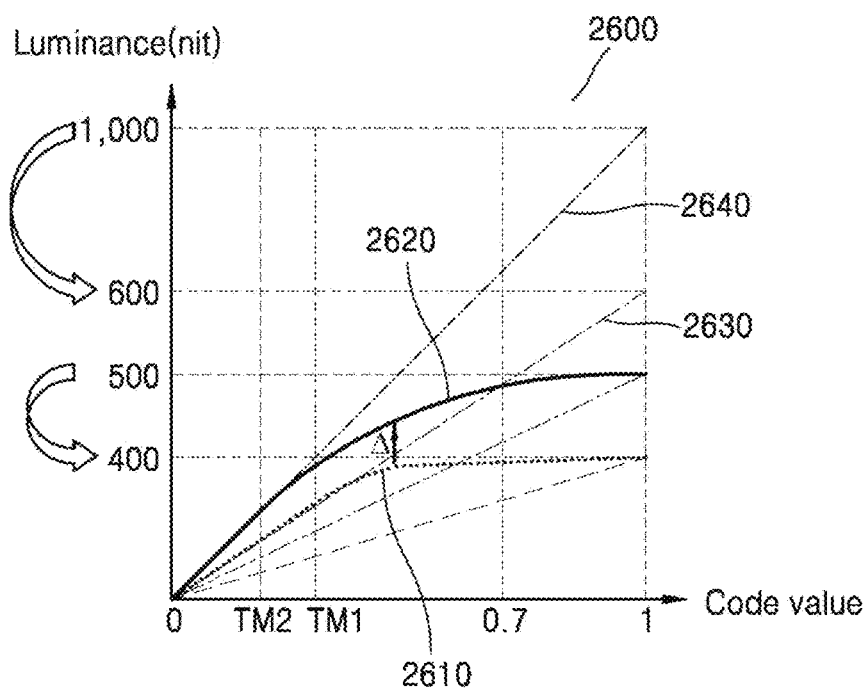
FIG. 26 illustrates another operation of performing tone mapping based on luminance characteristics of an image.

FIG. 26 illustrates another operation of performing tone mapping based on luminance characteristics of an image. In detail, FIG. 26 illustrates an operation of reducing a dynamic range of an image.

A graph 2600 of FIG. 26 illustrates a tone mapped luminance value according to a code value of an original luminance value. In detail, the x-axis of the graph 2600 may correspond to a value obtained by normalizing a luminance value of an original image to a code value between 0 and 1. For example, a desired maximum luminance value of a mastering display device and an actual maximum luminance value according to luminance characteristics of an image may be 1, and a minimum luminance value of the mastering display device may be 0. The y-axis of the graph 2600 may correspond to a tone mapped luminance value of a corrected image.

For example, as shown in FIG. 26, an actual maximum display luminance value of a target display according to luminance characteristics of a current scene of the image may be 400 nits, and a desired maximum display luminance value Target Display Peak of the target display may be 500 nits. Also, an actual maximum display luminance value of the mastering display according to the luminance characteristics of the current scene of the image may be 600 nits, and the desired maximum display luminance value of the mastering display may be 1000 nits. Since a maximum display luminance value of the mastering display is greater than a maximum display luminance value of the target display, tone mapping of FIG. 26 may reduce a dynamic range of the image.

The graph 2600 of FIG. 26 includes a tone mapping function 2620 based on the desired maximum display luminance value (1000 nits) of the mastering display and the desired maximum display luminance value (500 nits) of the target display. In detail, the tone mapping function 2620 may pass through a point (code value of 1, the desired maximum display luminance value (500 nits) of the target display). Also, the tone mapping function 2620 may include a straight line 2640 that connects the origin and a point (code value of 1, and the desired maximum display luminance value (1000 nits) of the mastering display). When a code value is equal to or less than a threshold value TM2, the tone mapping function 2620 may correspond to the straight line 2640. The threshold value will be explained below in detail with reference to FIGS. 31 through 33.

Also, the graph 2600 of FIG. 26 includes a tone mapping function 2610 based on the actual maximum display luminance value (600 nits) of the mastering display according to the luminance characteristics of the current scene of the image and the actual maximum display luminance value (400 nits) of the target display according to the luminance characteristics of the current scene of the image. In detail, the tone mapping function 2610 may pass through a point (code value of 1, the actual maximum display luminance value (400 nits) of the target display according to the luminance characteristics of the current scene). Also, the tone mapping 2610 may include a straight line 2630 that connects the origin and a point (code value 1, and the actual maximum display luminance value (600 nits) of the mastering display according to the luminance characteristics of the current scene). When the code value is equal to or less than a threshold value TM1, the tone mapping function 2610 may correspond to the straight line 2630, and an original luminance value may be bypassed. Also, when the code value is equal to or greater than the threshold value TM1, the original luminance value may be tone mapped. The threshold value will be explained below in detail with reference to FIGS. 31 through 33.

The straight line 2630 that connects the origin and the point (code value of 1, and the actual display luminance value (600 nits) of the mastering display according to the luminance characteristics of the current scene) of the graph 2600 may correspond to original luminance characteristics of the image formed by an image producer and a colorist.

The tone mapping function 2610 considering the luminance characteristics of the image may more effectively preserve the intention of the image producer reflected on an original image than the tone mapping function 2620 not considering the luminance characteristics of the image.

For example, since the tone mapping function 2620 not considering the luminance characteristics of the image is based on the straight line 2640, a tone mapped luminance value obtained by the tone mapping function 2620 may exceed the original luminance value. Accordingly, when the tone mapping function 2620 is used, a luminance value of a part of the original image may be increased and a luminance value of another part of the original image may be reduced. For example, when the code value is 0.7 at which the tone mapping function 2620 and the straight line 2630 meet each other, a result of the tone mapping function 2620 may be changed. The tone mapping function 2620 may obtain a tone mapped luminance value that is greater than a luminance value of the original image when the code value ranges from 0 to 0.7. Although tone mapping for reducing a dynamic range of the image has to be performed, a part of the image may be brighter due to the tone mapping function 2620. The graph 2600 includes a tone mapped luminance value that is unnecessarily greater by delta ($\Delta$) than the original luminance value due to the tone mapping function 2620. Also, the tone mapping function 2620 may obtain a tone mapped luminance value that is less than a luminance value of the original image when the code value ranges from 0.7 to 1. Accordingly, when the tone mapping function 2620 not considering the luminance characteristics of the image is used, a part of the image may be brighter than the original image and another part of the image may be darker than the original image, thereby distorting the intention of the original image.

In contrast, since the tone mapping function 2610 considering the luminance characteristics of the image is based on the straight line 2630 corresponding to the original image, a tone mapped luminance value obtained by the tone mapping function 2610 may be constantly less than the original luminance value. In tone mapping for reducing a dynamic range of the original image, a luminance value of the original image may be prevented from being unnecessarily increased by considering the luminance characteristics of the image. Accordingly, when the tone mapping function 2610 considering the luminance characteristics of the image is used, the intention of the original image may be efficiently preserved.

When the graph 2200 of FIG. 22 and the graph 2600 of FIG. 26 are compared with each other, the tone mapping function 2610 may further consider an actual maximum display luminance value of a target display according to luminance characteristics of an image than the tone mapping function 2210. A tone mapped luminance value obtained by the tone mapping function 2210 may be greater than 400 nits that is a desired maximum display luminance value of the target display and may be less than 500 nits that is the actual maximum display luminance value of the target display. The target display may not be able to display a luminance value exceeding 400 nits due to the problem of power consumption according to the luminance characteristics of the image. Accordingly, a tone mapped luminance value equal to or greater than 400 nits may distort the intention of an original image. In contrast, a tone mapped luminance value obtained by the tone mapping function 2610 may not exceed 400 nits that is the actual maximum display luminance value of the target display according to the luminance characteristics of the image. Accordingly, when not only an actual maximum display luminance value of a mastering display according to the luminance characteristics of the image but also the actual maximum display luminance value of the target display according to the luminance characteristics of the image are considered, the intention of the original image may be more effectively preserved.

Figure 27:
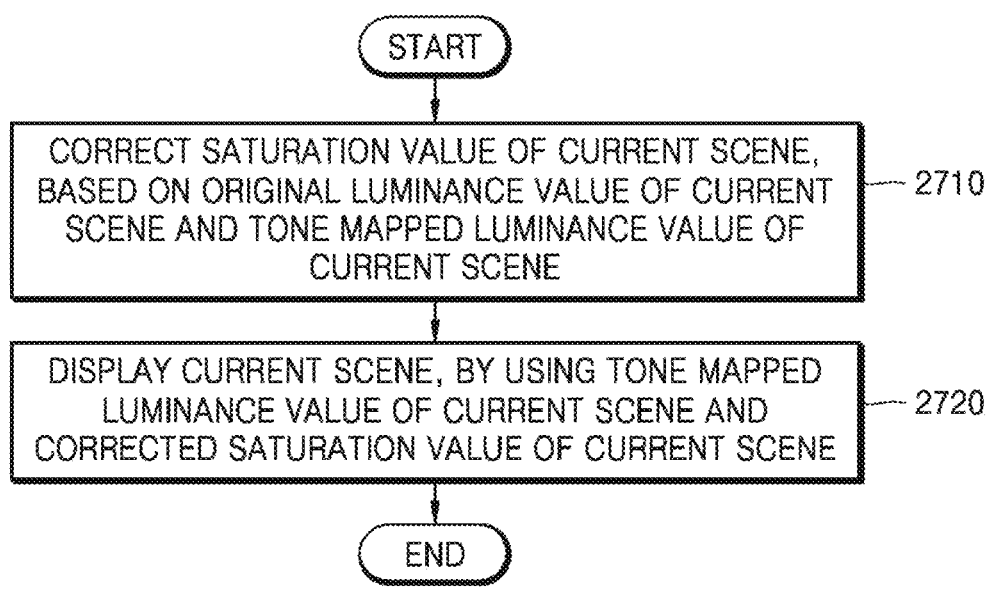
FIG. 27 is a flowchart of a method of correcting a saturation value of an image based on a tone mapped luminance value.

FIG. 27 is a flowchart of a method of correcting a saturation value of an image based on a tone mapped luminance value.

Although colors are the same, a saturation value of a color perceived by a person may decrease as a luminance value of the color decreases and the saturation value of the color perceived by the person may increase as the luminance value of the color increases, which is referred to as a hunt effect.

Likewise, when a luminance value of an original image is reduced by using tone mapping, a saturation value of the tone mapped image perceived by a person may be less than a saturation value of the original image perceived by the person. When a luminance value of the original image is increased by using tone mapping, a saturation value of the tone mapped image perceived by the person may be greater than a saturation value of the original image perceived by the person. Accordingly, the image processing apparatus 100 and the image processing method 900 may more efficiently preserve the intention of the original image by also correcting a saturation value of the tone mapped image.

In operation 2710, the saturation corrector 250 may correct a saturation value of an image, based on a tone mapped luminance value and an original luminance value of the image. In detail, the saturation corrector 250 may correct a saturation value of a pixel, based on a tone mapped luminance value and an original luminance value of the pixel included in a frame of a current scene. For example, when the original luminance value of the pixel is less than the tone mapped luminance value of the pixel, the saturation corrector 250 may increase the saturation value of the pixel, land when the original luminance value is greater than the tone mapped luminance value of the pixel, the saturation corrector 250 may reduce the saturation value of the pixel.

The corrected saturation value may be determined based on a ratio between a log scale of the original luminance value and a log scale of the tone mapped luminance value. Human perception of colors may be based on a log scale. Human perception of colors may be more sensitive to a dark color and may be more insensitive to a bright color. Accordingly, even when a difference between a luminance value of an original image and a luminance value of a tone mapped image is constant, as the luminance value of the original image decreases, the intensity of saturation correction may increase, and a difference between a corrected saturation value and an original saturation value may increase. For example, when the original luminance value is 1000 nits and the corrected luminance value is 900 nits, the intensity of saturation correction may be log(1000/900). In contrast, when the original luminance value is 500 nits and the corrected luminance value is 400 nits, the intensity of the saturation correction may be log(500/400).

FIG. 28 illustrates an operation of correcting a saturation value of an image based on a tone mapped luminance value.

A graph 2810 illustrates a tone mapped luminance value according to a code value of an original luminance value. The tone mapper 240 may perform tone mapping on the original luminance value according to a tone mapping function 2820 of the graph 2810. A graph 2840 illustrates an intensity of saturation correction according to the code value of the original luminance value. The saturation corrector 250 may correct the original luminance value according to a saturation correcting function 2850 of the graph 2840. As a saturation gain increases, an intensity of saturation correction of the saturation corrector 250 may increase.

When a luminance value of a pixel exceeds a threshold value TMx, the saturation corrector 250 may correct a saturation value of the pixel, and when the luminance value of the pixel is equal to or less than the threshold value TMx, the saturation value may be bypassed. As described above, the tone mapper 240 may bypass or tone map the original luminance value based on the threshold value. When the tone mapper 240 bypasses the original luminance value of the pixel, a saturation value perceived by a person may be maintained. Accordingly, the saturation corrector 250 may bypass the saturation value of the pixel. In detail, referring to the graph 2810, the tone mapper 240 may bypass the original luminance value corresponding to the code value equal to or less than TMx according to the tone mapping function 2820, and the saturation corrector 250 may bypass the saturation value of the pixel with the original luminance value corresponding to the code value equal to or less than TMx according to the saturation correcting function 2850. Also, the saturation corrector 250 may perform saturation correction on the pixel with the original luminance value corresponding to the code value exceeding TMx.

A specific example where an image processing apparatus 2900 performs tone mapping and saturation correction based on luminance characteristics of an image will now be explained in detail with reference to FIGS. 29 through 33.

Figure 29:
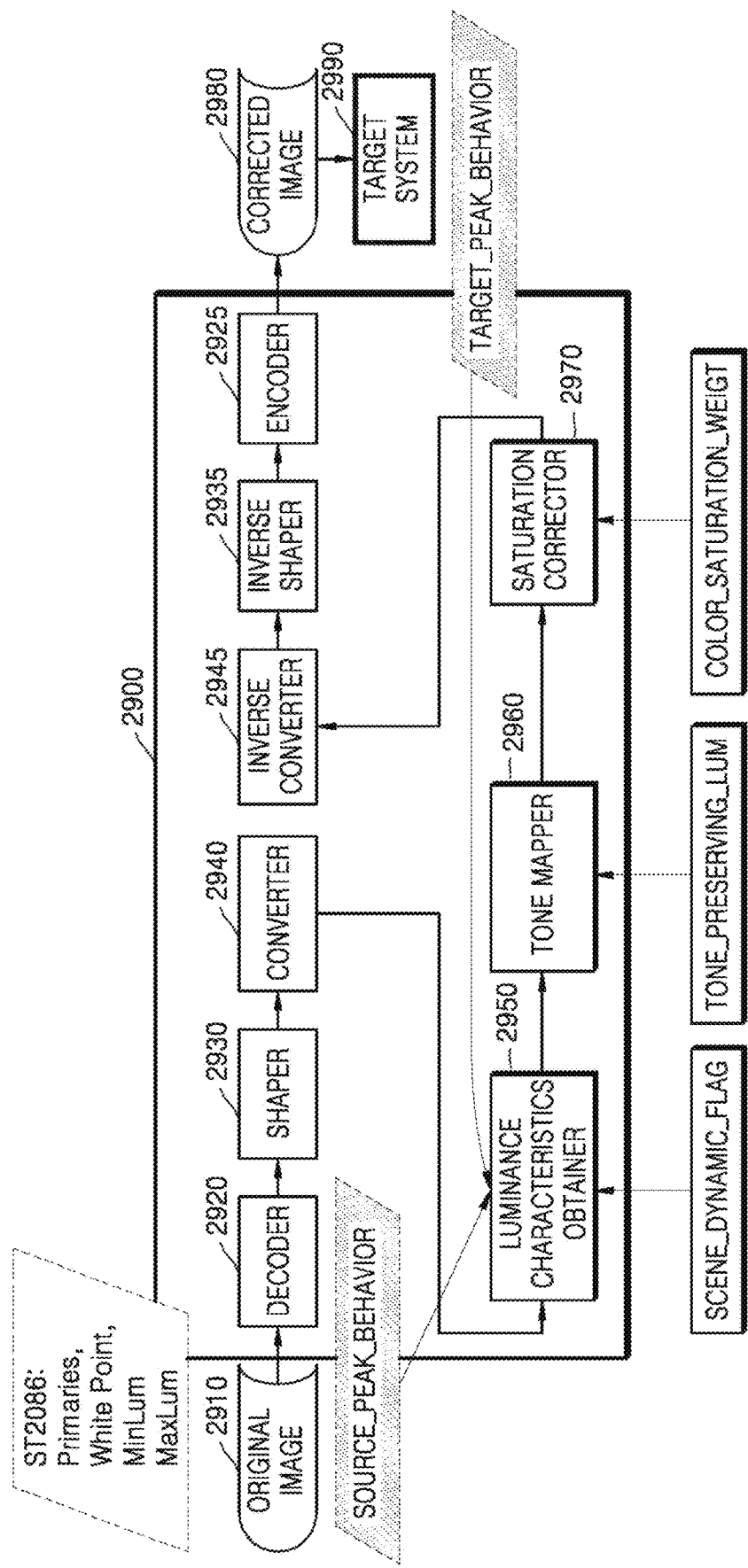
FIG. 29 is a block diagram of an image processing apparatus for performing tone mapping and saturation correction according to luminance characteristics of an image by using unified dynamic metadata.

FIG. 29 is a block diagram of an image processing apparatus for performing tone mapping and saturation correction according to luminance characteristics of an image by using unified dynamic metadata.

The unified dynamic metadata may include dynamic metadata whose value varies according to luminance characteristics of an original image 2910 and static metadata whose value is constant irrespective of the luminance characteristics of the original image 2910. Also, the unified dynamic metadata may further include a user input parameter.

In detail, as shown in FIG. 29, the static metadata may include metadata according to the society of motion picture and television engineers (SMPTE) ST20806 standard. For example, the static metadata may include 'Min Lum of Source Mastering Monitor' that is a desired minimum display luminance value of a mastering display, 'Max Lum of Source Mastering Monitor' that is a desired maximum display luminance value of the mastering display, 'White Point' that is x and y color coordinates of a white point in a color space of the mastering display, and 'Primaries' that is x and y color coordinates of a primary color in the color space of the mastering display. Also, the static metadata may include 'Min Lum of Target System' that is a desired minimum display luminance value of a target display and 'Max Lum of Target System' that is a desired maximum display luminance value of the target display.

Table 1 exemplarily illustrates the dynamic metadata and the user input parameter.

TABLE 1

| Metadata | Specification |
| --- | --- |
| The metadata from the source/target system | Dynamic peak luminance characteristics-SOURCE_PEAK_BEHAVIOR (of the source mastering monitor)-TARGET_PEAK_BEHAVIOR (of the target system) |
| The metadata from contents | -Scene-wise maximum of the color components {R, G, B} (SCENE_MAX)-Scene-wise average of maximum of color component values {R, G, B} (SCENE_AVG)-Scene-wise area of the brightest pixels (SCENE_PEAK_AREA) |
| User controls | SCENE_DYNAMIC_FLAGTONE_PRESERVING_LUMCOLOR_SATURATION_WEIGT |

SOURCE_PEAK_BEHAVIOR and TARGET_PEAK_BEHAVIOR may correspond to the dynamic range that varies according to the luminance characteristics of the original image 2910. SOURCE_PEAK_BEHAVIOR may be metadata including an actual maximum display luminance value of the mastering display according to the luminance characteristics of the image, and may be received from a source system including the mastering display. TARGET_PEAK_BEHAVIOR may be metadata including an actual maximum display luminance value of the target display according to the luminance characteristics of the image, and may be received from a target system 2990 including the target display. SOURCE_PEAK_BEHAVIOR and TARGET_PEAK_BEHAVIOR may respectively correspond to first metadata and second metadata described with reference to FIGS. 3 through 7.

SCENE_MAX, SCENE_AVG and SCEN_PEAK_AREA may be metadata according to the luminance characteristics of the original image 2910 obtained by the image processing apparatus 2900. In detail, SCENE_MAX may correspond to a maximum value from among RGB color components in a current scene of the original image 2910. SCENE_AVG may correspond to an average luminance value of the current scene of the original image 2910 described with reference to FIGS. 10 through 12. Also, SCENE_AVG may be obtained based on a maximum value from among RGB color components of a pixel. SCENE_PEAK_AREA may correspond to an area of a maximum luminance region in the current scene of the original image 2910 described with reference to FIGS. 13 through 18.

SCENE_DYNAMIC_FLAG, TONE_PRESERVING_LUM, and COLOR_SATURATION_WEIGT may correspond to input parameters of the image processing apparatus 2900 that may be set by a user. SCENE_DYNAMIC_FLAG may correspond to a flag indicating whether to obtain luminance characteristics of the current scene of the original image 2910 described with reference to FIG. 10. TONE_PRESERVING_LUM may correspond to a luminance preserving value of the current scene of the original image 2910, and COLOR_SATURATION_WEIGT may correspond to an input parameter for adjusting the intensity of saturation correction.

The image processing apparatus 2900 of FIG. 29 may include a decoder 2920, a shaper 2930, a converter 2940, a luminance characteristics obtainer 2950, a tone mapper 2960, a saturation corrector 2970, an inverse converter 2945, an inverse shaper 2935, and an encoder 2925. The image processing apparatus 2900 of FIG. 29 may be included in the controller 120 of the image processing apparatus 100 of FIG. 1. In detail, when the image processing apparatus 2900 of FIG. 29 is included in the controller 120 of FIG. 1, the decoder 2920, the luminance characteristics obtainer 2950, the tone mapper 2960, the saturation corrector 2970, and the encoder 2925 of FIG. 29 may respectively correspond to the decoder 210, the luminance characteristics obtainer 230, the tone mapper 240, the saturation corrector 250, and the encoder 270. Also, the shaper 2930 and the converter 2940 of FIG. 29 may be included in the converter 220 of FIG. 2, and the inverse converter 2945 and the inverse shaper 2935 of FIG. 29 may be included in the inverse converter 260 of FIG. 2. Accordingly, the same description as that made with reference to FIG. 1 will not be given.

When the original image 2910 input to the image processing apparatus 2900 is an encoded image, the decoder 2920 may decode the original image 2910 and may obtain a decoded original image 2910. Also, when the decoded original image 2910 has a YCbCr format, the decoder 2920 may convert the YCbCr format of the decoded original image 2910 into an RGB format.

If necessary, the shaper 2930 may perform linearization on the original image 2910. For example, the shaper 2930 may perform linearization on the original image 2910 according to SMPTE ST2084. SMPTE ST2084 may be a standard for a high dynamic range electro-optical transfer function (EOTF) of the mastering display. In detail, the shaper 2930 may obtain a linearized original image 2910 by performing gamma decoding or inverse gamma correction on the original image 2910 that is non-linearized or gamma corrected by using gamma encoding.

In order to perform tone mapping on the original image 2910, the converter 2940 may convert an original color space of the original image 2910 into a working color space where tone mapping is performed. For example, the converter 2940 may convert the x and y color coordinates 'Primaries' of the primary color of the original image 2910 and the x and y color coordinates 'White Point' of the white pint into x and y color coordinates of a primary color and x and y color coordinates of a white point corresponding to the working color space. If the original color space of the original image 2910 is the same as the working color space, the converter 2940 may be omitted.

Operations of the luminance characteristics obtainer 2950, the tone mapper 2960, and the saturation corrector 2970 may be summarized as in Table 2.

operation performed by the luminance characteristics obtainer 2950 to obtain the luminance characteristics of the original image 2910 may be summarized as in Table 3.

TABLE 2

| Configuration | Summary |
|---|---|
| Luminance characteristics obtainer 2950 | $\begin{bmatrix} R_{norm} \\ G_{norm} \\ B_{norm} \end{bmatrix} = \frac{10{,}000}{\text{ScenePeak}} \begin{bmatrix} R_{linear} \\ G_{linear} \\ B_{linear} \end{bmatrix}$ <br><br> $\text{SceanPeak} = \begin{cases} \text{MAX(SCENE}_{\text{MAX}} \cdot 10000, \text{TargetPeak)}, & \text{if SCENE\_DYNAMIC\_FLAG} = 1 \\ \text{MaxLume of Source Mastering Monitor}, & \text{else} \end{cases}$ |
| Tone mapper 2960 | $\begin{bmatrix} R_{stm} \\ G_{stm} \\ B_{stm} \end{bmatrix} = w \cdot \begin{bmatrix} R_{norm} \\ G_{norm} \\ B_{norm} \end{bmatrix}$ <br> $w = f_{STM}(x)$ <br> $x = \max(R_{norm}, G_{norm}, B_{norm})$ |
| Saturation corrector 2970 | $\begin{bmatrix} R_{scsm} \\ G_{scsm} \\ B_{scsm} \end{bmatrix} = f_{SCSM} \cdot \left( \begin{bmatrix} R_{stm} \\ G_{stm} \\ B_{stm} \end{bmatrix} \right)$ |

In Table 2, the luminance characteristics obtainer 2950 may receive [R_linear; G_linear; B_linear] that is a linearized original image and may output [R_norm; G_norm; B_norm] that is a normalized original image. For example, a maximum luminance value according to the ST2084 standard may be 10000 nits. Accordingly, when the shaper 2930 performs linearization according to the ST2084 standard, the shaper 2930 may multiply the linearized original image by a normalization factor of 1000/ScenePeak in order to normalize the linearized original image based on 10000 nits.

The normalization factor may be set based on the input parameter SCENE_DYNAMIC_FLAG that may be set by the user. In Table 2, when the input parameter SCENE_DYNAMIC_FLAG indicates that the luminance characteristics of the original image 2910 are to be obtained, ScenePeak of the normalization factor may be set to a larger value from among SCENE_MAX*10,000 corresponding to the luminance characteristics of the original image 29140 and TargetPeak that is a normalized actual maximum display luminance value of the target display according to the luminance characteristics of the original image 2910. That is, when the input parameter SCENE_DYNAMIC_FLAG indicates that the luminance characteristics of the original image 2910 are to be obtained, the normalization factor may be set based on the dynamic metadata.

In contrast, when the input parameter SCENE_DYNAMIC_FLAG in Table 2 indicates that the luminance characteristics of the original image 2910 are not to be obtained, ScenePeak may be set to Max Lum of Source Mastering Monitor corresponding to the static metadata. That is, when the input parameter SCENE_DYNAMIC_FLAG indicates that the luminance characteristics of the original image 2910 are not to be obtained, the normalization factor may be set based on the static metadata.

Also, when the input parameter SCENE_DYNAMIC_FLAG in Table 2 indicates that the luminance characteristics of the original image 2910 are to be obtained, an

TABLE 3

SCENE_MAX = max $((R_{linear}(p), G_{linear}(p), B_{linear}(p)))$
for all pixels p in a scene (cut)or for all pixels defined by the pixel selector
SCENE_AVG = Mean(max$((R_{linear}(p), G_{linear}(p), B_{linear}(p)))$)
for all pixels p in a scene (cut)
SCENE_PEAK_AREA =

$$\sum_{x \in f((k')} f(|Y_{linear}(x, k') - \text{scene\_region\_max}|) \cdot g(|x - p'|)$$

Figure 36:
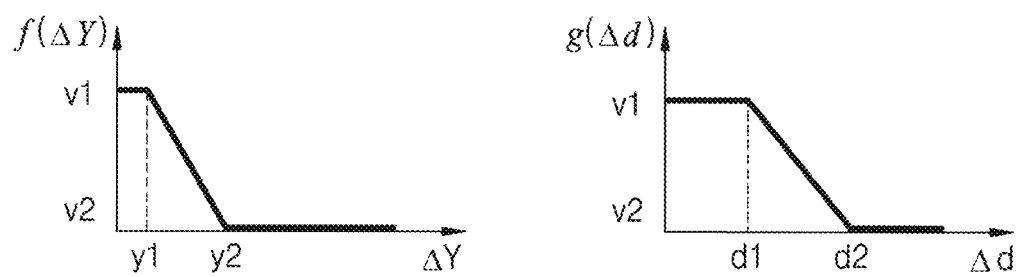
FIG. 36 illustrates graphs of a function f(Δy) about a luminance value and a function g(Δd) about a distance for setting the area SCEN_PEAK_AREA of the maximum luminance region.

FIG. 36 illistrates graphs of a function f(Δy) about a luminance value and a function g(Δd) about a distance for setting the area SCENE_PEAK_AREA of the maximum luminance region.
In a UHD image.v1 = 1.v2 = 0.y1 = 10.y2 = 50.d1 = 500.d2 = 1000
  The linearized intensity at a pixel p at a frame k is computed by
    $Y_{linear}(p,k) = 0.2627 \cdot R_{linear} + 0.678 \cdot G_{linear} + 0.0593 \cdot B_{linear}$
  The average of a region R (M×N) centered at a current pixel p is defined by $$\text{region\_avg}(p, k) = \frac{1}{M \times N} \sum_{x \in R} Y_{linear}(x, k)$$

The center pixel and frame of the brightest region is given by
(p' · k') = argmax$_{p \in rk}$ region_avg(p · k) for all frames f (k) in a scene
scene_region_max = region_avg(p' · k')

The maximum luminance value SCENE_MAX of a scene may be set to a maximum value from among RGB color components of all pixels in the scene. Alternatively, the maximum luminance value SCENE_MAX of the scene may be set to a maximum value from among RGB color components of all pixels defined by a pixel selector. The pixel selector may select some pixels from among pixels included in the current scene, based on a size of a frame, positions of a foreground and a background, etc.

The average luminance value SCENE_AVG of the scene may be set to an average value of maximum luminance values of all the pixels in the scene. A maximum luminance value of a pixel may refer to a maximum value from among RGB color components of one pixel as described with reference to FIG. 11.

Referring to FIG. 36, the area SCEN_PEAK_AREA of the maximum luminance region may be set by a function $f(\Delta y)$ about a luminance value and a function $g(\Delta d)$ about a distance. The function $f(\Delta y)$ may determine whether a candidate pixel x may be included in the maximum luminance region, based on a luminance value of the candidate pixel x. The function $f(\Delta y)$ has an absolute value of a difference value between Y_linear(x,k') and scene_region_max as an input. Y_linear(x,k') refers to the luminance value of the candidate pixel x in a frame k' in which a central pixel p' of the maximum luminance region is included. The luminance value Y_linear(x,k') of the candidate pixel x may be obtained by using RGB color components of the candidate pixel x. scene_region_max refers to an average luminance value (region_avg(p',k')) of pixels included in a region with a size of M×N and centered at the central pixel p' of the maximum luminance region. As shown in Table 4, the average luminance value (region_avg(p,k)) of the pixels included in the M×N region when the center of the M×N region is the pixel p' in the frame k' may be greater than when the center of the M×N region is another pixel in the scene. Accordingly, the pixel p' in the frame k' may become a central pixel of the maximum luminance region. Hereinafter, for convenience of explanation, scene_region_max is referred to as a reference luminance value of the maximum luminance region. Also, $g(\Delta d)$ may determine whether the candidate pixel x may be included in the maximum luminance region, based on a position of the candidate pixel x.

When a difference between Y_linear(x,k') that is the luminance value of the candidate pixel and scene_region_max that is the reference luminance value of the maximum luminance region is equal to or less than y1 and a distance between the central pixel p' of the maximum luminance region and the candidate pixel x is equal to or less than d1, $f(\Delta y)=g(\Delta d)=v1=1$ and thus the candidate pixel x may be included in the maximum luminance region. That is, the area SCEN_PEAK_AREA of the maximum luminance region may be increased by 1 by the candidate pixel x.

In contrast, when a difference between Y_linear(x,k') that is the luminance value of the candidate pixel and scene_region_max that is the reference luminance value of the maximum luminance region is equal to or greater than y2, $f(\Delta y)=v2=0$ and thus the candidate pixel x may be excluded from the maximum luminance region. That is, the area SCEN_PEAK_AREA of the maximum luminance region is not increased by the candidate pixel 1.

Also, when a distance between the central pixel p' of the maximum luminance region and the candidate pixel x is equal to or greater than d2, $g(\Delta d)=v2=0$ and thus the candidate pixel x may be excluded from the maximum luminance region. That is, the area SCEN_PEAK_AREA of the maximum luminance region is not increased by the candidate pixel x.

When a difference between Y_linear(x,k') that is the luminance value of the candidate pixel and scene_region_max that is the reference luminance value of the maximum luminance region is greater than y2 and less than y2, $0 \leq f(\Delta y) \leq 1$ and the area SCENE_PEAK_AREA of the maximum luminance region may be increased by less than 1. Also, when a distance between the central pixel p' of the maximum luminance region and the candidate pixel x is greater than d1 and less than d2, $0 \leq g(\Delta d) \leq 1$ and thus the area of SCENE_PEAK_AREA of the maximum luminance region may be increased by less than 1.

The functions $f(\Delta y)$ and $g(\Delta d)$ may be specific examples of operation 1720. However, a luminance value of a central pixel is used in operation 1720 whereas scene_region_max that is the reference luminance value of the maximum luminance region is used in the function $f(\Delta y)$. Also, scene_region_max that is the reference luminance value of the maximum luminance region may correspond to an average luminance value of pixels included in the region 1590. Also, the area SCEN_PEAK_AREA of the maximum luminance region may correspond to an area of the region 1800.

Figure 30:
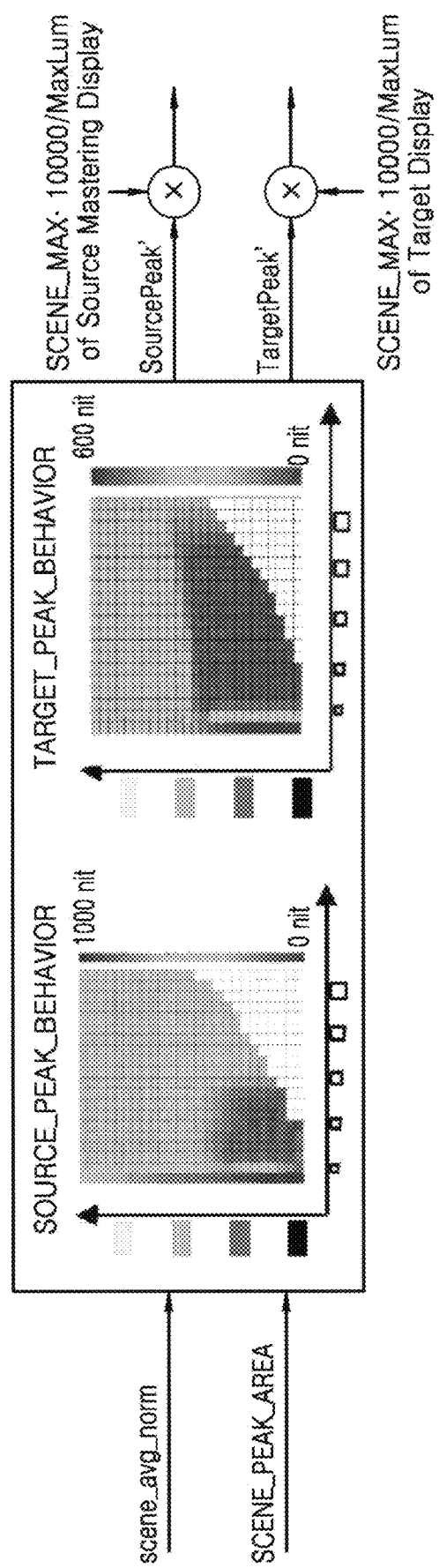
FIG. 30 sequentially illustrates a calculation process of Table 4.

Also, an operation performed by the luminance characteristics obtainer 2950 to obtain the actual maximum display luminance value of the mastering display and the actual maximum display luminance value of the target display according to the luminance characteristics of the original image 2910 based on the dynamic metadata SOURCE_PEAK_BEHAVIOR and TARGET_PEAK_BEHAVIOR may be summarized as in Table 4. FIG. 30 sequentially illustrates a calculation process of Table 4.

TABLE 4 scene_avg_norm = SCENE_AVG · 10000/MaxLum of Source Mastering Monitor
SourcePeak' = SOURCE_PEAK_BEHAVIOR(scene_avg_norm,SCENE_PEAK_AREA) ·
    SCENE_MAX ·10000/MaxLum of Source Mastering Monitor
TargetPeak' = TARGET_PEAK_BEHAVIOR(scene_avg_norm,SCENE_PEAK_AREA) ·
    SCENE_MAX · 10000/MaxLum of Target Mastering Monitor $$\text{SourcePeak} = \begin{cases} \text{SourcePeak}', & \text{if SCENE\_DYNAMIC\_FLAG} = 1 \\ \text{MaxLume of Source Mastering Monitor}, & \text{else} \end{cases}$$

$$\text{TargetPeak} = \begin{cases} \text{TargetPeak}', & \text{if SCENE\_DYNAMIC\_FLAG} = 1 \\ \text{MaxLume of Target Monitor}, & \text{else} \end{cases}$$

When the input parameter SCENE_DYNAMIC_FLAG indicates that the luminance characteristics of the original image 2910 are to be obtained, SourcePeak may be set to SourcePeak' that is a normalized actual maximum display luminance value of the mastering display according to the luminance characteristics of the original image 2910, and TargetPeak may be set to TargetPeak' that is the normalized actual maximum display luminance value of the target display. That is, when the input parameter SCENE_DYNAMIC_FLAG indicates that the luminance characteristics of the original image 2910 are to be obtained, SourcePeak and TargetPeak that are parameters for tone mapping and saturation correction may be set based on the dynamic metadata.

SOURCE_PEAK_BEHAVIOR(scene_avg_norm, SCENE_PEAK_AREA) may be the actual maximum display luminance value of the mastering display according to scene_avg_norm that is a value obtained by normalizing the average luminance value SCENE_AVG of the scene based on 10000 nits and the area SCENE_PEAK_AREA of the maximum luminance region. SourcePeak' may correspond to a value obtained by normalizing the actual maximum display luminance value of the mastering display based on 10000 nits.

TARGET_PEAK_BEHAVIOR(scene_avg_norm, SCENE_PEAK_AREA) may be the actual maximum display luminance value of the target display according to the value scene_avg_norm obtained by normalizing the average luminance value SCENBE_AVG of the scene based on 10000 nits and the area SCENE_PEAK_AREA of the maximum luminance region. TargetPeak' may correspond to a value obtained by normalizing the actual maximum display luminance value of the target display based on 10000 nits.

When the input parameter SCENE_DYNAMIC_FLAG in Table 2 indicates that the luminance characteristics of the original image 2910 are not to be obtained, SourcePeak may be set to Max Lum of Source Mastering Monitor corresponding to the static metadata and TargetPeak may be set to Max Lum of Target Monitor corresponding to the static metadata. That is, when the input parameter SCENE_DYNAMIC_FLAG indicates that the luminance characteristics of the original image 2910 are not to be obtained, SourcePeak and TargetPeak that are parameters for tone mapping and saturation correction may be set based on the static metadata.

In Table 2, the tone mapper 2960 may output [R_stm; G_stm; B_stm] that is a tone mapped image by applying a tone mapping weight w to [R_norm; G_norm; B_norm] that is the normalized original image. An output value of a tone mapping function f_STM having a maximum value from among values of the normalized original image [R_norm; G_norm; B_norm] as an input may be the tone mapping weight w. This is because, in general, since a gain Gain of the tone mapping function f_STM decreases as an input value increases, saturation due to excessive tone mapping may be prevented when a maximum value from among RGB color components of the normalized original image is used.

Figure 31:
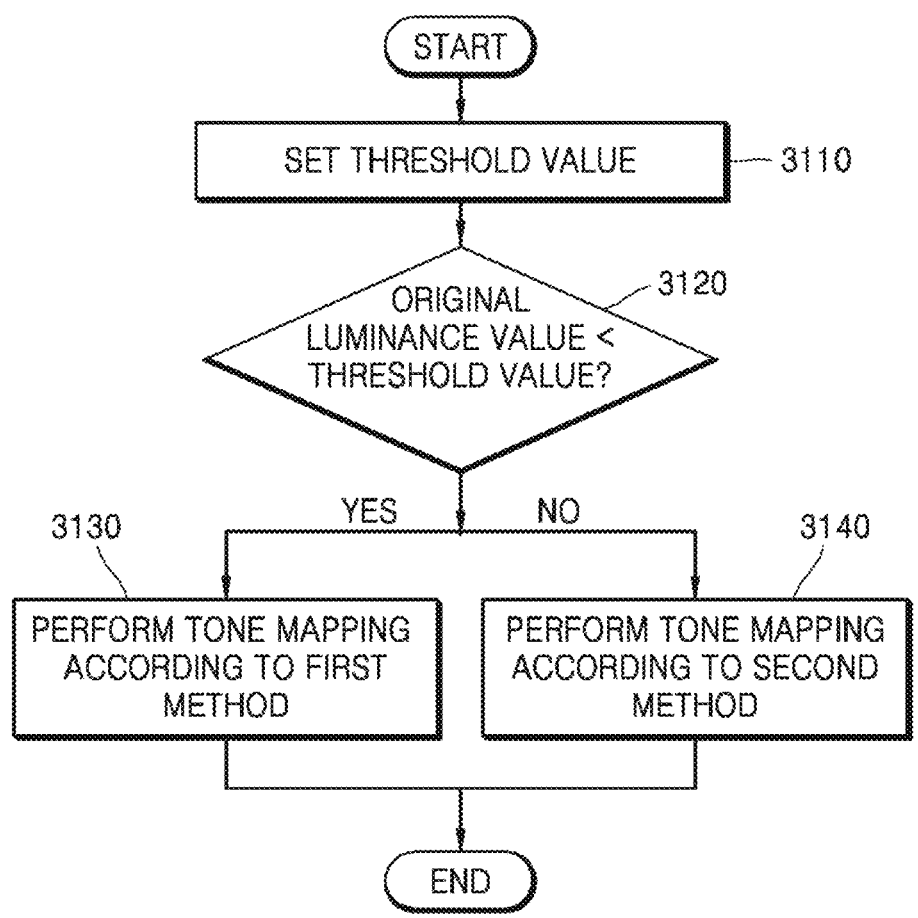
FIG. 31 sequentially illustrates a calculation process of Table 5.

An operation performed by the tone mapper 2960 to set the tone mapping function f_STM may be summarized as in Table 5. FIG. 31 sequentially illustrates a calculation process of Table 5.

TABLE 5

$$f_{STM}(x) = \begin{cases} \dfrac{TM_y}{TargetPeak \cdot TM_x} \cdot x, & \text{if } x < TM_x \\ f_n(x), & \text{else} \end{cases}$$

$$f_n(x) = CGain \cdot (1 - (1 - x)^n) + (1 - CGain) \cdot x$$

$$TM_x = SCENE\_AVG/SCENE\_MAX$$

$$TM_y = f_{plinear}(TM_x)$$

$$n = \text{ceiling}\left(\dfrac{\log(1 - TM_y)}{\log(1 - TM_x)}\right), \quad CGain = \dfrac{TM_y - TM_x}{1 - (1 - TM_x)^n - TM_x}$$

$$f_{plinear}(x) = \begin{cases} SourcePeak \cdot x, & \text{if } x < Th_x \\ \dfrac{(TargetPeak - Th_y)}{(1.0 - Th_x)} \cdot (x - Th_x) + Th_y, & \text{else} \end{cases}$$

$$Th_x = TONE\_PRESERVING\_LUM/SourcePeak,$$

$$Th_y = TONE\_PRESERVING\_LUM$$

In operation 3110, the tone mapper 2960 may set a threshold value according to the luminance characteristics of the original image 2910. In Table 5, the threshold value corresponds to TMx=SCENE_AVG/SCENE_MAX. For example, the threshold value TMx may be a value between 0 and 1 obtained by dividing the average luminance value SCENE_AVG of the scene by the maximum luminance value SCENE_MAX of the scene.

In operation 3120, the tone mapper 2960 may determine whether an original luminance value is less than the threshold value. When it is determined in operation 3120 that the original luminance value is less than the threshold value, the operation of FIG. 31 proceeds to operation 3130. In operation 3130, the tone mapper 2960 may perform tone mapping according to a first method. Also, when it is determined in operation 3120 that the original luminance value is greater than the threshold value, the operation of FIG. 31 proceeds to operation 3140. In operation 3140, the tone mapper 2960 may perform tone mapping according to a second method.

In Table 5, the tone mapping according to the first method may be a linear function TMy/(TargetPeak*TMx)*x, and the tone mapping according to the second method may be a non-linear function fn(x). In detail, the tone mapping according to the first method may correspond to a linear function connecting the origin and a point (TMx, TMy/TargetPeak), and the tone mapping according to the second method may be an $n^{th}$ order polynomial function connecting the point (TMx, TMy/TargetPeak) and a point (1.0, TargetPeak). FIG. 32 illustrates a tone mapping function f_STM 3210. For convenience of explanation, the y-axis of the tone mapping function f_STM 3210 is enlarged by TargetPeak times.

In Table 5, TMy may correspond to an output value of a luminance preserving function f_plinear having the threshold value TMx as an input. The luminance preserving function f_plinear may correspond to a linear function connecting the origin and a point (1.0, SourcePeak) when an input is equal to or less than a luminance preserving value Thx=TONE_PRESERVING_LUM/SourcePeak, and may correspond to a linear function connecting a point (Thx, Thy) and the point (1.0, TargetPeak) when the input is equal to or greater than the luminance preserving value Thx. FIG. 32 illustrates a luminance preserving function f_plinear 3220.

The luminance preserving value Thx may refer to a threshold value at which a luminance value of the original image 2910 is not increased by tone mapping. When a maximum value in the normalized original image [R_norm; G_norm; B_norm] that is an input of the tone mapper 2960 is less than the luminance preserving value Thx, the tone mapped image [R_stm; G_stm; B_stm] that is an output of the tone mapper 2960 may be equal to or less than the normalized original image [R_norm; G_norm; B_norm].

Figure 33:
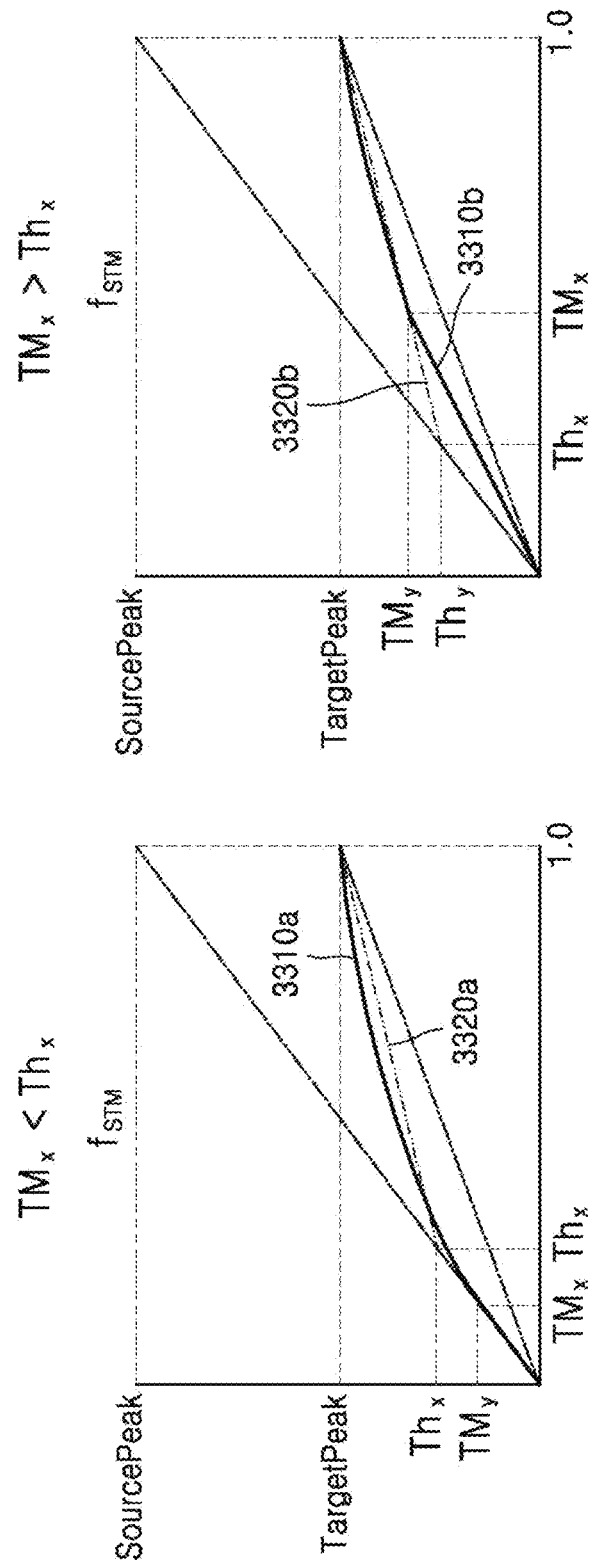
FIG. 33 illustrates a relationship between a tone mapping function and a luminance preserving function according to a relationship between a threshold value and a luminance preserving value.

FIG. 33 illustrates a relationship between a tone mapping function f_STM 3310a or 3320a and a luminance preserving function f_plinear 3320a or 3320b according to a relationship between the threshold value TMx and the luminance preserving value Thx. As described above, the tone mapping according to the first method of the tone mapping function f_STM 3310a or 3310b may correspond to a linear function connecting the origin and a point (TMx, TMy=f_plinear (TMx)) of the luminance preserving function f_plinear 3320a or 3320b.

When the threshold value TMx is less than the luminance preserving value Thx, the tone mapping function f_STM 3310a of the first method for an input equal to or less than the threshold value TMx may be a linear function that bypasses the original luminance value. In this case, the tone mapper 2960 may preserve a non-bright region of a high dynamic range image.

In contrast, when the threshold value TMx is greater than the luminance preserving value Thx, the tone mapping function f_STM 3310*b* of the first method for an input equal to or less than the threshold value TMx may be a linear function that tone maps the original luminance value to a smaller value. In this case, the tone mapper 2960 may preserve details of a bright region of the high dynamic range image. An image producer or a colorist may preserve luminance characteristics of a dark region or luminance characteristics of a bright region of an original image by adjusting the luminance preserving value Thx.

In Table 2, the saturation corrector 2970 may receive the tone mapped image [R_stm; G_stm; B_stm] and may output a saturation corrected image [R_scsm; G_scsm; B_scsm]. An operation of the saturation corrector 2970 may be summarized as in Table 6.

TABLE 6

$$\begin{pmatrix} R'_{stm} \\ G'_{stm} \\ B'_{stm} \end{pmatrix} = \text{Inverse EOTF Rec. 1886} \begin{pmatrix} R_{stm} \\ G_{stm} \\ B_{stm} \end{pmatrix}$$

$$\begin{pmatrix} Y_{stm} \\ U_{stm} \\ V_{stm} \end{pmatrix} = M_{RGB2YUV} \cdot \begin{pmatrix} R'_{stm} \\ G'_{stm} \\ B'_{stm} \end{pmatrix}$$

$$x_{maxRGB} = \max(R_{stm}, G_{stm}, B_{stm})$$

$$\begin{pmatrix} Y_{scsm} \\ U_{scsm} \\ V_{scsm} \end{pmatrix} = \begin{pmatrix} Y_{stm} \\ S_{scsm} \cdot U_{scsm} \\ S_{scsm} \cdot V_{scsm} \end{pmatrix}$$

$$S_{sm} = f_{SCSM}(x_{maxRGB})$$

$$S_{scsm} = \min(S_{sm}, S_{max})$$

$$\begin{pmatrix} R'_{scsm} \\ G'_{scsm} \\ B'_{scsm} \end{pmatrix} = M_{YUV2RGB} \cdot \begin{pmatrix} Y_{scsm} \\ U_{scsm} \\ V_{scsm} \end{pmatrix}$$

$$\begin{pmatrix} R_{scsm} \\ G_{scsm} \\ B_{scsm} \end{pmatrix} = \text{EOTF Rec. 1886} \begin{pmatrix} R'_{scsm} \\ G'_{scsm} \\ B'_{scsm} \end{pmatrix}$$

$$M_{YUV2RGB} = M_{RGB2YUV}^{-1}$$

Referring to Table 6, the saturation corrector 2970 may perform an operation of converting RGB color components of a tone mapped image into YUV components, an operation of performing saturation correction on the YUV components, and an operation of converting again the saturation corrected YUV components into RGB color components.

The saturation corrector 2970 may obtain [R_stm'; G_stm'; B_stm'] by performing EOTF Rec.1886 gamma inverse correction and linearization on the tone mapped image [R_stm; G_stm; B_stm], and may obtain luminance components and saturation components [Y_stm; U_stm; V_stm] of the tone mapped image from [R_stm'; G_stm'; B_stm'] by using a transformation matrix M_RGB2YUV. The transformation matrix M_RGB2YUV for converting RGB components into YUV components may be based on the SMPTE 240M standard.

The saturation corrector 2970 may obtain YUB components [Y_scsm; U_scsm; V_scsm] of the saturation corrected image from the YUV components [Y_stm; U_stm; V_stm] of the tone mapped image by using a saturation correction weight S_scsm. The saturation correction weight S_scsm may be set to a smaller value from among S_sm and S_scsm in order to prevent saturation due to excessive saturation correction. An operation performed by the saturation corrector 2970 to obtain S_sm and S_scsm may be summarized as in Table 7.

TABLE 7

S = COLOR_SATURATION_WEIGHT $$S_{SM} = f_{SCSM}(x_{maxRGB}) = 1 + S \cdot \left( \frac{\log(\text{SourcePeak} \cdot x_{maxRGB})}{\log(\text{TargetPeak} \cdot f_{STM}(x_{maxRGB}))} - 1 \right)$$

$S_{max} = \max(k)$, where k satisfies followng condition $0 \le R'_{scsm} \le 1 \quad 0 \le M_{11}Y_{stm} + k(M_{12}U_{scsm} + M_{13}V_{scsm}) \le 1$ $0 \le G'_{scsm} \le 1 = 0 \le M_{21}Y_{stm} + k(M_{22}U_{scsm} + M_{23}V_{scsm}) \le 1$ $0 \le B'_{scsm} \le 1 \quad 0 \le M_{31}Y_{stm} + k(M_{32}U_{scsm} + M_{33}V_{scsm}) \le 1$ $$\begin{pmatrix} R'_{scsm} \\ G'_{scsm} \\ B'_{scsm} \end{pmatrix} = \begin{pmatrix} M_{11} & M_{12} & M_{13} \\ M_{21} & M_{22} & M_{23} \\ M_{31} & M_{32} & M_{33} \end{pmatrix} \cdot \begin{pmatrix} Y_{stm} \\ k \cdot U_{stm} \\ k \cdot V_{stm} \end{pmatrix}$$

The saturation corrector 2970 may set S_sm to an output value of a saturation correction function f_SCSM having a maximum value x_max RGB from among RGB color components of the tone mapped image as an input. The saturation correction function f_SCSM may be determined by an intensity parameter S and a ratio between a log scale of the original luminance value and a log scale of a tone mapped luminance value. An image producer and a colorist may adjust the intensity of saturation correction of the saturation correction function f_SCSM by setting the intensity parameter S.

As described with reference to FIG. 28, since a saturation value perceived by a person may be maintained when the tone mapper 2960 bypasses the original luminance value of a pixel, the saturation corrector 2970 may bypass a saturation value of the pixel. Alternatively, the saturation corrector 2970 may perform saturation correction only on a region where tone mapping is performed on the original image 2910 by the tone mapper 2960. Accordingly, as described with reference to FIG. 33, when the threshold value TMx is less than the luminance preserving value Thx, the tone mapping function f_STM 3310*a* of the first method for an input equal to or less than the threshold value TMx may bypass the original luminance value and also the saturation correction function f_SCSM for an input equal to or less than the threshold value TMx may bypass the original saturation value.

In Table 7, the saturation corrector 2970 may set S_max to a maximum saturation correction weight that does not cause color distortion. When any one from among R_scsm', G_scsm', and B_scsm' in Table 7 has a negative value or is increased to be greater than 1, color distortion may occur. Accordingly, the saturation corrector 2970 may set a maximum value k with which all of R_scsm', G_scsm', and Bscsm' have a value between 0 and 1 to S_max in Table 7.

In Table 6, the saturation corrector 2970 may obtain [R_scsm'; G_scsm'; B_scsm'] that are linearized RGB components of the saturation corrected image from [Y_scsm; U_scsm; V_scsm] that are the YUV components of the saturation corrected image by using a transformation matrix M_YUV2RGB. The transformation matrix M_YUV2RGB for converting the YUV components into the RGB components may be an inverse matrix of the transformation matrix M_RGB2YUV for converting the RGB components into the YUV components. Also, the saturation corrector 2970 may obtain [R_scsm; G_scsm; B_scsm] that are RGB components of a final saturation corrected image by performing EOTF Rec.1886 gamma correction on [R_scsm; G_scsm; B_scsm] that are the linearized RGB components of the saturation corrected image.

In FIG. 29, the inverse converter 2945 may convert a color space of a corrected image 2980 into an original color space of the original image 2910. The corrected image 2980 output from the saturation corrector 2970 may have a working color space in which tone mapping is performed. The inverse converter 2945 may convert the color space of the corrected image 2980 from the working color space into the original color space of the original image 2910. For example, the inverse converter 2945 may convert x and y color coordinates of a primary color and x and y color coordinates of a white point corresponding to the working color space into x and y color coordinates 'Primaries' of a primary color and x and y color coordinates 'White Point' of a white pint corresponding to the original color space.

If necessary, the inverse shaper 2935 may perform non-linearization on the corrected image 2980. For example, the inverse shaper 2935 may perform non-linearization according to SMPTE ST2084 on the corrected image 2980. SMPTE ST2084 may be a standard for the high dynamic range inverse EOTF of the mastering display derived from EOTF. In detail, the inverse shaper 2935 may obtain a non-linearized corrected image 2980 by performing gamma encoding on the corrected image 2980 that is linearized by using gamma decoding.

The encoder 2925 may encode the corrected image 2980 in order to input the corrected image 2980 to the target system 2990. The encoded corrected image 2980 obtained by the encoder 2925 may be input to the target system 2990.

The target system 2990 may display the corrected image 2980. Even when a dynamic range of the corrected image 2980 is different from a dynamic range of the original image 2910, the corrected image 2980 obtained by the image processing apparatus 2900 may effectively maintain the intention of an image producer reflected on the original image 2910.

Figure 34:
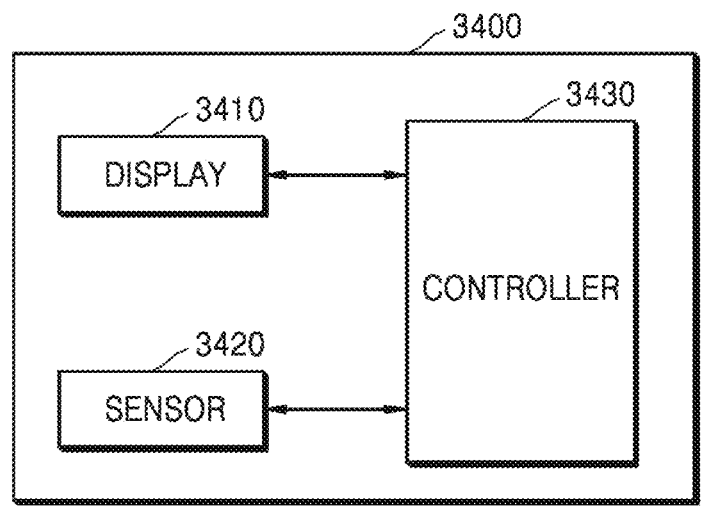
FIG. 34 is a block diagram of an apparatus for generating metadata.

FIG. 34 is a block diagram of an apparatus 3400 for generating metadata.

The apparatus 3400 may generate dynamic metadata indicating an actual maximum display luminance value of a display 3410 according to luminance characteristics of an image. The luminance characteristics of the image may include an average luminance value of the image and an area of a white patch in the image.

The apparatus 3400 may include the display 3410, a sensor 3420, and a controller 3430.

The display 3410 displays an image including a region with a maximum grayscale value. The region may correspond to the white patch and may be at least one pixel having a maximum luminance value or a maximum grayscale value. For example, the region in an image with a depth of 8 bits may correspond to M×N pixels with a grayscale value of 255.

When the display 3410 displays the image, the sensor 3420 measures a luminance value of the region displayed by the display 3410. The luminance value of the display 3410 measured by the sensor 3420 may correspond to the actual maximum display luminance value of the display 3410 that is measurable on the region when the display 3410 displays the image. As described above, when power consumption of the display 3410 is not sufficient, the actual maximum display luminance value of the display 3410 may be less than a desired maximum display luminance value of the display 3410.

The controller 3430 generates metadata indicating the measured luminance value according to a pixel area of the region and the average luminance value of the image. The pixel area of the region may correspond to the area of the white patch, and may be the number of pixels included in the region. Also, the average luminance value of the image may refer to an average of luminance values of all pixels included in the image.

The controller 3430 may generate metadata by changing the luminance characteristics of the image. For example, the controller 3430 may change the average luminance value of the image as in the images 310, 320, 330, and 340 of FIG. 3, or may change the area of the white patch as in the images 410, 420, 430, and 440 of FIG. 4. Alternatively, the controller 3430 may change both the average luminance value of the image and the area of the white patch. Also, the controller 3430 may add the actual maximum display luminance value of the display 3410 measured by the sensor 3420 according to the changed luminance characteristics of the image to the metadata.

When the display 3410 is used as a mastering display device of the image processing apparatus 2900, the metadata may be used as first metadata of the image processing apparatus 2900. Also, when the display 3410 is used as a target display device of the image processing apparatus 2900, the metadata may be used as second metadata of the image processing apparatus 2900.

Figure 35:
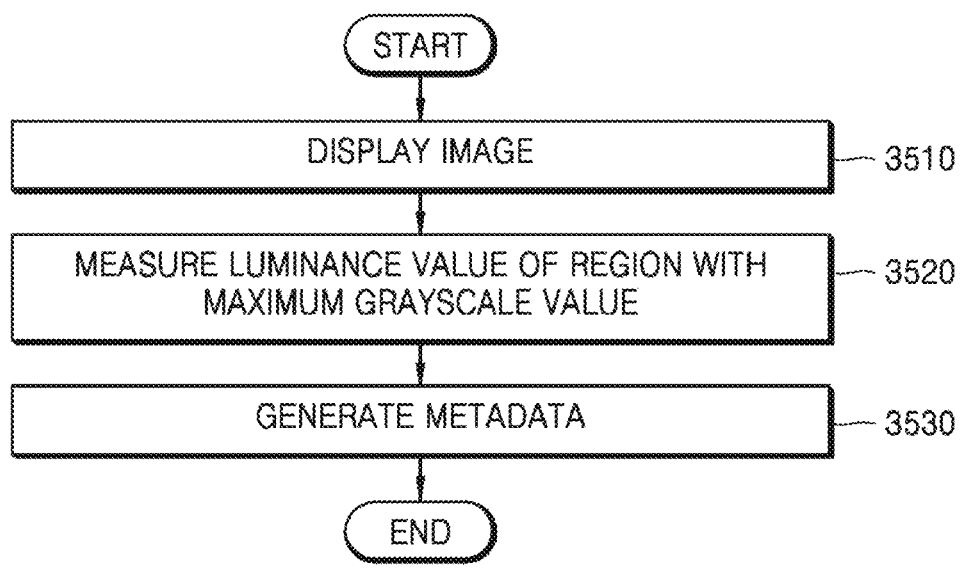
FIG. 35 is a flowchart of a method of generating metadata.

FIG. 35 is a flowchart of a method of generating metadata.

In operation 3510, the display 3410 of the apparatus 3400 may display an image including a region with a maximum grayscale value.

In operation 3520, the sensor 3420 of the apparatus 3400 may measure a luminance value of the region with the maximum grayscale value in the image displayed by the display 3410.

In operation 3530, the apparatus 3400 may generate metadata indicating the luminance value measured in operation 3520 according to an average luminance value of the image displayed on the display 3410 and a pixel area of the region with the maximum grayscale value. Operation 3530 may be performed by the controller 3430.

As described above, when tone mapping is performed by considering luminance characteristics of an image, a tone mapped image may more effectively maintain the intention of an original image than when tone mapping is performed by not considering the luminance characteristics of the image.

The afore-described embodiments may be implemented as an executable program, and may be executed by a general-purpose digital computer that runs the program by using a computer-readable recording medium. Also; a structure of data used in the embodiments may be recorded by using various units on a computer-readable medium. Also, the embodiments may be implemented as a recording medium including instructions that may be executed in computers, e.g.; a program module executed in computers. For example, methods may be implemented as software modules or algorithms, and may be stored as program instructions or computer-readable codes executable on a computer-readable medium.

The computer-readable medium may include any usable medium that may be accessed by computers, volatile and non-volatile media, and detachable and non-detachable media. Examples of the computer-readable recording medium include magnetic storage media (e.g., ROMs, floppy disks, or hard disks), optical recording media (e.g., CD-ROMs, or DVDs), etc. Also, the computer-readable medium may include a computer storage medium and a communication medium.

Also, the computer-readable recording media can also be distributed over network-coupled computer systems, and data stored in the distributed recording media, for example, program commands and codes, may be executed by at least one computer.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail.

While the present disclosure has been particularly shown and described with reference to exemplary embodiments thereof, it will be understood by one of ordinary skill in the art that various changes in form and details may be made therein without departing from the spirit and scope of the present disclosure as defined by the following claims. Hence, it will be understood that the embodiments described above are not limiting of the scope of the present disclosure. For example, each component described in a single type may be executed in a distributed manner, and components described distributed may also be executed in an integrated form.

The use of any and all examples, or exemplary language (e.g., "such as") provided herein, is intended merely to better illuminate the present disclosure and does not pose a limitation on the scope of the present disclosure unless otherwise claimed.

Moreover, no item or component is essential to the practice of the present disclosure unless the element is specifically described as "essential" or "critical".

It will be understood by one of ordinary skill in the art that various changes in form and details may be made therein without departing from the spirit and scope of the present disclosure.

As the present disclosure allows for various changes and numerous embodiments, exemplary embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. The embodiments should be considered in a descriptive sense only and not for purposes of limitation.

The scope of the present disclosure is not defined by the detailed description of the invention but by the claims, and all modifications or alternatives derived from the scope and spirit of the claims and equivalents thereof fall within the scope of the present disclosure.

Terms such as " . . . unit" or " . . . module" refer to units that perform at least one function or operation, and the units may be implemented as hardware or software or as a combination of hardware and software.

" . . . unit" or " . . . module" may be stored in an addressable storage medium as a program executable on a processor.

For example, " . . . unit" or " . . . module" may include any one or more of constituent elements such as software constituent elements, object-oriented software constituent elements, class constituent elements, and task constituent elements, processes, functions, attributes, procedures, subroutines, segments of program codes, drivers, firmware, microcodes, circuits, data, a database, data structures, tables, arrays, and variables.

When "an element A may include one of a1, a2, and a3" herein, it broadly means that an exemplary element that may be included in the element A is a1, a2, or a3.

Elements that can constitute the element A due to the above description are not necessarily limited to a1, a2, or a3. Thus, it should not be interpreted that the elements that can constitute the element A exclude elements other than a1, a2 and a3.

Further, the above description means that the element A may include a1, may include a2, or may include a3. This does not mean that the elements that can constitute the element A should be selected within a certain set. For example, it should not be interpreted that only a1, a2, or a3 selected from the set including a1, a2, and a3 constitutes the element A.

Also, in this specification, the expression "at least one of a1, a2 and a3" means at least one of "a1", "a2", "a3", "a1 and a2", "a1 and a3", "a2 and a3", and "a1, a2, and a3".

Therefore, the expression "at least one of a1, a2, and a3" is not limited to "at least one of a1", "at least one of a2", and "at least one of a3" unless it is clearly stated as "at least one of a1, at least one of a2, and at least one of a3".

The invention claimed is:

1. An image processing apparatus comprising:
a receiver configured to receive at least one from among first metadata indicating a maximum display luminance value of a mastering display according to luminance characteristics of an image and second metadata indicating a maximum display luminance value of a target display according to the luminance characteristics of the image; and
a controller configured to:
divide an encoded image into one or more scenes,
obtain luminance characteristics of a current scene comprising an average luminance value of the current scene,
determine a central pixel of a maximum luminance region of the current scene by maximizing a sum of luminance values of pixels included in the maximum luminance region,
when the first metadata is obtained, obtain the maximum display luminance value of the mastering display according to an area of the maximum luminance region and the luminance characteristics of the current scene, based on the first metadata, and
when the second metadata is obtained, obtain the maximum display luminance value of the target display according to the area of the maximum luminance region and the luminance characteristics of the current scene, based on the second metadata.

2. The image processing apparatus of claim 1, wherein the average luminance value of the current scene is obtained by using a maximum value from among RGB component values of a pixel included in the current scene.

3. The image processing apparatus of claim 1, wherein the maximum display luminance value of the mastering display according to the luminance characteristics of the current scene and the maximum display luminance value of the target display according to the luminance characteristics of the current scene are different from each other.

4. The image processing apparatus of claim 1, wherein the controller is further configured to obtain a number of first pixels that are located within a threshold distance from the central pixel and have a luminance value within a threshold range from a luminance value of the central pixel, from among pixels of a frame including the central pixel,
   wherein the luminance characteristics of the current scene further comprise the obtained number of the first pixels.

5. The image processing apparatus of claim 1, wherein the receiver is further configured to receive a flag indicating whether the luminance characteristics of the current scene are to be obtained, and
   the controller is further configured to, when the flag indicates that the luminance characteristics of the current scene are to be obtained, obtain the luminance characteristics of the current scene.

6. The image processing apparatus of claim 1, further comprising a display,
   wherein the controller is further configured to obtain a tone mapped luminance value of a pixel included in a frame of the current scene by performing tone mapping on an original luminance value of the pixel, based on at least one from among the obtained maximum display luminance value of the mastering display according to the luminance characteristics of the current scene and the obtained maximum display luminance value of the target display according to the luminance characteristics of the current scene, and
   the display is configured to display the current scene by using the tone mapped luminance value.

7. The image processing apparatus of claim 6, wherein, when the original luminance value is less than a threshold value, the tone mapped luminance value is obtained by performing tone mapping according to a first method on the original luminance value, and
   when the original luminance value is greater than the threshold value, the tone mapped luminance value is obtained by performing tone mapping according to a second method on the original luminance value.

8. The image processing apparatus of claim 7, wherein the tone mapping according to the first method corresponds to a linear function between the original luminance value and the tone mapped luminance value, and the tone mapping according to the second method corresponds to a non-linear function between the original luminance value and the tone mapped luminance value.

9. The image processing apparatus of claim 8, wherein when the threshold value is less than a luminance preserving value, the tone mapping according to the first method bypasses the original luminance value.

10. The image processing apparatus of claim 9, wherein when the original luminance value of the pixel is bypassed, the controller is further configured to bypass a saturation value of the pixel.

11. The image processing apparatus of claim 6, wherein the controller is further configured to correct a saturation value of the pixel based on the original luminance value of the pixel and the tone mapped luminance value of the pixel, and
   the display is further configured to display the current scene by using the tone mapped luminance value and the corrected saturation value.

12. The image processing apparatus of claim 11, wherein the corrected saturation value is determined based on a ratio between a log scale of the original luminance value and a log scale of the tone mapped luminance value.

13. An image processing method comprising:
   receiving at least one from among first metadata indicating a maximum display luminance value of a mastering display according to luminance characteristics of an image and second metadata indicating a maximum display luminance value of a target display according to the luminance characteristics of the image;
   dividing an encoded image into one or more scenes;
   obtaining luminance characteristics of a current scene comprising an average luminance value of the current scene;
   determining a central pixel of a maximum luminance region of the current scene by maximizing a sum of luminance values of pixels included in the maximum luminance region;
   when the first metadata is obtained, obtaining the maximum display luminance value of the mastering display according to an area of the maximum luminance region and the luminance characteristics of the current scene, based on the first metadata; and
   when the second metadata is obtained, obtaining the maximum display luminance value of the target display according to the area of the maximum luminance region and the luminance characteristics of the current scene, based on the second metadata.

14. The image processing method of claim 13, wherein the average luminance value of the current scene is obtained by using a maximum value from among RGB component values of a pixel included in the current scene.

15. The image processing method of claim 13, wherein the maximum display luminance value of the mastering display according to the luminance characteristics of the current scene and the maximum display luminance value of the target display according to the luminance characteristics of the current scene are different from each other.

16. The image processing method of claim 13, further comprising:
   obtaining a number of first pixels that are located within a threshold distance from the central pixel and have a luminance value within a threshold range from a luminance value of the central pixel, from among pixels of a frame including the central pixel,
   wherein the luminance characteristics of the current scene further comprise the obtained number of the first pixels.

17. The image processing method of claim 13, further comprising:
   receiving a flag indicating whether the luminance characteristics of the current scene are to be obtained; and
   when the flag indicates that the luminance characteristics of the current scene are to be obtained, obtaining the luminance characteristics of the current scene.

18. The image processing method of claim 13, further comprising:
   obtaining a tone mapped luminance value of a pixel included in a frame of the current scene by performing tone mapping on an original luminance value of the pixel, based on at least one from among the obtained maximum display luminance value of the mastering display according to the luminance characteristics of the current scene and the obtained maximum display luminance value of the target display according to the luminance characteristics of the current scene, and
   displaying the current scene by using the tone mapped luminance value.

19. The image processing method of claim 18, wherein when the original luminance value is less than a threshold value, the tone mapped luminance value is obtained by performing tone mapping according to a first method on the original luminance value, and
   when the original luminance value is greater than the threshold value, the tone mapped luminance value is obtained by performing tone mapping according to a second method on the original luminance value.

* * * * *